(12) United States Patent
Washisu

(10) Patent No.: US 6,704,501 B1
(45) Date of Patent: Mar. 9, 2004

(54) IMAGE BLUR PREVENTION APPARATUS

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/025,027

(22) Filed: Feb. 18, 1998

(30) Foreign Application Priority Data

| Feb. 18, 1997 | (JP) | 9-048587 |
| Jun. 6, 1997 | (JP) | 9-163480 |

(51) Int. Cl.$^7$ ............................................. G03B 17/00
(52) U.S. Cl. ...................................................... 396/55
(58) Field of Search ............................... 396/52, 53, 54, 396/55

(56) References Cited

U.S. PATENT DOCUMENTS

| 4,869,108 A | 9/1989 | Washisu |
| 4,965,619 A | 10/1990 | Shikaumi et al. |
| 5,020,369 A | 6/1991 | Washisu et al. |
| 5,402,202 A | 3/1995 | Washisu et al. |
| 5,608,703 A | 3/1997 | Washisu |
| 5,655,157 A * | 8/1997 | Enomoto ..................... 396/55 |
| 5,774,266 A | 6/1998 | Otani et al. |
| 6,332,060 B1 * | 12/2001 | Miyamoto et al. ............ 396/55 |

* cited by examiner

*Primary Examiner*—Russell Adams
*Assistant Examiner*—Arthur A Smith
(74) *Attorney, Agent, or Firm*—Fitzpatrick, Cella, Harper & Scinto

(57) ABSTRACT

There is provided an apparatus for an image blur correction device applied to a camera, which comprises (1) an operation means for starting an image blur correction operation of the image blur correction device in accordance with predetermined actions (shutter release actions) to start a photographing operation of the camera, and (2) a variable means for causing said operation means to change, in accordance with at least either <1> the exposure time in the photographing operation of the camera or <2> the focal distance in the photographing operation of the camera, timing of the image blur correction device to start the image blur correction operation in accordance with the predetermined actions to start the photographing operation. The timing of the image blur correction device to start the image blur correction operation is changed in correspondence to a degree of influence of a camera fluctuation (the degree varies according to the exposure time or the focal distance) caused by the predetermined actions to start the photographing operation of the camera. For example, when the degree of influence of the fluctuation is large (long exposure time or long focal distance), the timing is delayed so as to inhibit the image blur correction operation while the camera fluctuation is caused by the above predetermined actions, and so that a correction possible range of the image blur correction device is never exhausted and secured enough to correct the image blur caused by the above predetermined actions.

19 Claims, 53 Drawing Sheets

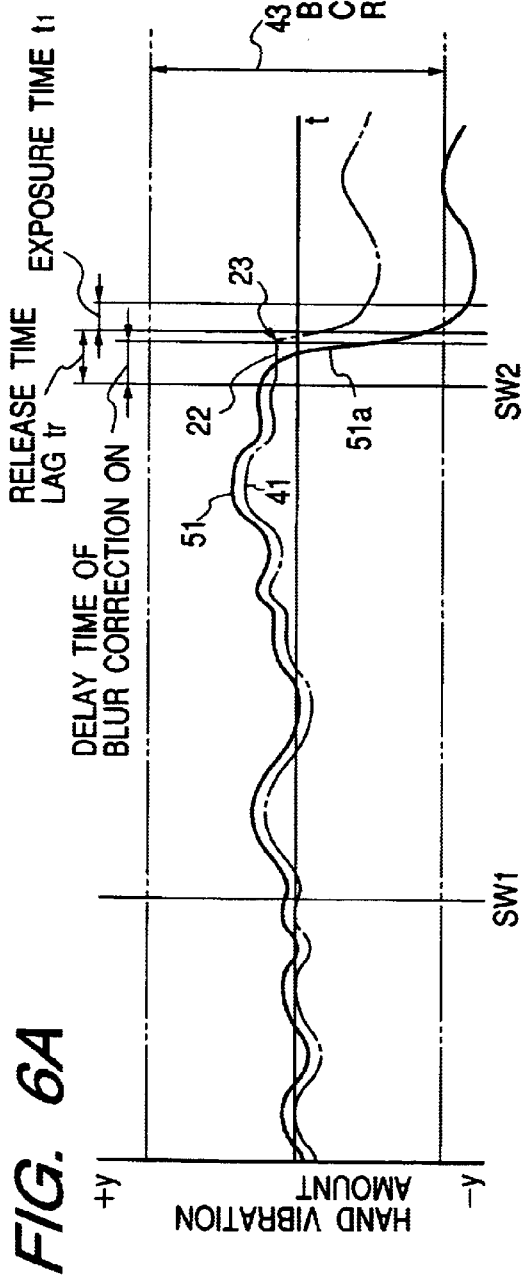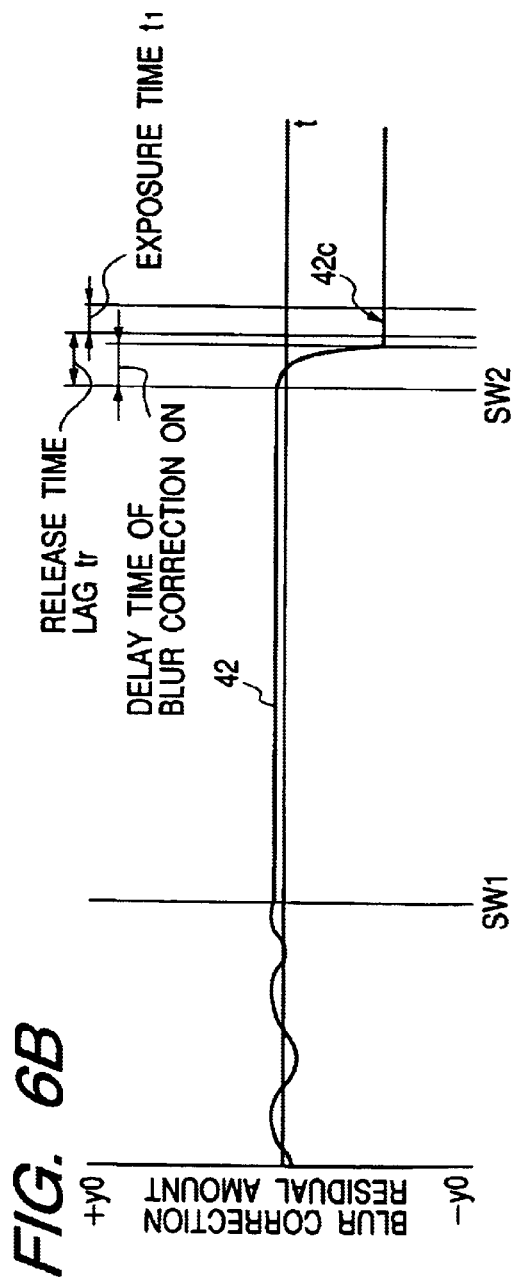

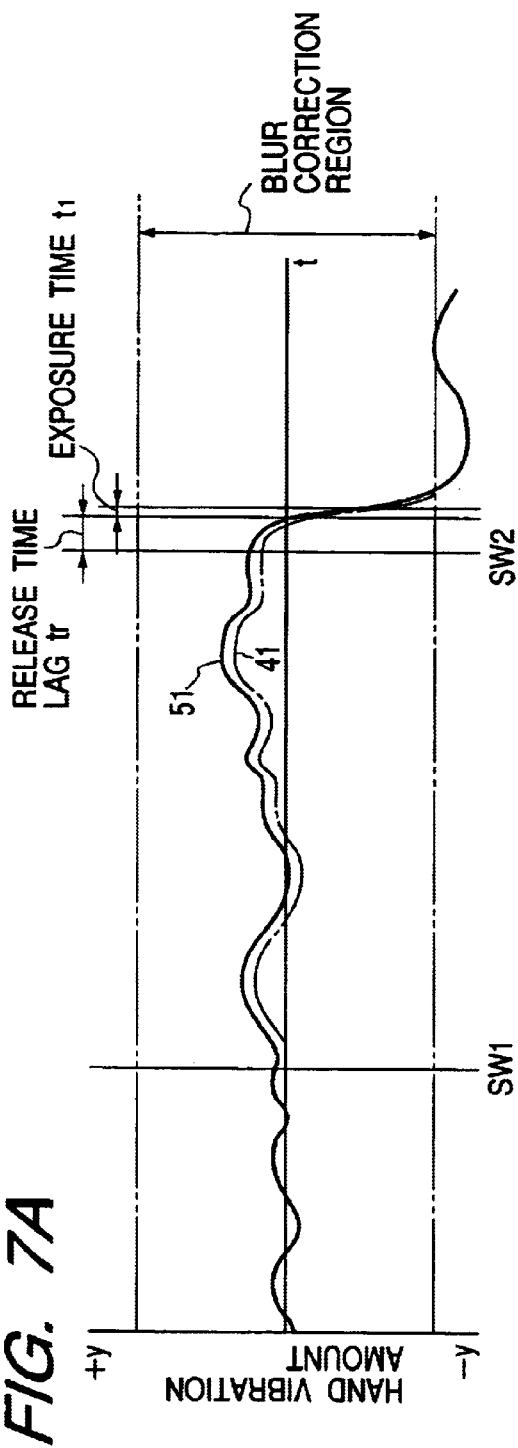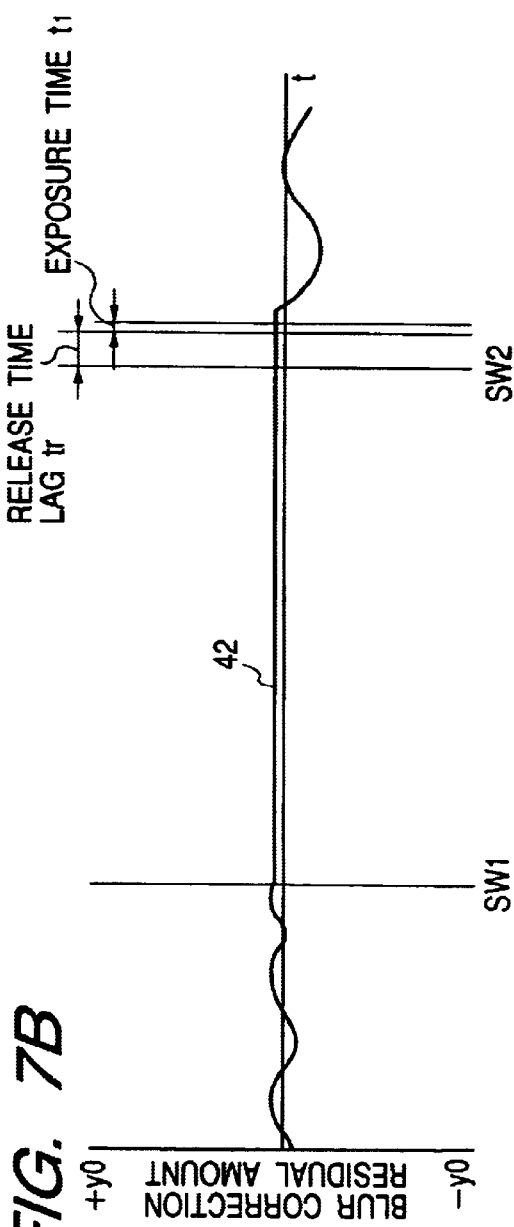

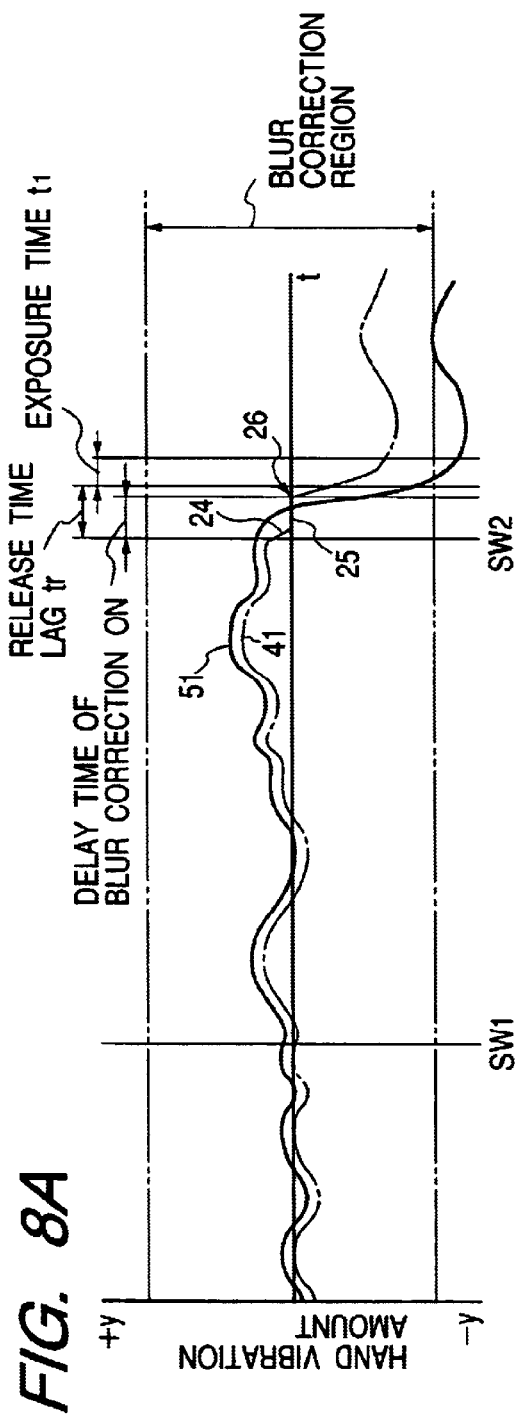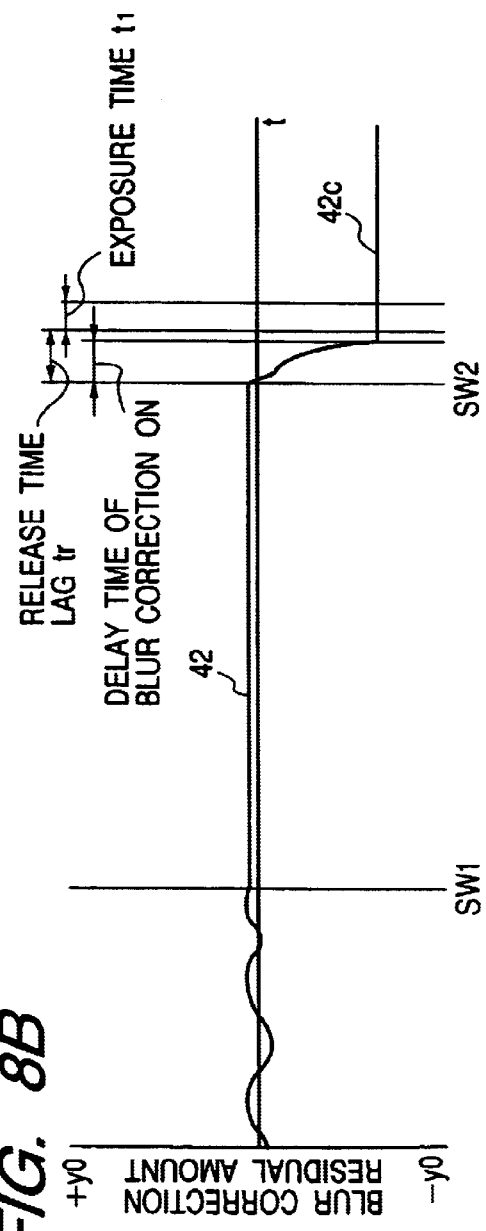

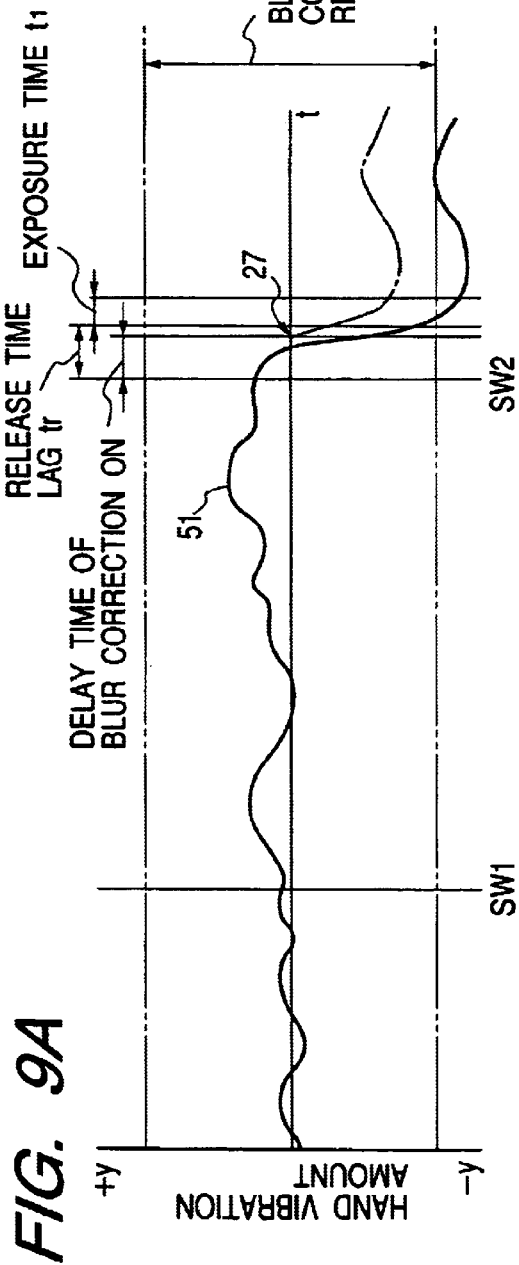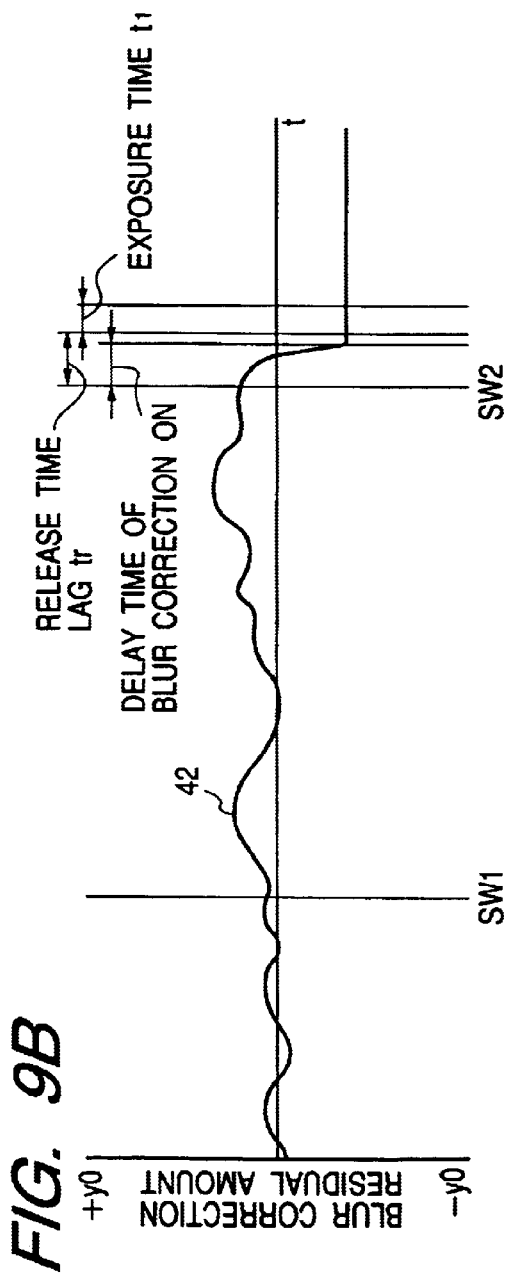

FIG. 27

| | MAIN SWITCH ON | RELEASE OPERATION ELEMENT IN HALF SWITCHING ON (s1) | RELEASE OPERATION ELEMENT IN FULL SWITCHING ON (s2) | DURING EXPOSURE | MAIN SWITCH OFF |
|---|---|---|---|---|---|
| VIBRATION DETECTION SENSOR | ON | ON | ON | ON | OFF |
| BLUR PREVENTION DISPLAY | OFF | ON AFTER DISTANCE MEASURING COMPLETION | ON | OFF AFTER EXPOSURE | OFF |
| BLUR CORRECTION | OFF | CENTERING | ON IN NEEDING BLUR CORRECTION | OFF AFTER EXPOSURE | OFF |

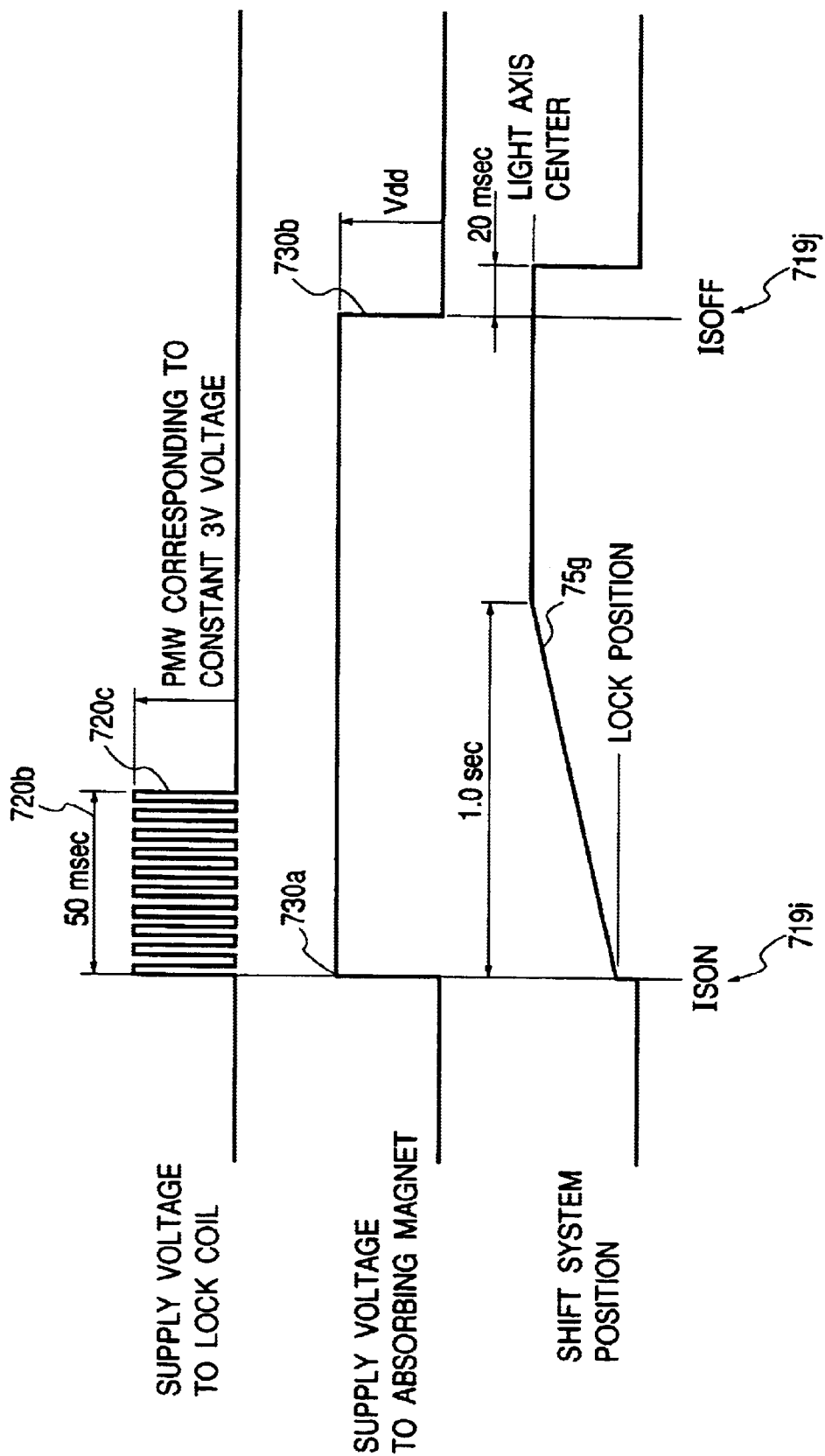

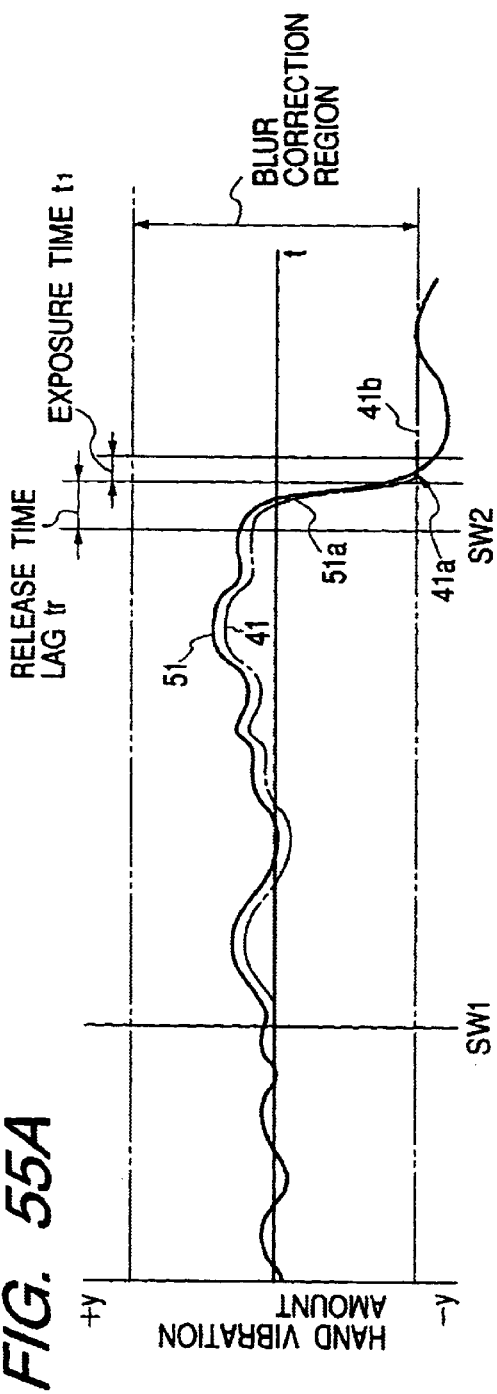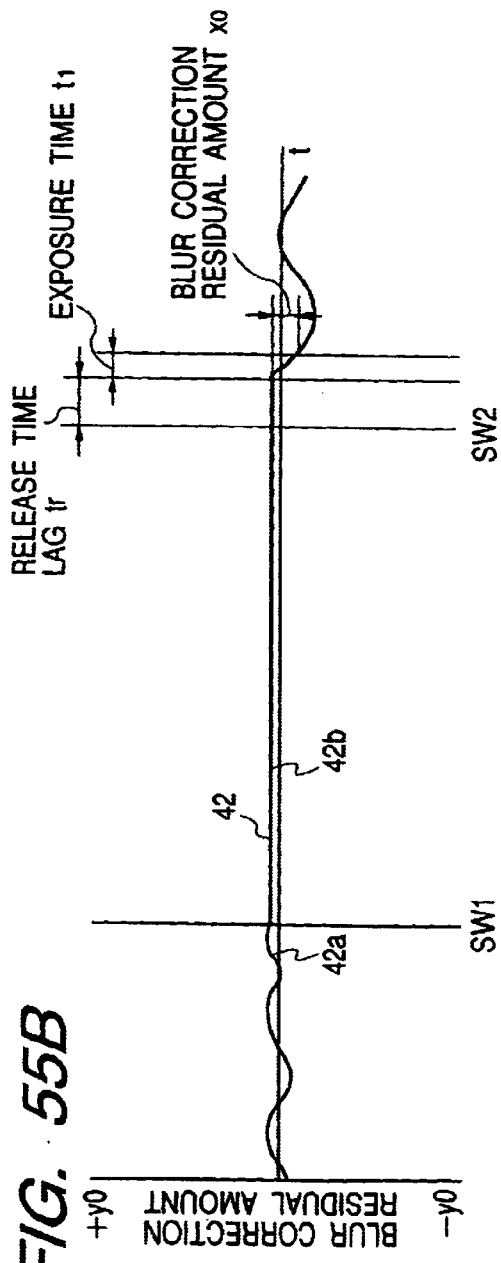

IMAGE BLUR PREVENTION APPARATUS

BACKGROUND OF THE INVENTION

1. Field of the Invention

The present invention relates to an image blur prevention apparatus for preventing an image blur caused by hand vibration or the like in a camera, optical equipment, or the like.

2. Related Background Art

In currently available cameras, all operations important to take a picture, e.g., exposure and focus control, are automatically determined. Therefore, even an unskilled user rarely fails in a photographing operation.

Further, since a system for preventing influence of hand vibration of a photographer on a camera has recently been studied, there are few or no factors causing a failure in a photographing operation by the photographer.

The system for preventing hand vibration will be described here in brief.

In general, hand vibration of the photographer using the camera in a photographing operation falls within a vibration range of 1 Hz to 12 Hz. According to a basic concept of taking a picture without any image blur even when hand vibration is created by the photographer in a shutter release operation of the camera, it is necessary to detect camera vibration (fluctuation) caused by the above hand vibration and displace a correction lens in accordance with the detection value. In order to achieve the above object (i.e., to take a picture without any image blur even with camera vibration), first of all, camera vibration must be accurately detected, and secondly, a change in optical axis due to hand vibration must be corrected.

In principle, detection of this vibration (camera vibration) can be performed by mounting a vibration sensor and a camera vibration detecting means in a camera. The vibration sensor detects an angular acceleration, an angular velocity, an angular displacement, and the like. The camera vibration detecting means electrically or mechanically integrates output signals from the sensor to output an angular displacement. Image blur suppression can then be performed by driving a correction optical apparatus for offsetting the photographic optical axis on the basis of the detection information.

A blur prevention system using a vibration detecting means will be described here with reference to FIG. 38.

FIG. 38 shows an example of a system for suppressing an image blur resulting from vertical camera vibration (fluctuation) 81p and lateral camera vibration (fluctuation) 81y in directions 81 indicated by the arrows in FIG. 38.

Referring to FIG. 38, the system includes a lens barrel 82 and vibration detecting means 83p and 83y for respectively detecting a vertical camera vibration and a lateral camera vibration in vibration detecting directions 84p and 84y. It also includes a correction optical apparatus 85 (coils 87p and 87y for giving a thrust to the correction optical apparatus, and position detection elements 86p and 86y for detecting the position of the correction optical apparatus). The correction optical apparatus 85 has a position control loop to be described later. The correction optical apparatus 85 is driven by using outputs from the vibration detecting means 83p and 83y as target values, thereby stabilizing an image surface 88.

FIG. 39 is an exploded perspective view showing the structure of a suitable blur correction apparatus (as will be described later in detail, which is constructed of a correction means, means for supporting and engaging the correction means, and the like). The structure will be described below with reference to FIGS. 39 to 48.

Three backside lugs (one lug is hidden) of a base plate 71 (also shown in an enlarged view of FIG. 42) are fitted or inserted in a lens barrel, not shown, and a known barrel roller or the like is fixed to the lens barrel by tightening screws into holes 71b.

A bright-plated second yoke 72 as a magnetic material is fixed to the base plate 71 by tightening screws into holes 71c through holes 72a. Permanent magnets (shifting magnets) 73 such as neodymium magnets are magnetically absorbed on the second yoke 72. The permanent magnets 73 are respectively magnetized in directions indicated by the arrows 73a in FIG. 39.

A correction lens 74 is fixed to a support frame 75 (see an enlarged view of FIG. 43) by means of a C ring or the like, and coils 76p and 76y (shifting coils) are forcibly pressed in the support frame 75 (FIG. 43 shows a non-adhesive state). Light-projecting elements 77p and 77y such as IREDs are also adhered to the back face of the support frame 75, and light emitted from the light-projecting elements is incident on position detecting elements 78p and 78y, such as PSDs, to be described later, through slits 75ap and 75ay respectively.

Support balls 79a and 79b each having a round tip, made of POM (polyacetal resin) or the like, and a charge spring 710 are inserted into holes 75b (provided in three places) of the support frame 75 (also see FIGS. 40, 41A and 41B). The support ball 79a is heat-caulked and fixed to the support frame 75 (where the support ball 79b is slidable in a direction to project from the hole 75b against the spring force of the charge spring 710).

FIG. 40 is a transverse sectional view of the blur correction apparatus after assembly. Referring to FIG. 40, the support ball 79b, the charge spring 710 previously charged, and the support ball 79a, are inserted into the hole 75b of the support frame 75 in this order (where the support balls 79a and 79b have the same shape). The surrounding edge 75c of the hole 75b is heat-caulked to prevent the support ball 79a from coming off.

FIG. 41A is a sectional view of the hole 75b taken on a line perpendicular to FIG. 40, and FIG. 41B is a plan view as seen from the direction indicated by the arrow 79c in FIG. 41A. Reference labels A to D in FIG. 41A denote respective depths of regions labeled by A to D in FIG. 41B.

Since the rear ends of vane portions 79aa of the support ball 79a are received in the region with the depth surface A, and movement of the vane portions 79aa is restricted by the depth surface A, the support ball 79a is fixed to the support frame 75 by heat-caulking the surrounding edge 75c.

On the other hand, since the tips of vane portions 79ba of the support ball 79b are received in the region with a depth surface B, the support ball 79b is prevented from passing through the hole 75b in a direction indicated by the arrow 79c due to the spring force of the charge spring 710.

After the correction apparatus has been assembled, since the support ball 79b is received by the second yoke 72 in the manner shown in FIG. 40, the support ball 79b is prevented from getting out of the support frame 75 even when the surface B is not provided. However, the surface B as the region to prevent the support ball 79b from passing through the hole 75b is provided for ease of assembly.

Since drilling of the hole 75b does not need any complicated internal sliding die even when the support frame 75 is made up by molding, and simple split-half dies can be used for molding the support frame 75, the shape of the hole 75*b* of the support frame 75 shown in FIGS. 40, 41A and 41B can be set with high dimensional accuracy.

Thus the support balls 79*a* and 79*b* can be made up as the same parts, so that parts costs can be reduced without any assembly error. This is effective in parts control.

A material such as fluorine base grease is applied to a bearing portion 75*d* of the support frame 75. An L-type shaft 711 (made of non-magnetic stainless steel) is then inserted in the bearing portion 75*d* (see FIG. 39), with the other end of the L-type shaft 711 being inserted into a bearing portion 71*d* formed on the base plate 71 (after applying grease as well). After that, the support balls 79 provided in three places are put together on the second yoke 72, and the support frame 75 is mounted in the base plate 71.

Next, positioning holes 712*a* (provided in three places) of a first yoke 712 shown in FIG. 39 are fitted with respective pins 71*f* (provided in three places) of the base plate 71 shown in FIG. 42. The first yoke 712 is received by receiving surfaces 71*e* (provided in five places) as also shown in FIG. 42, and magnetically coupled to the base plate 71 (by the magnetic force of the permanent magnets 73).

Thus the back face of the first yoke 712 strikes or contacts the support ball 79*a*, and the support frame 75 is held between the first yoke 712 and the second yoke 72, thereby positioning the optical axis.

The contact surfaces of the support balls 79*a* and 79*b* with the first yoke 712 and the second yoke 72 are also covered with grease so that the support frame 75 can slide on the plane perpendicular to the optical axis with respect to the base plate.

In other words, the L-type shaft 711 supports the support frame 75 such that the support frame 75 can slide only in directions indicated by the arrows 713*p* and 713*y* with respect to the base plate 71, thereby restricting or controlling the relative rotation (rolling) of the support frame 75 to rotate about the optical axis with respect to the base plate 71.

A play in fitting the L-type shaft 711 in the bearing portions 71*d* and 75*d* is set larger in the optical axis to prevent duplicative fit with the restrictions in the optical axis caused by holding the support balls 79*a* and 79*b* between the first yoke 712 and the second yoke 72.

The surface of the first yoke 712 is covered with an insulating sheet 714, and a hard substrate 715 having a plurality of ICs (position detecting elements 78*p* and 78*y*, an output amplification IC, a driving IC for coils 76*p* and 76*y*, and the like) is fixed to the w base plate 71 by fitting positioning holes 715*a* (provided in two places) with pins 71*h* (provided in two places) of the base plate 71 as shown in FIG. 42 and tightening screws into holes 71*g* of the base plate 71 through holes 715*b* and holes 712*b* of the first yoke 712.

The position detecting elements 78*p* and 78*y* are put in place with a tool and soldered on the hard substrate 715. A flexible substrate 716 is also mounted on the back face of the hard substrate 715 by heating and pressure-welding a surface 716*a* on an area 715*c* indicated by the broken line (see FIG. 39).

A pair of arms 716*bp* and 716*by* extend from the flexible substrate 716 in respective directions on the plane perpendicular to the optical axis. The arms 716*bp* and 716*by* are then caught by hook portions 75*ep* and 75*ey* (see FIG. 43), and terminals of the light-projecting elements 77*p* and 77*y*, and terminals of the coils 76*p* and 76*y* are soldered.

Thus the light-projecting elements 77*p* and 77*y* such as IREDs and the coils 76*p* and 76*y* are driven by the hard substrate 715 through the flexible substrate 716.

The arms 716*bp* and 716*by* of the flexible substrate 716 respectively have bend portions 716*cp* and 716*cy* (see FIG. 43). The use of elasticity of the bend portions reduces the load on the arms 716*bp* and 716*by* caused by movement of the support frame 75 on the plane perpendicular to the optical axis.

The first yoke 712 has a projection surface 712*c* patterned by rapping. The projection surface 712*c* directly contacts the hard substrate 715 through a hole 714*a* of the insulating sheet 714. On the side of the hard substrate 715, earth (GND: ground) pattern is formed on this contact surface. Thus the first yoke 712 is grounded by screwing the hard substrate 715 to the base plate 71 and is used as an antenna to prevent noise on the hard substrate 715.

A mask 717 shown in FIG. 39 is positioned by the pins 71*h* of the base plate 71 and fixed on the hard substrate 715 with adhesive double coated tape.

A through hole 71*i* for permanent magnets is opened through the base plate 71 (see FIGS. 39 and 42), and the back face of the second yoke 72 is exposed therefrom. A permanent magnet (locking magnet) 718 is incorporated in the through hole 71*i* and magnetically coupled to the second yoke 72 (see FIG. 40).

A coil 720 is adhered to a lock ring 719 (see FIGS. 39, 40 and 44), and a bearing 719*b* is located on the back face of a lug 719*a* of the lock ring 719 (see FIG. 45). Then, an armature pin 712 (see FIG. 39) is inserted into an armature 724 through an armature spring 723 after inserting an armature rubber 722 into the armature pin 722 and the armature pin 722 into the bearing 719*b*, thus fixing the armature 724 by caulking.

The armature 724 can slide in a direction indicated by the arrow 725 with respect to the lock ring 719 against the charge force of the armature spring 723.

FIG. 45 is a plan view of the blur correction apparatus after assembly, which is seen from the backside of FIG. 39. In FIG. 45, the lock ring 719 is mounted in the base plate 71 by a known bayonet coupling technique such that notch portions 719*c* formed (in three places) around the outside diameter of the lock ring 719 are fitted with projections 71*j* formed (in three places) around the inside diameter of the base plate 71, and the lock ring 719 is pressed in the base plate 71 and rotated in the clockwise direction to prevent the lock ring 719 from getting out of the base plate 71.

Thus the lock ring 719 can rotate about the optical axis with respect to the base plate 71. However, the notch portions 719*c* and the projections 71*j* would come to the same positions again while rotating the lock ring 719. To prevent the bayonet coupling from being released, a lock rubber 726 is pressed into the base plate 71 (see FIGS. 39 and 45). The lock rubber 726 restricts the rotation of the lock ring 719 within an angle θ of the notch portion 719*d* (see FIG. 45).

The permanent magnet (locking magnet) 718 is also provided for a locking yoke 727 (see FIG. 39) as a magnetic material, which is mounted on the locking yoke 727 by fitting pins 71*k* of the base plate 71 in holes 727*a* (provided in two places) of the locking yoke 727 (see FIG. 45) and screwing holes 727*b* and 71*n* (both provided in two places).

The permanent magnet 718 on the base plate 71, the permanent magnet 718 on the locking yoke 727, the second yoke 72 and the locking yoke 727 form a known closed magnetic circuit.

The lock rubber 726 is screwed to the locking yoke 727 and prevented from coming off. The locking yoke 727 is not shown in FIG. 45 for the sake of easy understanding of the above description.

A lock spring 728, which is inserted between a hook 719e of the lock ring 719 and a hook 71m of the base plate 71 (see FIG. 45), forces the lock ring 719 to rotate in the clockwise direction. An absorbing coil 730 is inserted into an absorbing yoke 729 (see FIGS. 39 and 45) and screwed in a hole 729 of the base plate 71.

The terminal of the coil 720 and the terminal of the absorbing coil 730 are formed into a twisted pair, e.g., of tetrone coated four-twisted wires, and soldered to a basic portion 716d of the flexible substrate 716.

The above-described mechanisms in the blur correction apparatus are roughly divided into three means, i.e., a correction means for offsetting the optical axis, a means for supporting the correction means and a means for engaging the correction means.

The correction means is made up of the lens 74, the support frame 75, the coils 76p and 76y, the IREDs 77p and 77y, the position detecting elements 78y and 78y, the ICs 731p and 731y, the support balls 79a and 79b, the charge spring 710 and the support shaft 711. The support means is constituted of the base plate 71, the second yoke 72, the permanent magnets 73 and the first yoke 712. The lock means is constituted of the permanent magnet 718, the lock ring 719, the coil 720, the armature shaft 721, the armature rubber 722, the armature spring 723, the armature 724, the lock rubber 726, the yoke 727, the lock spring 728, the absorbing yoke 729 and the absorbing coil 730.

Among such elements constituting the correction means, the lens 74 and the support frame 75 form a correction optical system; the PSDs 78p and 78y, the ICs 731p and 731y, and the IREDs 77p and 77y form a position detecting means; and the coils 76p and 76y, the second yoke 72, the permanent magnets 73 and the first yoke 712 form a driving means. The correction means is constructed by the combination of the correction optical system, the position detecting means and the driving means for driving the correction optical system.

A blur prevention system (blur prevention apparatus) is then constituted of the blur correction apparatus, the vibration detecting means (see FIG. 38) and a calculation means to be shown below in FIG. 46.

The ICs 731p and 731y on the hard substrate 715 are used for amplifying outputs of the position detecting elements 78p and 78y, respectively, and internal arrangements thereof are shown in FIG. 46 (since the ICs 731p and 731y have the same circuit structure, FIG. 46 shows only the IC 731p).

In FIG. 46, current-voltage conversion amplifiers 731ap and 731bp convert photoelectric currents 78i1p and 78i2p, caused by the light-projecting element 77p and flowing through the position detecting element 78p (consisting of resistors R1 and R2), into respective voltages. A differential amplifier 731cp calculates and amplifies a difference between outputs of the current-voltage conversion amplifiers 731ap and 731bp.

As discussed above, although light emitted from the light-projecting elements 77p and 77y is incident on the position detecting elements 78p and 78y via the slits 75ap and 75ay, when the support frame 75 moves on the plane perpendicular to the optical axis, the incident positions on the position detecting elements 78p and 78y vary.

The position detecting element 78y is sensitive to light in a direction indicated by the arrow 78ap (see FIG. 39). The slit 75ap has a shape to expand a beam of light in a direction perpendicular to that indicated by the arrow 78ap (i.e., to expand it in a direction indicated by the arrow 78ay) and focus the beam in the direction indicated by the arrow 78ap. Therefore, only the movement of the support frame 75 in a direction indicated by the arrow 713p changes a balance between the photoelectric currents 78i1p and 78i2p in the position detecting element 78p, and the differential amplifier 731cp sends an output in accordance with the movement of the support frame 75 in the direction of the arrow 731p.

On the other hand, since the position detecting element 78y has detection sensitivity in the direction of the arrow 78ay (see FIG. 39) and the slit 75y has a shape extending in a direction perpendicular to that of the arrow 78ay (i.e., extending in the direction of the arrow 78ap), the position detecting element 78y changes its output only when the support frame 75 moves in the direction indicated by the arrow 713y.

An addition amplifier 31dp calculates the sum of outputs of the current-voltage conversion amplifiers 731ap and 731bp (the total sum of light receiving amounts in the position detecting element 78p) to output a signal. A driving amplifier 731ep receives the signal and drives the light-projecting element 77p in accordance with the signal.

The light-projecting element 77p is very sensitive to temperature: its light projecting amount, and hence the absolute magnitude of the photoelectric currents 78i1p and 78i2p (78i1p+78i2p) in the position detecting element 78p, changes unstably. For this reason, the output of the differential amplifier 831cp (78i1p−78i2p) indicative of the position of the support frame 75 is also varied.

However, the light-projecting element 77p can be controlled by the driving circuit such that the total sum of light receiving amounts is kept constant, thereby preventing output variations in the differential amplifier 731cp.

The coils 76p and 76y shown in FIG. 39 are located inside the closed magnetic circuit consisting of the permanent magnets 73, the first yoke 712 and the second yoke 72. The support frame 75 is driven in the direction of the arrow 713p by permitting current to flow through the coil 76p (known Fleming's left-hand rule) and in the direction of the arrow 713y by permitting current to flow through the coil 76y.

In general, when outputs of the position detecting elements 78p and 78y are amplified at the ICs 731p and 731y and the coils 76p and 76y are driven in accordance with the outputs, the support frame 75 is driven to vary outputs of the position detecting elements 78y and 78y.

If the driving directions (polarities) of the coils 76p and 76y are set such that outputs of the position detecting elements 78p and 78y become small (negative feedback), the support frame 75 will be stabilized by the driving force of the coils 76p and 76y in a position in which the outputs of the position detecting elements 78p and 78y almost become zero.

Such a driving technique for performing driving via a negative feedback of the position detection outputs is called a position control technique. For example, if an external target value (e.g., an angle of hand vibration signal) is mixed in the ICs 731p and 731y, the support frame 75 will be driven very faithfully in accordance with the target value.

In actual practice, outputs of the differential amplifiers 731cp and 731cy are sent to a main substrate, not shown, via the flexible substrate 716, subjected to an analog/digital conversion (A/D conversion), and taken into a microcomputer.

In the microcomputer, the outputs are compared with the target value (angle of hand vibration signal) and amplified properly, and subjected to phase lead compensation (for more stable position control) by a known digital filtering technique. Then the outputs are passed through the flexible substrate 716 again and input to an IC 732 (for driving the coils 76p and 76y). The IC 732 performs a known PWM (pulse width modulation) driving of the coils 76p and 76y on the basis of the input signal to drive the support frame 75.

As discussed above, the support frame 75 is slidable in the directions of the arrows 713p and 713y, and is kept in a stable position by the above position control technique. However, it is difficult for consumer optical equipment such as cameras to control the support frame 75 constantly because of a need to avoid extra power consumption.

Further, the support frame 75 can move freely on the plane perpendicular to the optical axis in an uncontrolled state. It is therefore necessary to avoid generation of collision sound or damage to stroke ends.

As shown in FIGS. 45, 46, 47A and 47B, three radial projections 75f are provided on the backside of the support frame 75, with the tips of the projections 75f being fitted with an inner edge surface 719g of the lock ring 719 in a manner shown in FIGS. 47A and 47B. Thus the support frame 75 is restricted in all directions with respect to the base plate 71.

FIGS. 47A and 47B are plan views showing an operational relationship between the lock ring 719 and the support 75, in which only the main parts are extracted from the plan view of FIG. 45. For the sake of easy understanding of the description, the layout is somewhat different from that of an actual assembly. For the same purpose, cam portions 719f (in three places and shown in FIGS. 40 and 44) of the lock ring 719 are shown though they are not provided all over the bus line of the cylinder of the lock ring 719 and are actually not seen from the direction of FIG. 45.

As shown in FIG. 40, the coil 720 (with four-twisted-wire outgoing lines 720a, that are passed through the outer edge of the lock ring 719 via a flexible substrate or the like, not shown, and connected from the terminal 719h to the terminal 716e on the basic portion 716d of the flexible substrate 716) is located inside the closed magnetic circuit between the permanent magnets 718. A flow of current causes the coil 720 to create a torque to rotate the lock ring 719 about the optical axis.

The driving of the coil 720 is also controlled by a command signal input from an unillustrated microcomputer through the flexible substrate 716 to a driving IC 733 on the hard substrate 715. In other words, the IC 733 performs PWM driving of the coil 720.

In FIG. 47A, the winding direction of the coil 720 is set such that a counterclockwise torque is allowed on the lock ring 719 when the coil 720 is energized. Thus the lock ring 719 can rotate in the counterclockwise direction against the spring force of the lock spring 728.

Before the coil 720 is energized, the lock spring 728 forces the lock ring 719 to be in stable contact with the lock rubber 726.

When the lock ring 719 rotates, the armature 724 strikes the absorbing yoke 729. At this time, the armature spring 723 is compressed to equalize the position between the absorbing yoke 729 and the armature 724. After that, the lock ring 719 stops rotating as shown in FIG. 47B.

FIG. 48 is a timing chart showing a driving operation of the lock ring.

In FIG. 48, the coil 720 is energized (PWM driving as indicated by 720b) at a timing indicated by the arrow 719i, and simultaneously, the absorbing magnet 730 is energized (730a). Consequently, the armature 724 strikes the observing yoke 729 and is absorbed by the observing yoke 729 after equalization.

When stopping to the energizing of the coil 720 at point 720c, the lock spring 728 tends to force the lock ring 719 to rotate in the clockwise direction, but the rotation of the lock ring 719 is restricted because the armature 724 is absorbed by the observing yoke 729 in the manner described above. Since the projections 75f of the support frame 75 are respectively located in positions opposite to cams 719f (the cams 719 rotate and come to the positions), the support frame 75 can move the distance in a clearance between the projection 75f and the cam 719f.

Thus the support frame 75 moves downward in a direction of gravity G (see FIG. 47B), but never falls because the support frame 75 also enters a controlled state at the point indicated by the arrow 719i in FIG. 48.

Although the support frame 75 is restricted and retained by the inner edge of the lock ring 719, it actually has play corresponding to that in the fit between projections 75f and the inner edge wall 719g. In other words, the support frame 75 moves downward by an amount of the play in the direction of gravity G and deviates its center from that of the base plate 71. For this reason, the support frame 75 under control is shifted to the center of the base plate 71 (light axis center) gently in a time period from the point 719i, e.g., one second.

Such slow shifting is needed because the photographer may find an image blur through the correction lens 74 and feel uncomfortable when the support frame 75 is shifted rapidly, and there is a need to prevent deterioration of the image due to shift of the support frame 75 even when an exposure operation is performed during this period (e.g., the support frame 75 is shifted by 5 μm for ⅛ sec.).

More specifically, outputs of the position detecting elements 78p and 78y at the point 719i are memorized as target values. The support frame 75 is controlled on the basis of the target values and shifted one second to the light axis center as a target value previously set (see 75g in FIG. 48).

After that, the lock ring 719 is rotated (to enter an unlock state), and the support frame 75 is driven to start a vibration preventing operation on the basis of the target value from the vibration detecting means (along with the operation for shifting the center position of the support frame 75).

To finish the vibration prevention, the vibration prevention system is turned off at the point 719i so that the target value from the vibration detecting means cannot be input to the correction driving means for driving the correction means, thereby controlling the support frame 75 to stop in the center position. When stopping the energizing of the absorbing coil 730 at this timing (730b), the armature 724 is released from the absorbing force of the absorbing yoke 729, and the lock ring 719 is rotated clockwise by the lock spring 728 to return to the state shown in FIG. 47A. Since the lock ring 719 strikes the lock rubber 726 and the rotation thereof is restricted by the lock rubber 726, the collision sound of the lock ring 719 is reduced at the end of the rotation.

After that (e.g., after 20 msec.), the correction driving means under control is released, and the timing chart of FIG. 48 is ended.

FIGS. 49 to 51 show a blur prevention system, in which FIG. 49 is a block diagram showing a general structure, and FIGS. 50 and 51 are block diagrams showing detailed arrangements of respective means. More specifically, means lined up in the upper row of FIG. 49 are shown in FIG. 50 and means lined up in the lower row of FIG. 49 are shown in FIG. 51. To clarify the connections between means on the upper side and means on the lower side, symbols a to g are given to respective signal lines.

In these drawings, a vibration detecting means 91 corresponds to the vibration detecting means 83$p$ and 83$y$ in FIG. 38, which is constituted of a vibration detection sensor such as a vibration gyro for detecting an angular velocity, and a sensor output calculating means for cutting a DC component of an output of the vibration detection sensor and integrating the output to achieve an angular displacement.

The angular displacement signal from the vibration detecting means 91 is input to a target value setting means 92. The target value setting means 92 is constituted of a variable differential amplifier 92$a$ and a sample hold circuit 92$b$ as shown in FIG. 51. Since the sample hold circuit 92$b$ is normally in a sampling state, signals at both inputs of the variable differential amplifier 92$a$ are equal to each other at all times and an output thereof becomes zero. However, when the sample hold circuit 92$b$ enters a hold state in accordance with an output of a delay means 93 to be described later, the variable differential amplifier 92$a$ starts outputting in succession from zero at that time.

The amplification factor of the variable differential amplifier 92$a$ can vary according to the output of a blur preventing sensitivity setting means 94. Although the target value signal from the target value setting means 92 is a target value (command signal) which a correction means 910 can follow, since the correction amount of the image surface (blur preventing sensitivity) to the driving amount of the correction means 910 varies according to optical characteristics based on changes in focal point such as zooming and focusing, changes in blur preventing sensitivity must be compensated. This is the reason the amplification factor of the variable differential amplifier 92$a$ is variable.

As shown in FIG. 50, the blur preventing sensitivity setting means 94 receives zooming focal-distance information from a zooming information output means 95 and focusing focal-distance information based on distance measuring information of an exposure preparing means 96. The blur preventing sensitivity is calculated on the basis of the information or blur prevention sensitivity information previously set is extracted on the basis of the above information to change the amplification factor of the variable differential amplifier 92$a$ in the target value setting means 92.

A correction driving means 97 corresponds to the ICs 731$p$, 731$y$ and 732 on the hard substrate 715 of FIG. 39, to which the target value from the target value setting means 92 is input as a command signal.

A correction start up means 98 is a switch for controlling connections of the IC 732 on the hard substrate 75 of FIG. 39 to the coils 76$p$ and 76$y$ in the correction means 910. As shown in FIG. 51, a switch 98$a$ is normally connected to a terminal 98$c$ so that both ends of each of the coils 76$p$ and 76$y$ will be short-circuited. When a signal is input from a logical multiplying means 99, the switch 98$a$ is connected to a terminal 98$b$ so that the correction means 910 can enter the controlled state (blur correction has not been performed yet, but the coils 76$p$ and 76$y$ are supplied with power to stabilize the correction means 910 in a position in which the signals from the position detecting elements 78$p$ and 78$y$ almost become zero). At this time, the output signal from the logical multiplying means 99 is also input to an engagement means 914 to release the correction means 910 from the engagement.

The correction means 910 inputs position signals from its position detecting elements 78$p$ and 78$y$ to the correction driving means 97 so that the position control can be performed in the manner described above.

When both an SW1 signal caused by half switching on a release button of a releasing means 911 and an output signal from a blur prevention switching means 912 are input, the logical multiplying means 99 outputs a signal from an AND gate 99$a$ (see FIG. 50) as an element thereof. As shown in FIG. 51, when a blur prevention switch in the blur prevention switching means 912 is operated and the release button is half switched on by the photographer, the correction means 910 is released from the engagement and enters the controlled state.

As shown in FIGS. 49 and 50, the SW1 signal caused by half switching on the release button of the release means 911 is input to the exposure preparing means 96 to perform photometry, measure a distance and drive lens focusing. Thus focusing information is obtained and input to the blur preventing sensitivity setting means 94.

The delay means 93 receives the output signal from the logical multiplying means 99, and outputs it after one second to make the target value setting means 92 output the target value signal in the manner described above.

As is not shown here, the vibration detecting means 91 is started in synchronism with the SW1 signal caused by half switching on the release means 911. As discussed above, sensor output calculation via a large time-constant circuit such as an integrator takes time to some extent from starting until the output is stabilized.

The delay means 93 serves to output the target value signal after waiting to stabilize the output of the vibration detecting means 91. The delay means 93 starts blur prevention after the output of the vibration detecting means 91 is stabilized.

An exposure means 913 performs a mirror-up operation in response to input of an SW2 signal caused by a full switching (complete pushing) on operation of the releasing means 911, opens and closes a shutter at a shutter speed determined based on a photometric value of the exposure preparing means 96 to control exposure, and performs a mirror-down operation to finish all the photographing operations.

After the end of the photographing operations, when the photographer releases the releasing means 911 to turn off the SW1 signal, the logical multiplying means 99 stops outputting the signal, the sample hold circuit 92$a$ in the target value setting means 92 enters a sampling state, and the output of the variable differential amplifier 92$a$ becomes zero. Thus the correction means 910 returns to the controlled state in which correction driving is stopped.

When the output of the logical multiplying means 99 is turned off, the engagement means 914 engages the correction means 910. After that, the switch 98$a$ in the correction driving means 98 is connected to the terminal 98$c$ to inhibit the correction means 910 from being controlled.

A timer, not shown, controls the vibration detecting means 91 to continue its operation for a fixed time period (e.g., five seconds) after the operation of the releasing means 911 has been stopped. The photographer often performs another release operation continuously after stopping the last release operation. It is therefore necessary to prevent the vibration detecting means 91 from being started up every time and hence to reduce waiting or stand-by time before stabilization. This is the reason the vibration detecting means 91 is set to continue its operation for a fixed period of time. When the vibration detecting means 91 has already been started up, the vibration detecting means 91 sends the delay means 93 a start-settled signal to reduce the delay time.

FIG. 52 is a flowchart showing a sequence of operating steps in a case where a microcomputer processes the above operations. The description will be made below in brief.

When power is connected to a camera, the microcomputer checks the status of the blur prevention switch. If the switch is on-state, it is next checked whether or not the SW1 signal caused by half switching on the releasing means 911 is generated (steps #5001 to #5002). If the SW1 signal has been generated, an internal timer is started (step #5003). Next, to enable photometry, distance measuring and vibration detection start, and the correction means 910 to perform blur prevention control, the correction means 910 is released from the engagement (step #5004).

It is then checked whether or not time counted by the timer has reached a predetermined time t1. If not reached, this step is repeated until it reaches the time t1 (step #5005). As discussed above, this processing step is to wait until the sensor output is stabilized. When the predetermined time t1 has elapsed, the correction means 910 is driven on the basis of a target value signal to start blur prevention control (step #5006).

It is next checked whether or not the SW2 signal caused by full switching on the releasing means 911 is generated (step #5007). If not generated, it is checked again whether or not the SW1 signal is generated, and if even the SW1 signal has not been generated (i.e., if NO in step #5008), the blur prevention control is stopped and the correction means 910 is engaged in a predetermined position (steps #5011 to #5012).

When the SW2 signal is not generated but the SW1 has already been generated, a loop of operating steps #5007→#5008→#5007 is repeated. During this repetition, if the SW2 signal is generated due to full switching on of the releasing means 911 (i.e., if YES in step #5007), a film is exposed (step #5009). A state of the SW1 signal is then checked (step #5010), and if the SW1 signal is no longer generated, the blur prevention control is stopped and the correction means 910 is engaged in a predetermined position (steps #5011 to #5012).

When the above operating steps are completed, the timer is restarted after reset once (#5013), and it is checked whether or not the SW1 signal is generated within a predetermined time period (five seconds in this example) (loop of steps #5014→#5015→#5014). If the SW1 signal is generated within five seconds after the blur prevention control has been stopped (i.e., if YES in step #5015), photometry and distance-measuring operations are performed and the correction means 910 is released from the engagement (step #5016). Since vibration detection continues, the correction means 910 under control is driven at once on the basis of the target value signal (step #5006), and the same operating steps as described above are repeated after that.

As described above, such an operation allows the photographer to perform another release operation continuously after stopping the last release operation without restarting the vibration detecting means 91 and waiting for stabilization of the output each time a release operation is performed.

On the other hand, if the SW1 signal has not been generated within five seconds after the blur prevention control has been stopped (i.e., if YES in step #5014), vibration detection is stopped (i.e., driving of the vibration detecting means 91 is stopped) (step #5017). Then, the operation-returns to step #5001 and the blur prevention switch enters the On-waiting state.

In general, deterioration of an image due to hand vibration becomes large when a focal distance of the camera is long (e.g., 200 mm or tele-operate zooming in the case of a camera with a zoom lens) or when the shutter speed is slow (e.g., ⅛ sec. exposure time).

The magnitude of hand vibration (hand vibration amount or hand vibration speed) is also undefined, and it is different between the time the photographer takes a posture with the camera aiming at a photographic object and the time the photographer operates an operation element of the camera.

Now, assume that the photographer takes a posture with a camera 61 such as one shown in FIG. 53 aiming at a photographic object, and strongly presses a release button 61a in a direction indicated by the arrow 62 for taking a picture.

This pressing force causes the camera 61 to shift in a direction of the arrow 63 and rotate in a direction of the arrow 64. FIG. 54 shows a vibration waveform recorded in this situation;

In FIG. 54, the abscissa indicates time (elapsed time since the photographer began to take a posture with the camera) and the ordinate indicates hand vibration amount. SW1 is a signal for photometry and distance measuring, which is caused by half switching on the release button 61a, and SW2 is a signal for exposure, which is caused by full switching on the release button 61a. The exposure operation is started a predetermined time after the SW2 signal is generated. A fixed time period (response delay time) existing between the time the SW2 signal is generated and the time actual exposure is performed is described as "release time lag" and represented by Tr.

As is apparent from a vibration waveform 51, a large vibration 51a appears after generation of the SW2 signal. This is caused by a vibration of the camera due to a strong pressing force exerted on the release button 61a. Since the SW1 signal is supplied by half switching on the release button, the photographer pays attention to degree of the pressing force (to prevent the SW2 signal from being generated by strongly pressing the release button), and a considerable increase in hand vibration amount does not appear during this half switching-on operation.

As discussed above, a release operation for exposure can cause a large vibration. Even if hand vibration, for example, caused when the photographer takes a position with a camera set in the short focal distance (wide-operate zooming), does not effect an image very much, deterioration of the image or an image blur caused by the release operation causes a problem.

Next, assume that blur correction is performed using the above blur prevention system.

FIG. 55A is a graph in which an effect of the correction means is overlapped on the hand vibration waveform 51 in FIG. 54, indicating its driving waveform by a curve 41. The correction-means starts driving at the time of generation of the SW1 signal, and faithfully follows changes in hand vibration to be offset. Since the correction stroke of the correction means is restricted mechanically (within a blur correcting region 43), the correction means reaches the correction stroke end at a point indicated by the arrow 41a. For this reason, a blur due to a large vibration after generation of the SW2 signal cannot be corrected any longer.

FIG. 55B is a graph showing a difference between the actual hand vibration waveform 51 of FIG. 55A and the correction means driving waveform 41, i.e., showing a waveform 42 indicative of a blur correction residual amount. The waveform 42 is kept flat without any blur correction residue from the time the SW1 signal is generated (because there is no change in blur correction residue even when a photographing operation is performed during this period). After full switching on of the release button 61a, i.e., after generating the SW2 signal, the correction means fully operates to correct a large blur but stops the blur correction when it has reached the stroke end. Thus a blur correction residual amount $X_0$ appears during this period as shown in FIG. 55B.

Unfortunately, most cameras are designed to begin an exposure operation with a delay (release time lag Tr) after generation of the SW2 signal. In a photographing operation using such a camera, a large blur is created at this time (the camera is largely displaced during the time period from the time the SW2 signal is generated until exposure is started). In many cases, the correction means reaches the stroke end during this period and blur correction cannot be performed any longer at the actual exposure time.

In addition to the system in which blur correction is started at generation of the SW1 signal, another system designed to start blur correction at the time of generation of the SW2 signal has also been proposed.

However, even if the blur correction has an initial position at the time of generation of the SW2 signal, since a large blur is caused after the SW2 signal is generated, it would be difficult to prevent such an accident as the correction means reaches the correction stroke end during the exposure time.

SUMMARY OF THE INVENTION

In one aspect of the present invention, there is provided an apparatus for an image blur correction device applied to a camera, which comprises an operation means for starting an image blur correction operation of the image blur correction device in accordance with predetermined actions to start a photographing operation of the camera; and a variable means for causing the operation means to change, in accordance with either the exposure time in the photographing operation of the camera or the focal distance in the photographing operation of the camera, timing of the image blur correction device to start the image blur correction operation in accordance with the predetermined actions to start the photographing operation, wherein the timing of the image blur correction device to start the image blur correction operation is changed in correspondence to a degree of influence of a camera fluctuation (the degree varying according to the exposure time or the focal distance) caused by the predetermined actions to start the photographing operation of the camera.

In another aspect of the present invention, there is provided an apparatus for an image blur correction device applied to a camera, which comprises an operation means for starting an image blur correction operation of the image blur correction device in accordance with predetermined actions to start a photographing operation of the camera; and a variable means for setting a blur correction operation starting timing for the operation means to switch controls of the operation means between a first operation starting control to start the image blur correction operation at first timing in accordance with the predetermined actions to start the photographing operation and a second operation starting control to start it at second timing different from the first timing, the timing of starting the image blur correction operation being set to start the image blur correction operation prior to start of actual exposure irrespective of the first operation starting control or the second operation starting control, wherein the variable means switches the timings of starting the image blur correction operation at least between the first and second timings in accordance with various conditions so that the exposure operation of the camera can be started in the condition that the image blur correction has already been performed irrespective of the first timing or the second timing.

In another aspect of the present invention, there is provided a camera comprising a release operation unit; an operation means for starting an exposure operation in accordance with a predetermined action of the release operation unit and starting actual exposure with a release time lag after the predetermined action; and a variable means for varying the release time lag in accordance with at least either the exposure time in a photographing operation of the camera or the focal distance in the photographing operation of the camera, wherein the release time lag is changed in correspondence to a degree of influence of a camera fluctuation (the degree varying according to the exposure time or the focal distance) caused by predetermined actions to start the photographing operation of the camera.

In another aspect of the present invention, there is provided an apparatus for an image blur correction device applied to a camera with an operation unit performing a first operation for starting a photographing preparing operation and a second operation for starting a photographing operation, which comprises a determination means for determining a difference in operate time between the first operation and the second operation; and a control means, in accordance with the determination by the determination means, for carrying out, corresponding to the difference determined by the determination means, (1) determination of whether the image blur correction device is in an operating state or non-operating state, (2) determination of whether to cause the image blur correction device to perform the image blur correction operation in a first manner or a second manner different from the first manner, or (3) control of predetermined indications related to the image blur or (4) varying a time from the second action to a start of actual exposure, wherein it is determined how large a camera fluctuation is on the basis of the difference in operate time between the first operation and the second operation, the camera fluctuation being caused by predetermined actions to start the photographing operation of the camera (and degree of the fluctuation varying depending on the difference in operate time between the first operation and the second operation), such that the release time lag is changed in accordance with the determination.

BRIEF DESCRIPTION OF THE DRAWINGS

FIGS. 6A and 6B are graphs showing a blur correction waveform recorded at the time of blur correction of the camera according to the second embodiment of the present invention;

FIGS. 7A and 7B are graphs showing a blur correction waveform in the camera according to the second embodiment of the present invention, where the blur correction operation is performed at a shutter speed and a focal distance, that are hardly affected by hand vibration of the photographer;

FIGS. 8A and 8B are graphs showing a blur correction waveform in the camera according to the second embodiment of the present invention, where the correction means is returned to an initial position at the time of generation of the SW2 signal;

FIGS. 9A and 9B are graphs showing a blur correction waveform in the camera according to the second embodiment of the present invention, where the camera starts blur correction at the time of generation of the SW2 signal;

FIG. 27 is a table showing the relationship between sequences in the camera of FIG. 22 and the blur prevention system;

FIG. 48 is a timing chart showing a signal waveform recorded at the time of driving the lock ring of FIG. 39;

FIGS. 55A and 55B are graphs for explaining problems with the conventional camera, which show waveforms recorded at the time of blur correction.

DETAILED DESCRIPTION OF THE PREFERRED EMBODIMENTS

The present invention will be described below with respect to embodiments shown in the accompanying drawings.

First Embodiment

Figure 1:
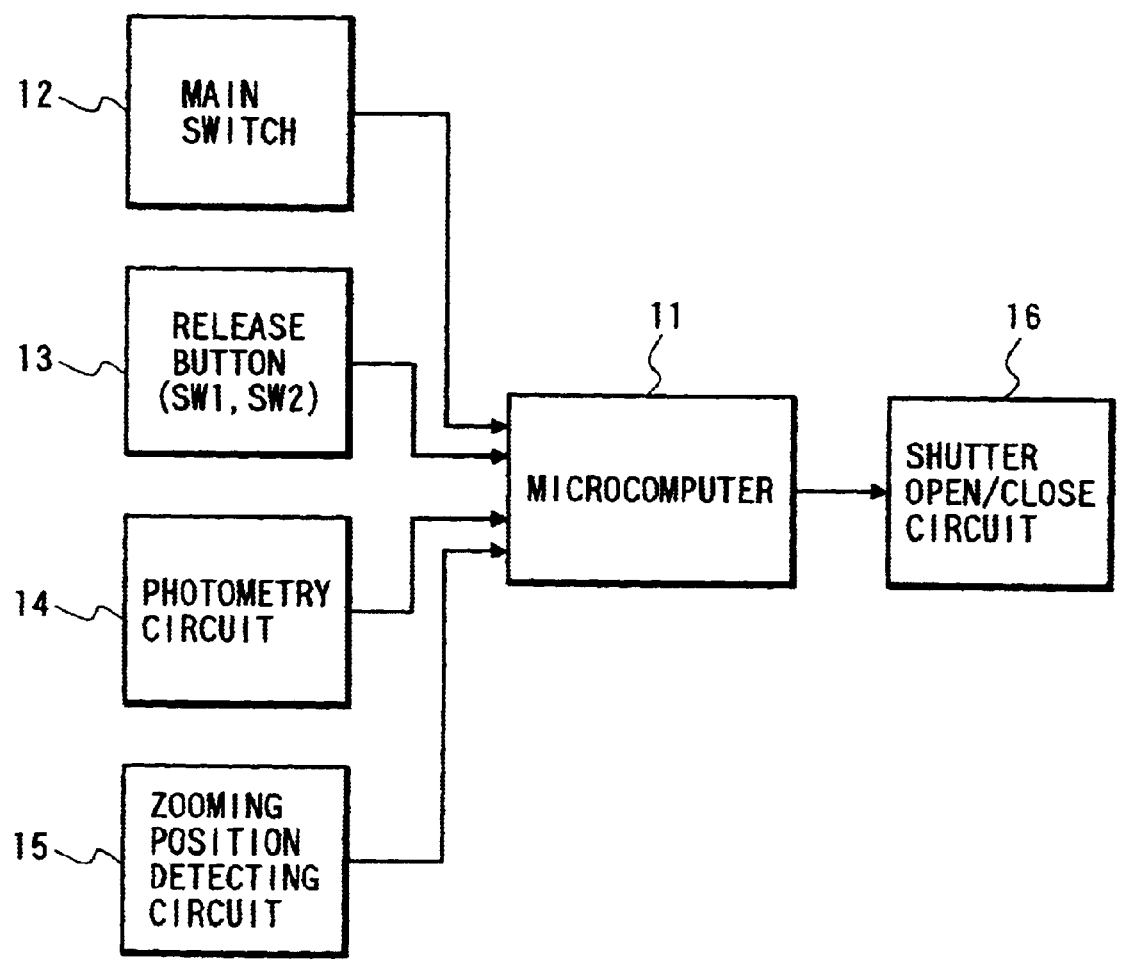
FIG. 1 is a block diagram showing an electrical arrangement of the main part of a camera according to a first embodiment of the present invention.

FIG. 1 is a block diagram schematically showing a structure of a camera according tb the first embodiment of the present invention. A microcomputer 11 receives various signals such as a status signal for a main switch 12 in the camera, an SW1 signal (for photometry and distance measuring) and an SW2 signal (exposure starting signal), each of which is generated by half or complete (full) switching on of a release button 13, a distance-measuring information from a photometry circuit 14 and a zooming information (also referred to as focal distance information) from a zooming position detecting circuit 15. The microcomputer 11 computes a shutter speed from the photometry information and the like, and controls opening and closing of a shutter, not shown, through a shutter open/close circuit 16 in synchronism with the SW2 signal.

The microcomputer 11 also receives other information, such as AF information, in addition to the information shown in FIG. 1, and controls other elements such as a lens driving motor, film feeding motor and a stroboscope device on the basis of these other information. However, the present invention does not directly relate to such control and the description is omitted here.

Figure 2:
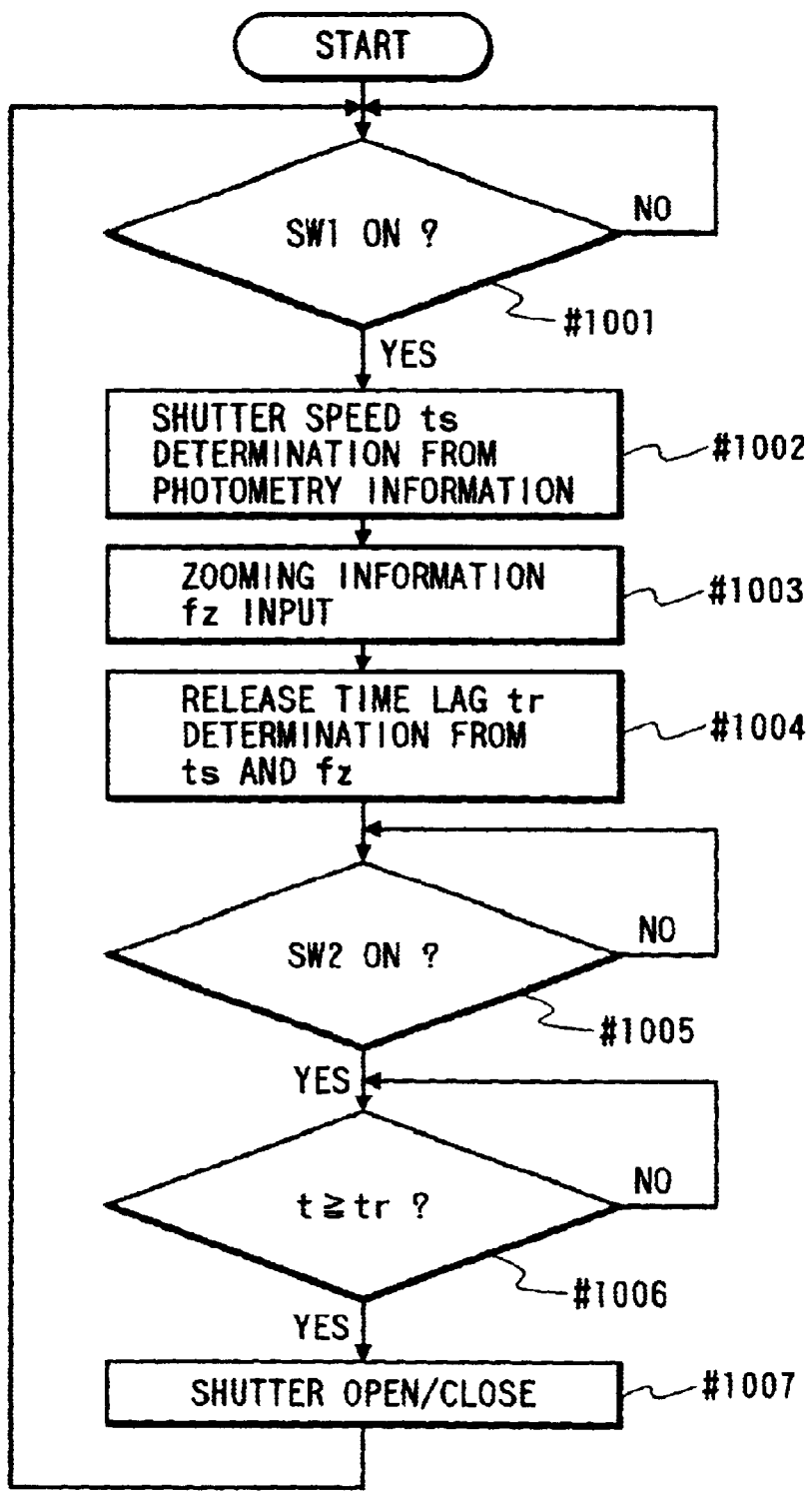
FIG. 2 is a flowchart showing an operation of the main part of the camera according to the first, embodiment of the present invention.

FIG. 2 is a flowchart showing an outline of camera operation, where AF processing and the like are omitted.

When the main switch 12 in the camera is turned ON, the microcomputer 11 starts its operation from step #1001 in FIG. 2.

In step #1001, it is determined whether or not the SW1 signal is generated by half switching on the release button 13. If the SW1 signal has not been generated yet, the microcomputer waits for the SW1 signal at this step (other control such as charge on the stroboscope device or zooming is performed during this time). When the microcomputer 11 detects that the SW1 signal has been generated, it goes to step #1002. In step #1002, photometry information is input from the photometry circuit 14 and a shutter speed ts is computed on the basis of the photometry information. In the next step #1003, zoom information fz is input from the zooming position detecting circuit 15.

In the subsequent step #1004, an acceptable vibration amount is determined from the shutter speed ts and the focal distance fz. For example, a value is calculated from an equation "fz×ts" ("0.8" is obtained for a focal distance of 200 mm and a shutter speed of 1/250 sec. and "25" for a shutter speed of 1/8 sec.). Then, a degree of influence of hand vibration on an image is determined by the value. In this case, the former hardly deteriorates the image, whereas the latter corresponds to a need to pay attention to the image deterioration. Finally, a release time lag tr is determined by the value. For example, the release time lag tr is set equal to 50 msec. for the value "0.8" and to 300 msec. for the value "25".

A reason for this will be described below.

Figure 54:
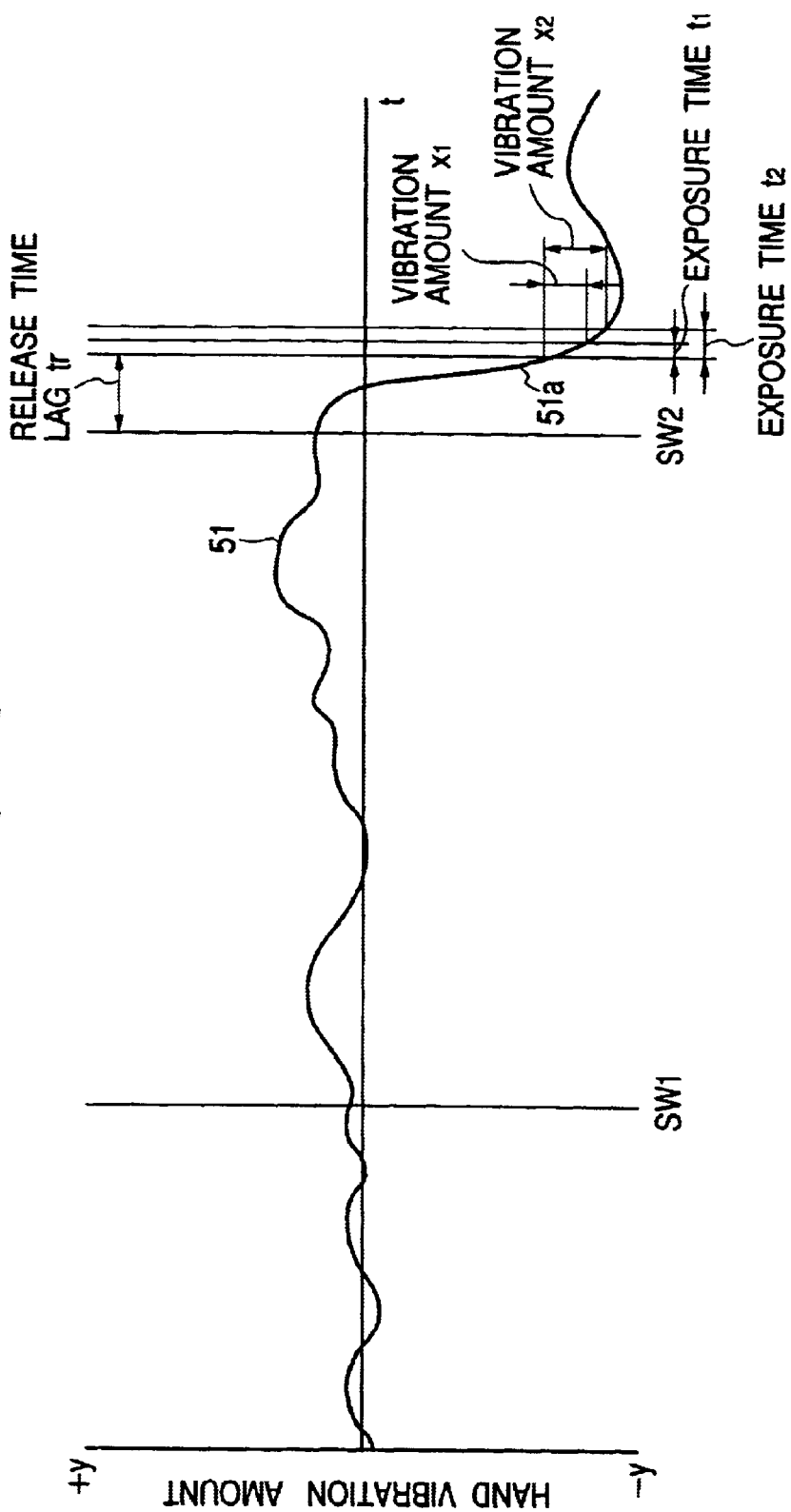
FIG. 54 is a graph showing a hand vibration waveform and a driving waveform of the correction means in the camera of FIG. 53.

In FIG. 54, as discussed above, the large vibration 51a appears after the SW2 signal has been generated. The vibration deteriorates the image by a vibration amount x1 in an exposure time t1 and by a vibration amount x2 in an exposure time t2. That is, the longer the shutter speed (exposure time) (or the longer the focal distance), the larger the image deterioration.

In FIG. 54, the image deterioration existing in the exposure time t1 is acceptable, whereas the image deterioration existing in the exposure time t2 exceeds the acceptable range.

Figure 3:
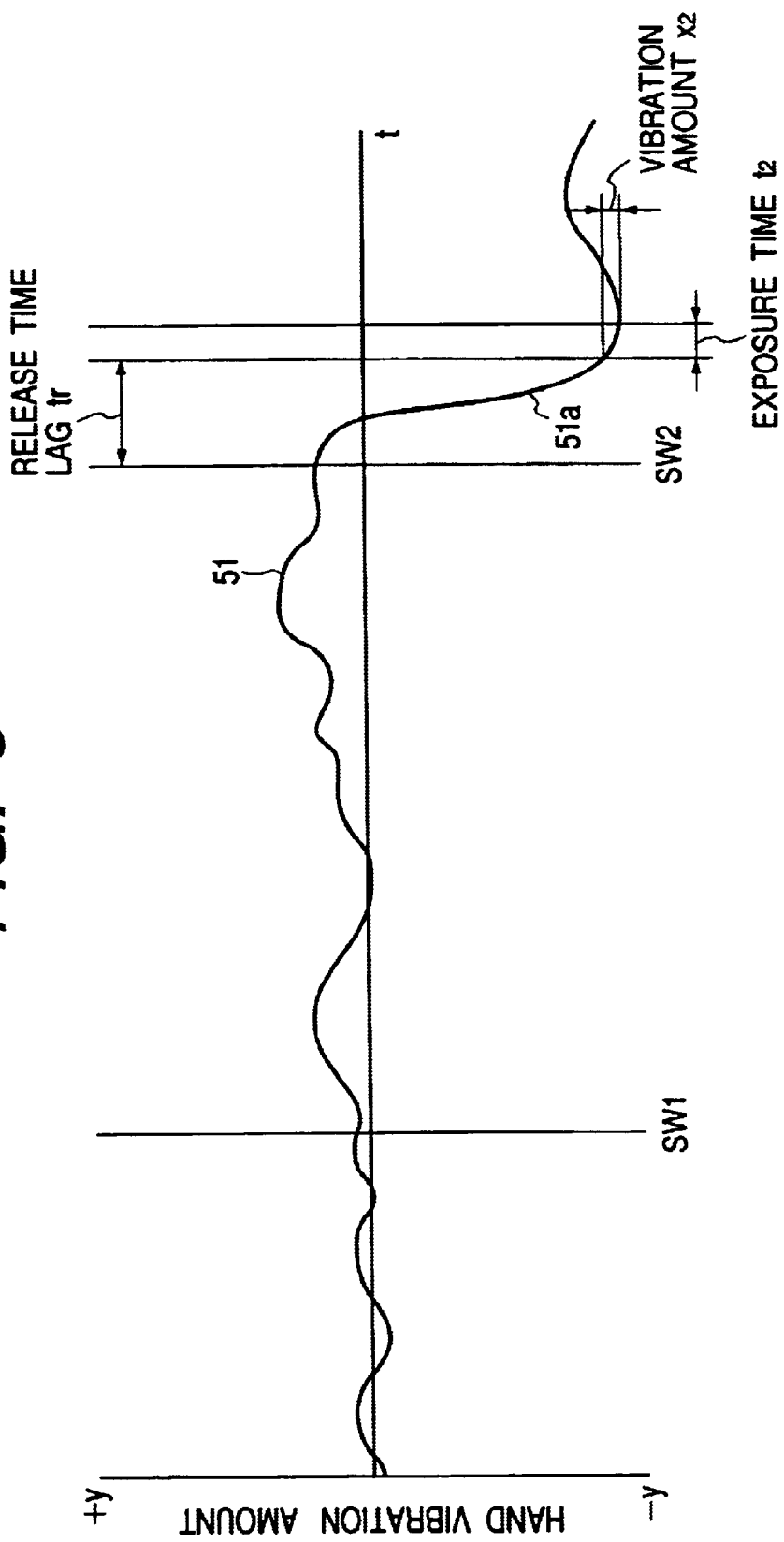
FIG. 3 is a graph for explaining a blur correction operation in the camera according to the first embodiment of the present invention.

As shown in FIG. 3, when the release time lag tr is set longer, the large vibration is almost settled (the large vibration can be settled within approximately 200 to 300 msec. after the SW2 signal has been generated). In this case, the vibration amount x2 can be made smaller than that in FIG. 54.

Even when the shutter speed of the exposure time t1 is faster (the focal distance is shorter), the release time lag tr can be set longer to reduce the vibration amount. However, such a longer release time lag tr makes the photographer uncomfortable. It is therefore desirable to reduce the release time lag tr as long as the vibration is acceptable (e.g., when taking a picture at a fast shutter speed under normal conditions such as fine weather).

For the above reason, the release time lag tr is changed in accordance with the acceptable amount of the image blur. In other words, the release time lag tr is changed in accordance with the shutter speed and the focal distance.

In the next step #1005, the microcomputer 11 waits until the SW2 signal is generated, and goes to step #1006 in response to generation of the SW2 signal. In step #1006, the microcomputer 11 waits until the release time lag tr determined at step #1004 passes, and goes to the next step #1007 after the release time lag tr has elapsed. In step #1007, the microcomputer 11 controls the shutter open/close-circuit 16 to open and close the shutter. After that, the operation returns to step #1001.

According to the first embodiment described above, there are provided a means for changing the release time lag tr (for executing step #1006) and a means for changing the release time lag tr on the basis of the shutter speed ts and the focal distance information fz (or either of them) (for executing step #1004). It is therefore possible for such a structure to reduce influence of a large vibration on deterioration of an image when the SW2 signal is generated (i.e., when the release button 13 is full switched on).

Second Embodiment

While the first embodiment features that the release time lag tr is controlled on the basis of at least either of the shutter speed ts or the focal distance information fz so as to reduce the image deterioration caused by hand vibration of the photographer, the second embodiment describes a case where a blur prevention system is used.

Figure 4:
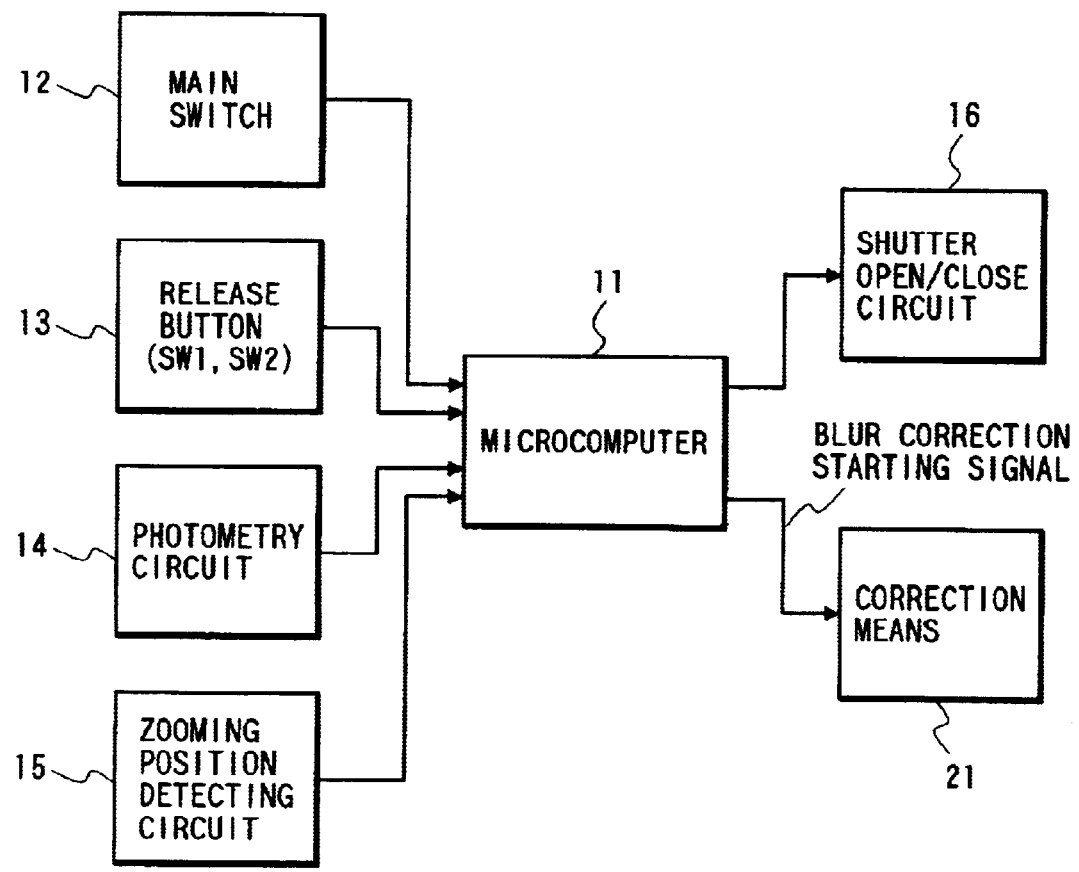
FIG. 4 is a block diagram showing an electrical arrangement of the main part of a camera according to a second embodiment of the present invention.
Figure 39:
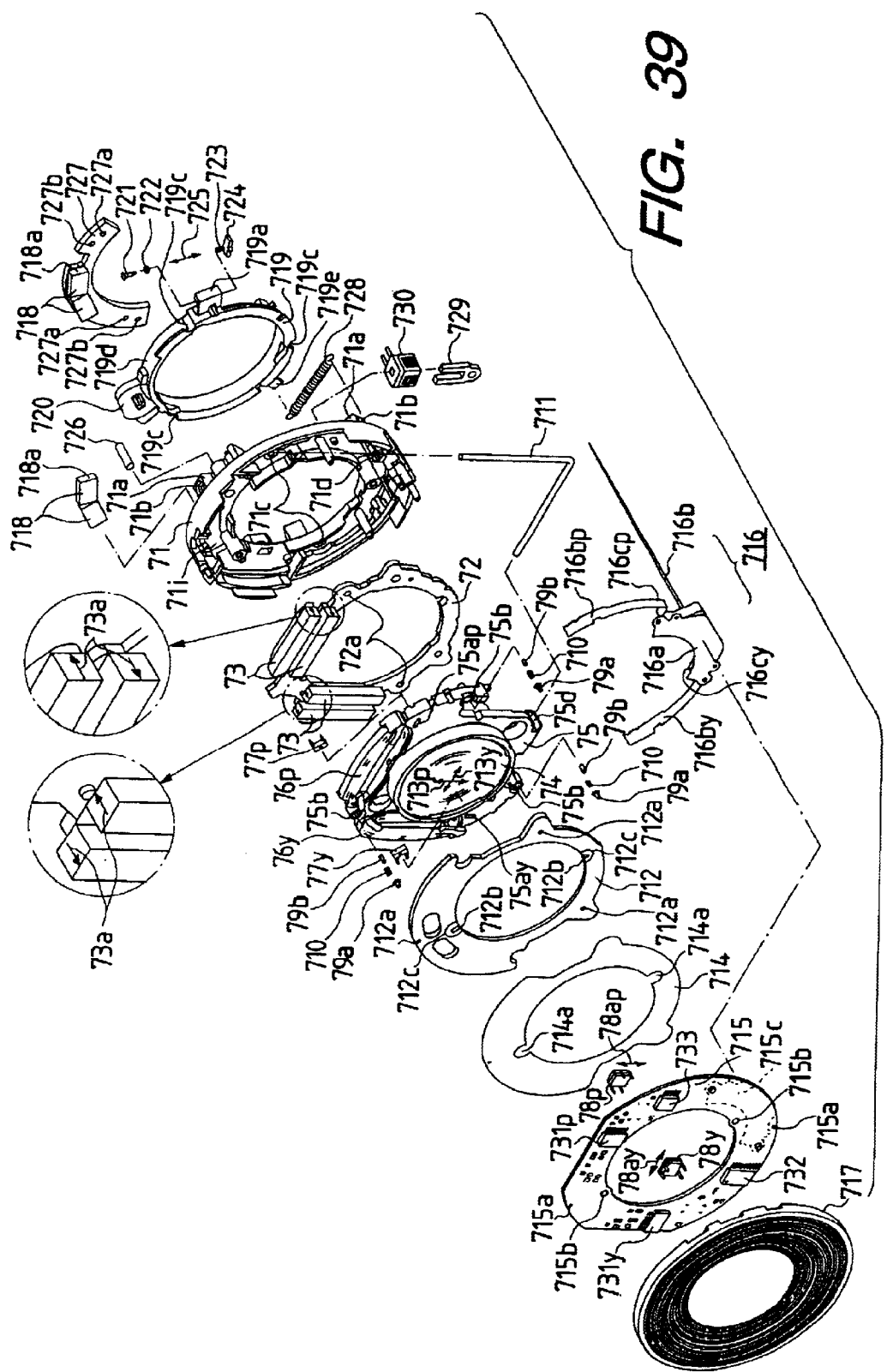
FIG. 39 is an exploded perspective view showing a construction of the blur correction apparatus of FIG. 38.
Figure 40:
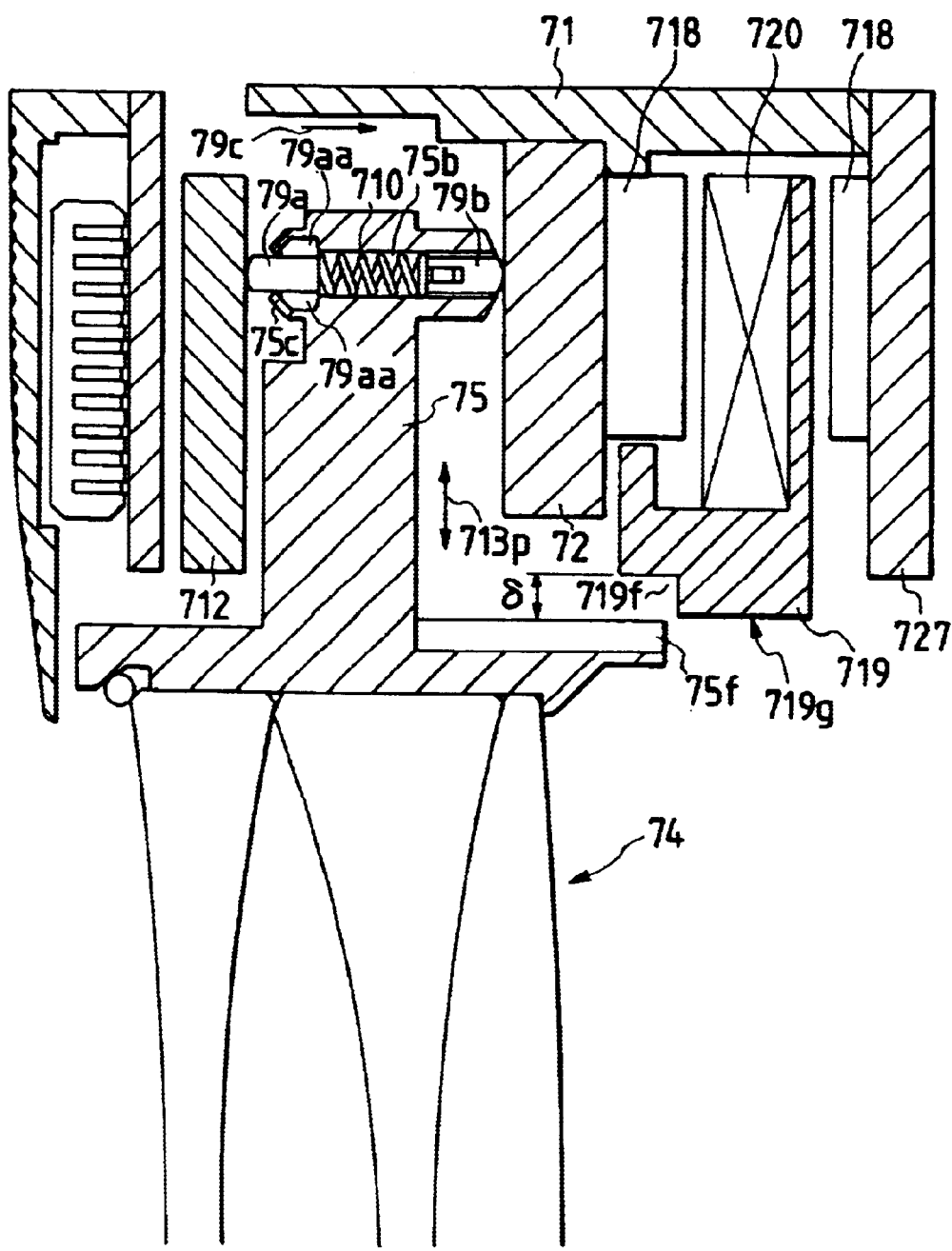
FIG. 40 is a view for explaining the shape of a hole of a support frame into which a clipping means shown in FIG. 39 is inserted.
Figure 41A:
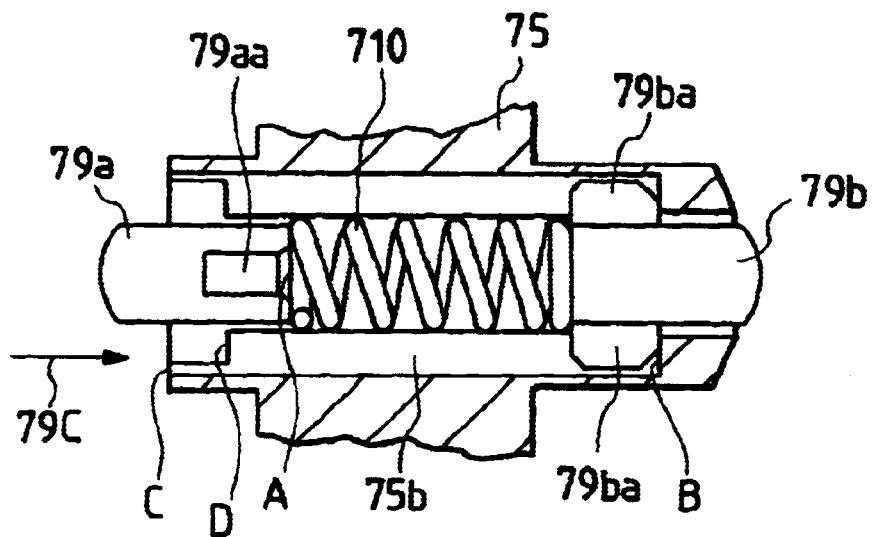
FIGS. 41A and 41B are sectional views showing a state where the support frame is incorporated in the base plate of FIG. 39.
Figure 41B:
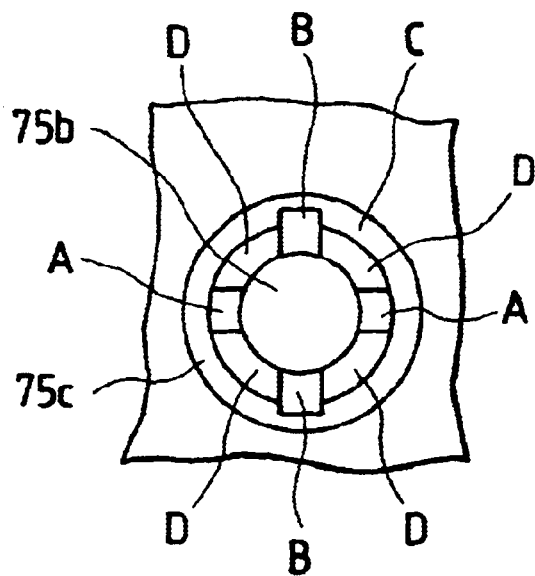
Figure 42:
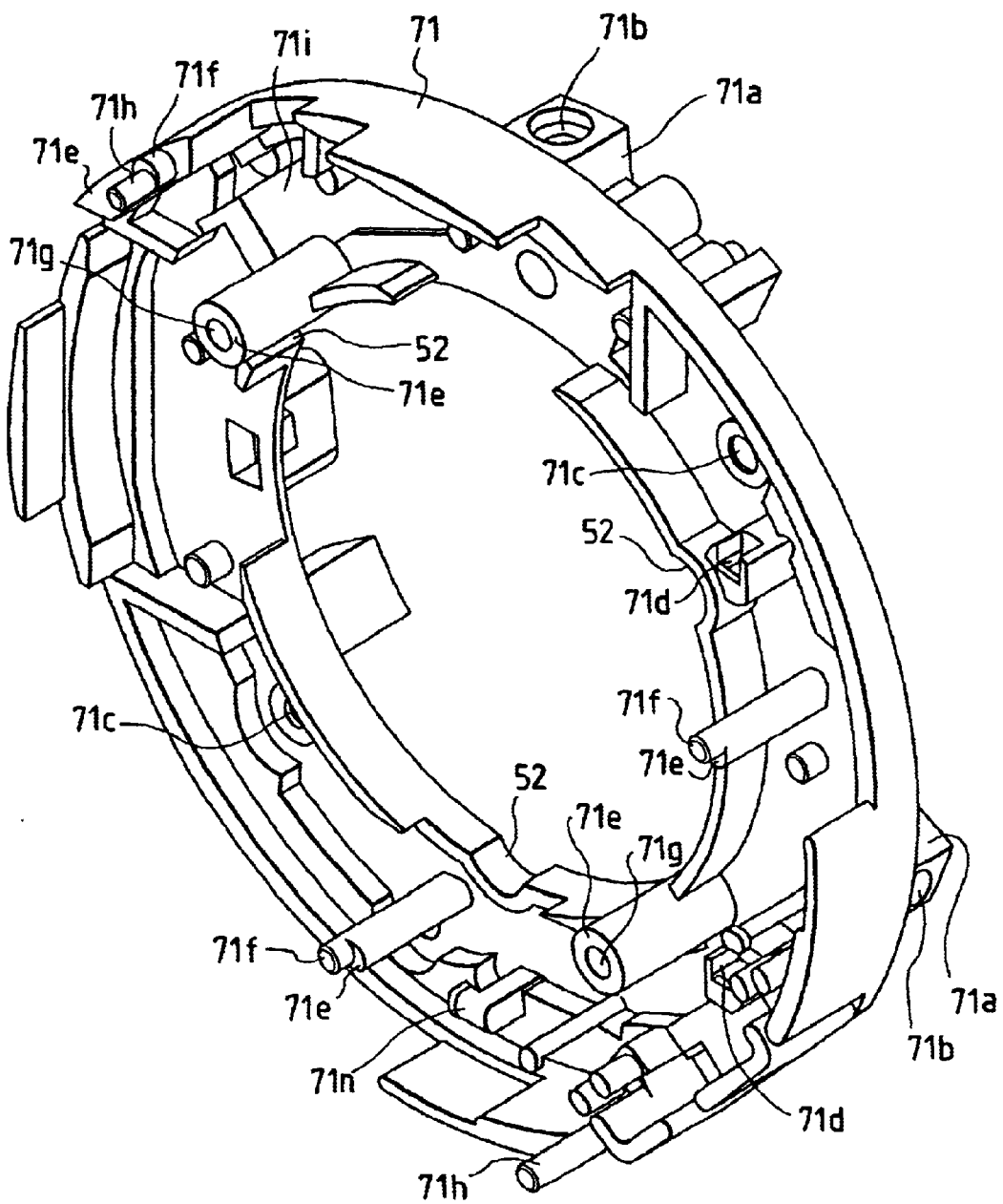
FIG. 42 is a perspective view showing the base plate of FIG. 39.
Figure 43:
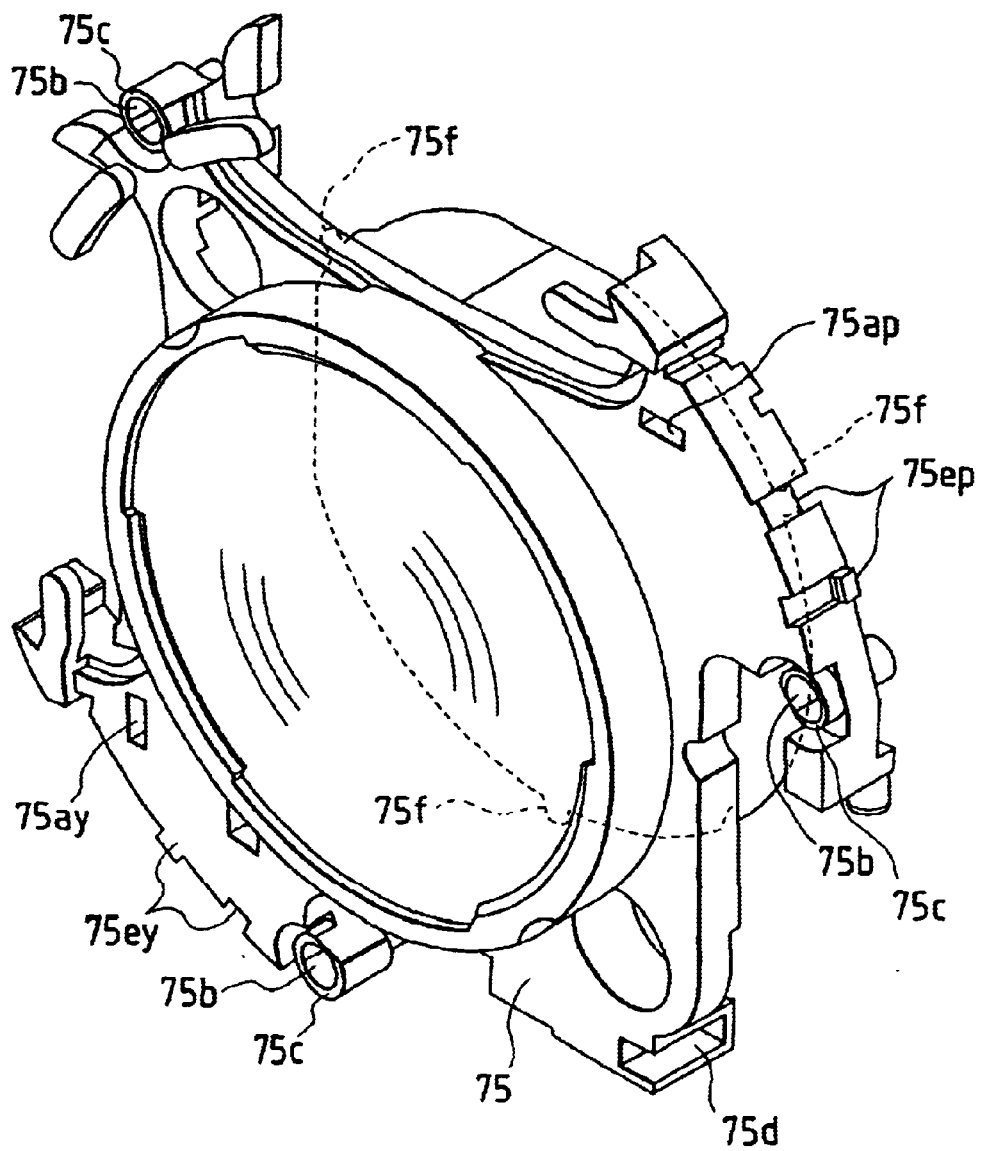
FIG. 43 is a perspective view showing the support frame of FIG. 39.
Figure 44:
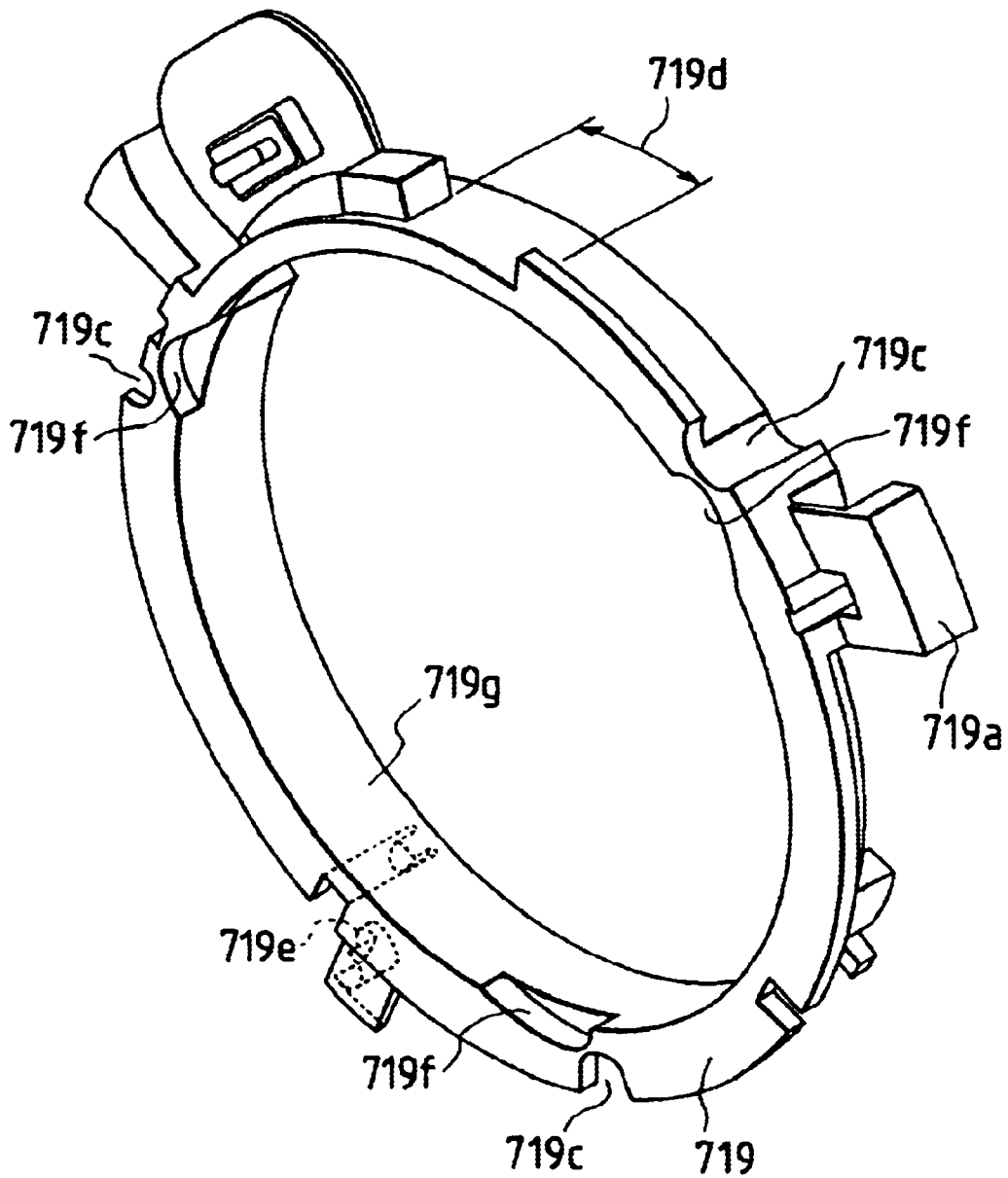
FIG. 44 is a perspective view showing the lock ring of FIG. 39.
Figure 45:
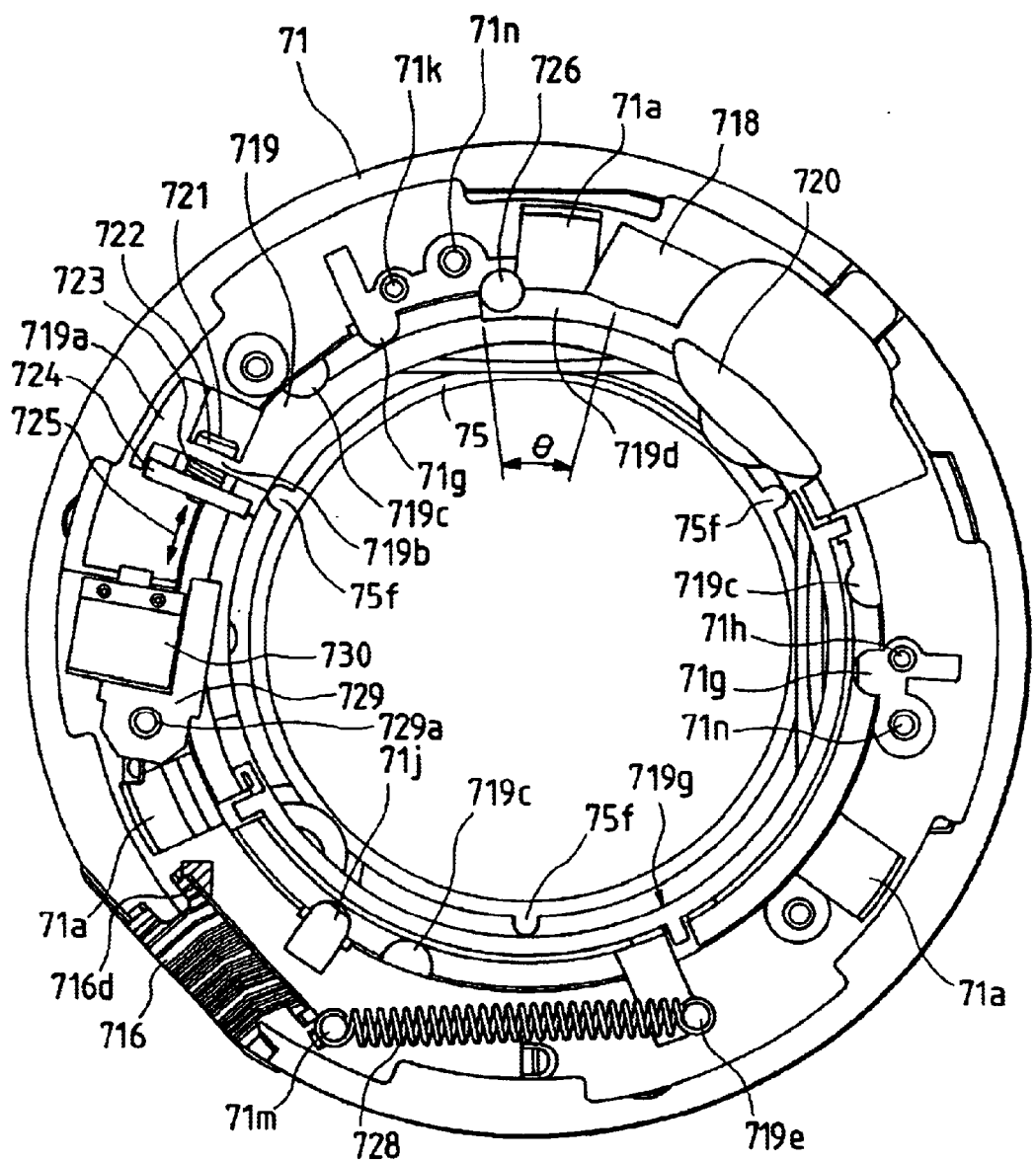
FIG. 45 is a front view showing the support frame and other elements of FIG. 39.
Figure 46:
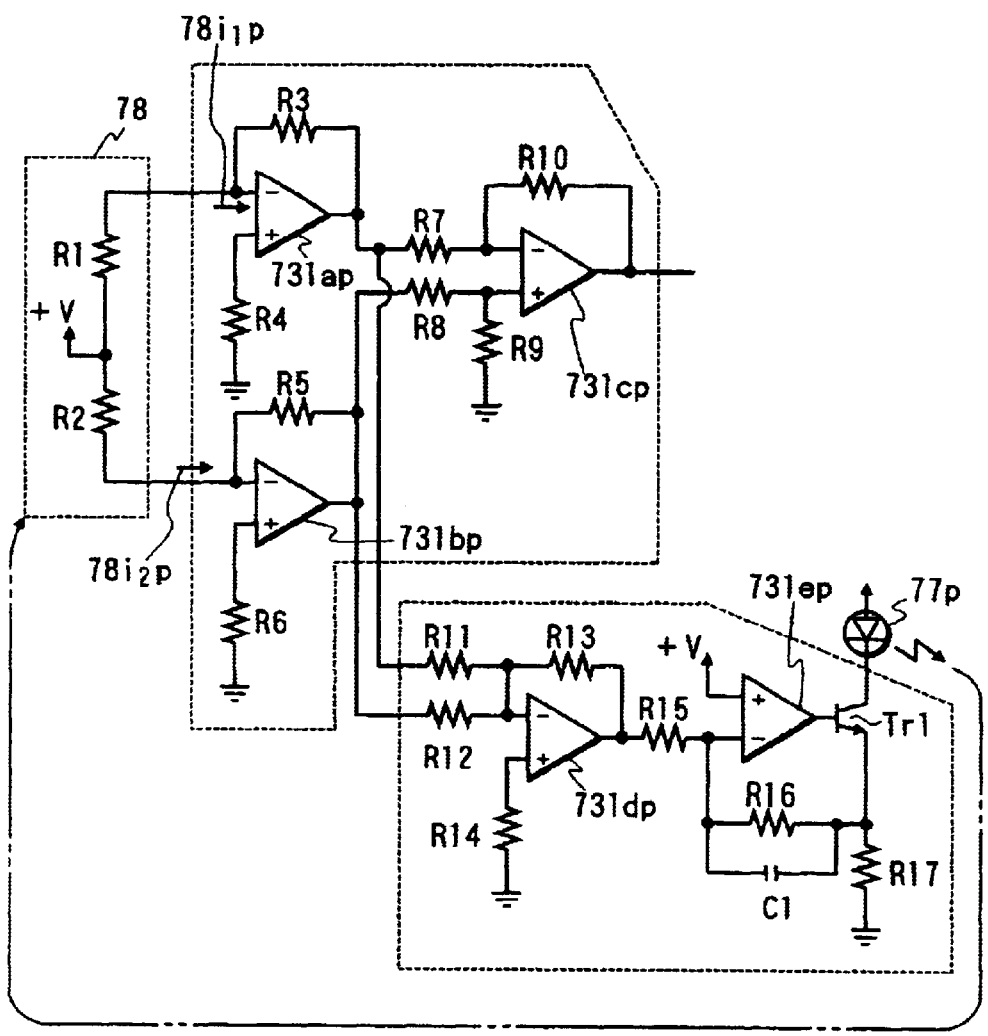
FIG. 46 is a circuit diagram showing a structure of an IC for amplifying outputs of the position detecting elements of FIG. 39.
Figure 47A:
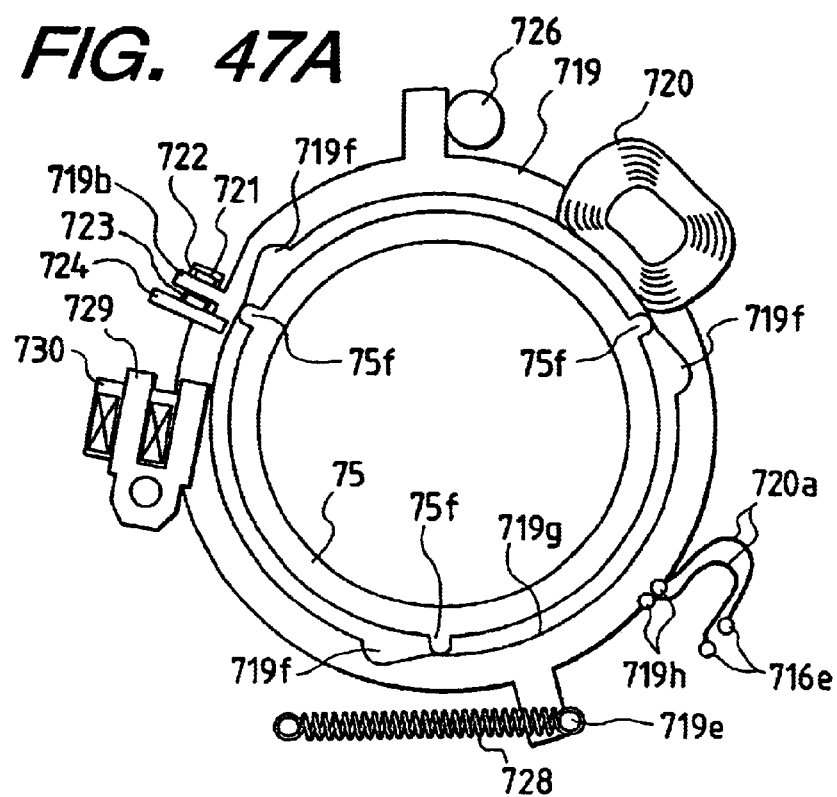
FIGS. 47A and 47B are diagrams showing how to drive the lock ring of FIG. 39.
Figure 47B:
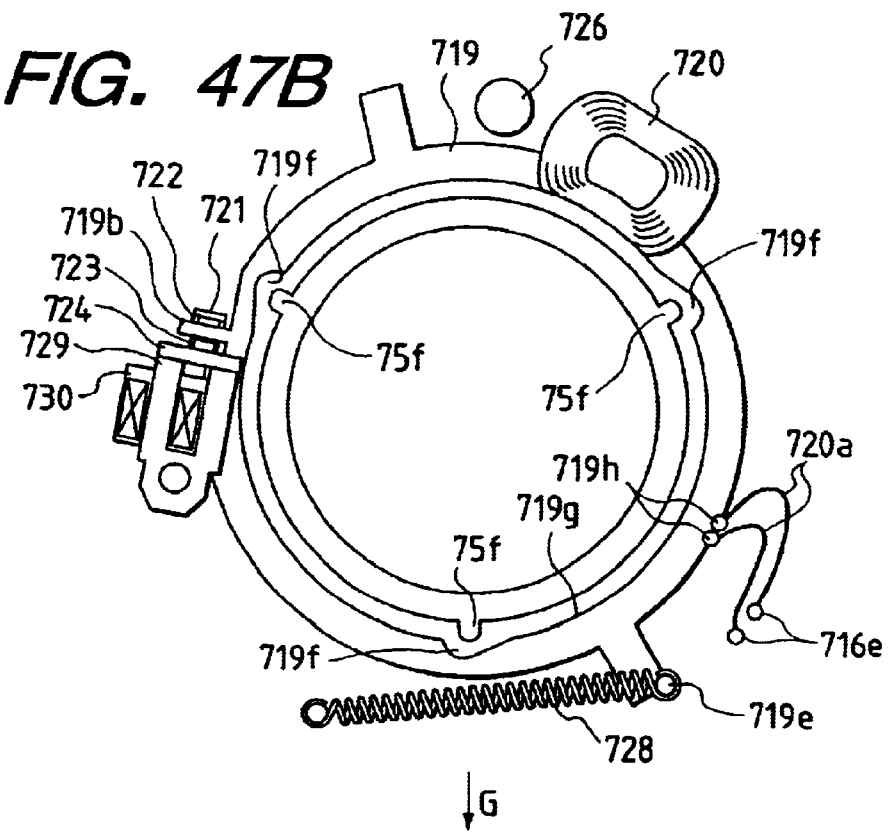
Figure 49:
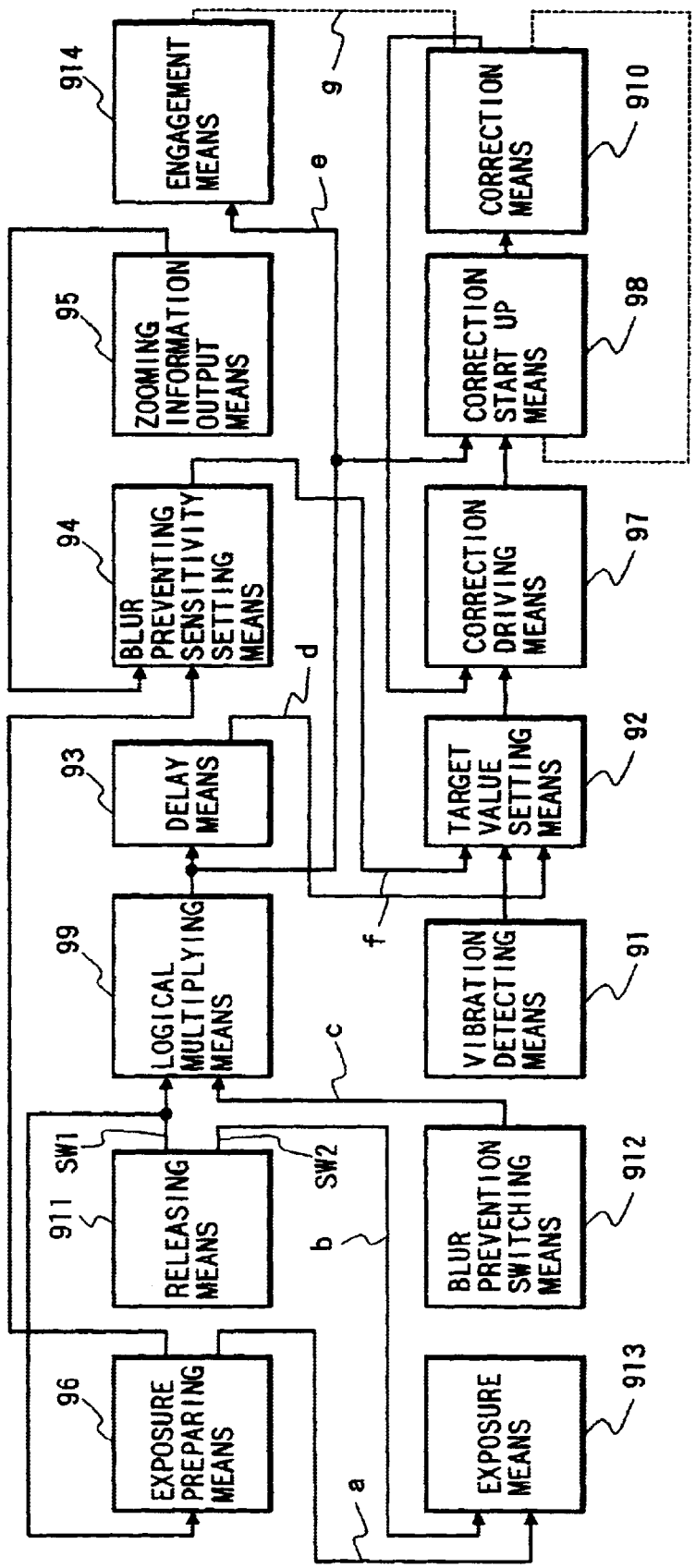
FIG. 49 is a block diagram showing a circuit structure of a blur prevention system in a camera with the blur prevention system mounted therein.
Figure 50:
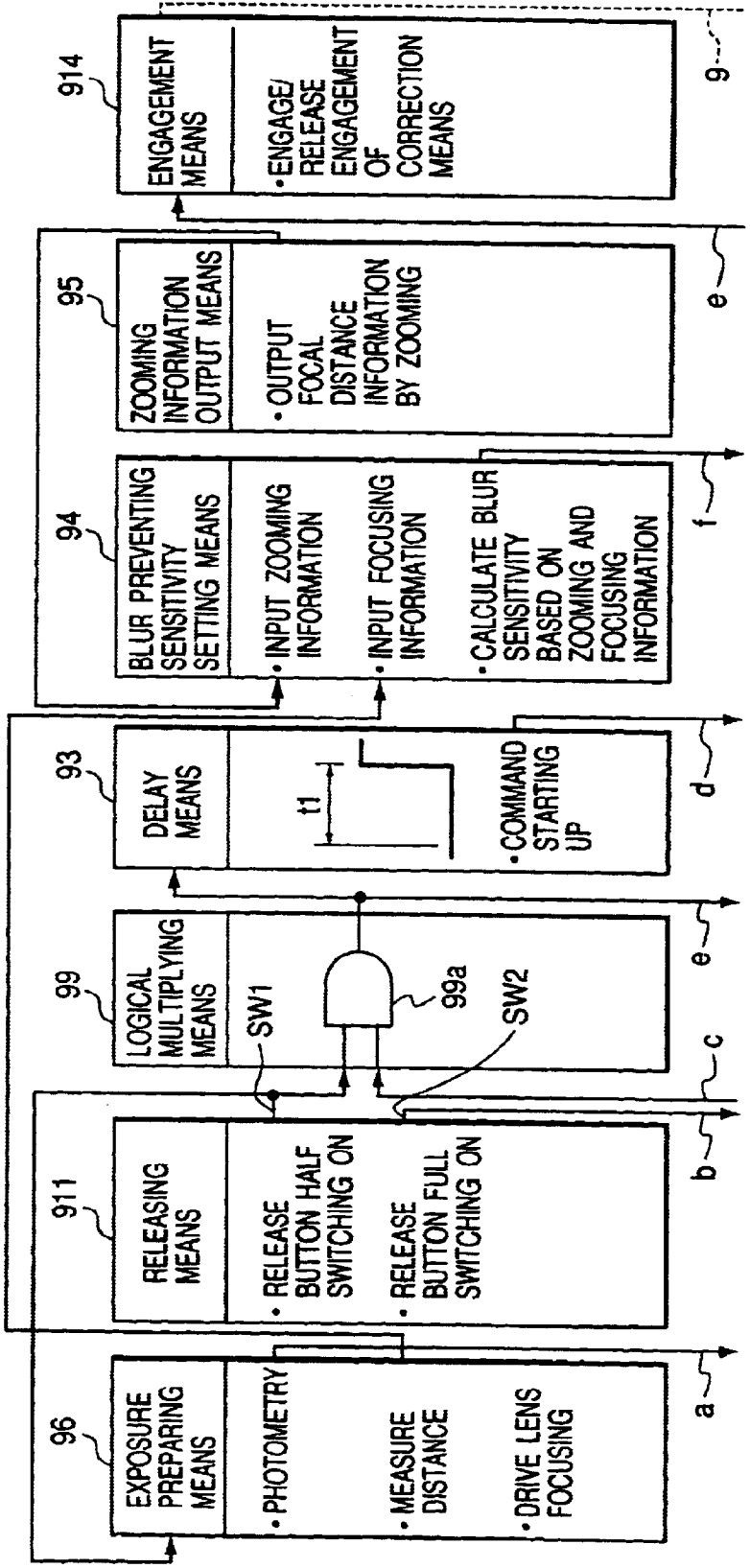
FIG. 50 is a block diagram showing details of one portion of the circuit structure of FIG. 49.
Figure 51:
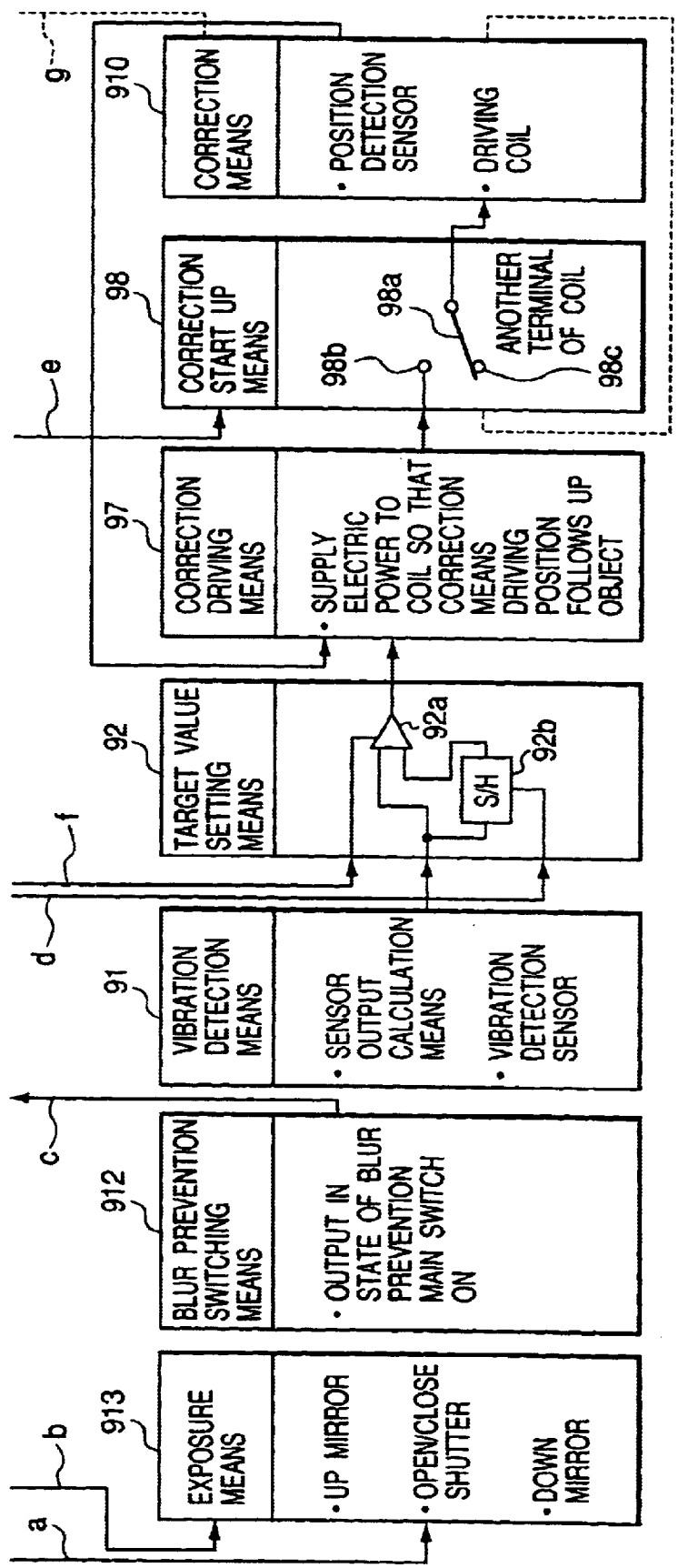
FIG. 51 is a block diagram showing details of the other portion of the circuit structure of FIG. 49.
Figure 52:
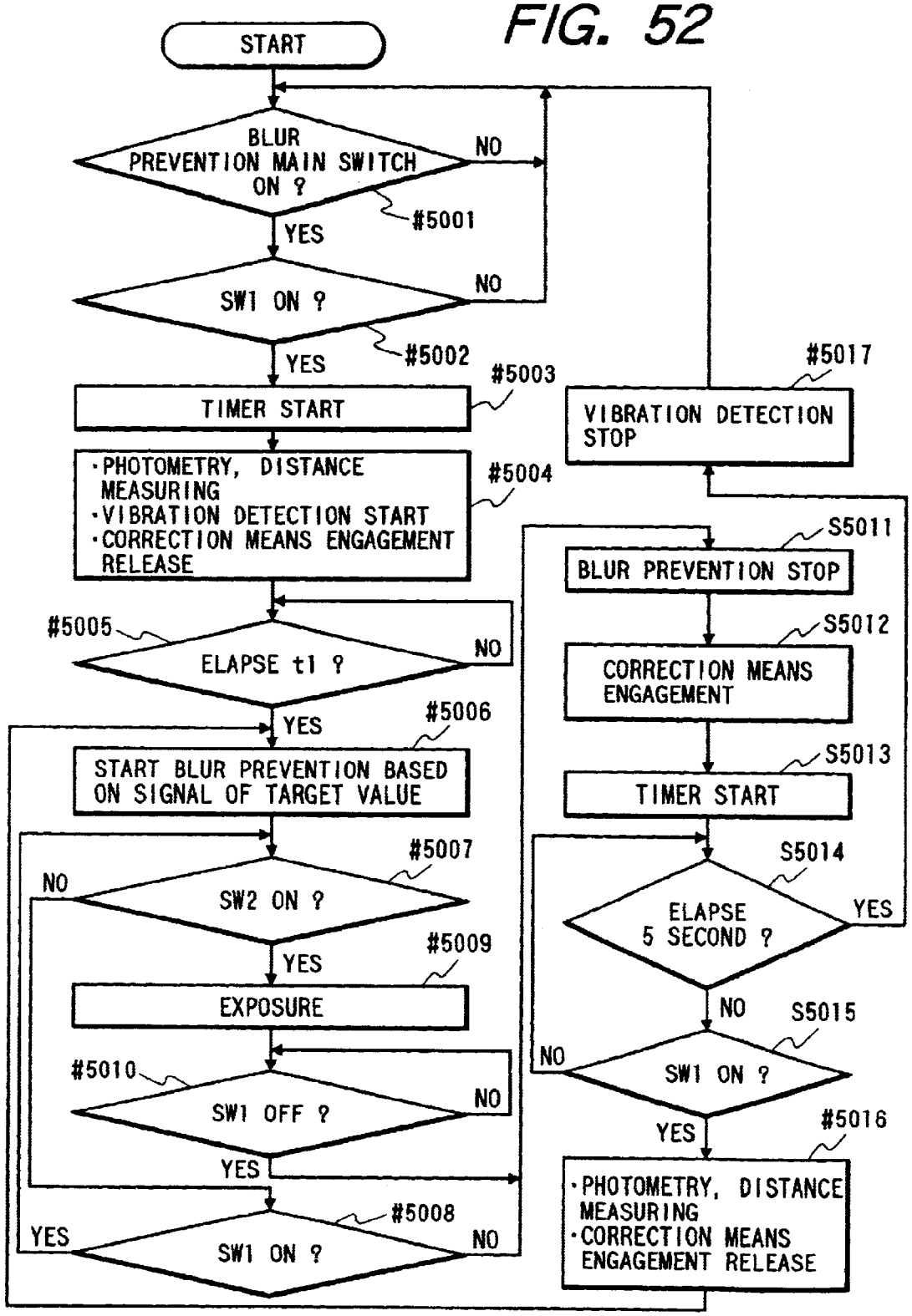
FIG. 52 is a flowchart schematically showing operations of the camera in the circuit structure shown in FIGS. 49, 50 and 51.
Figure 53:
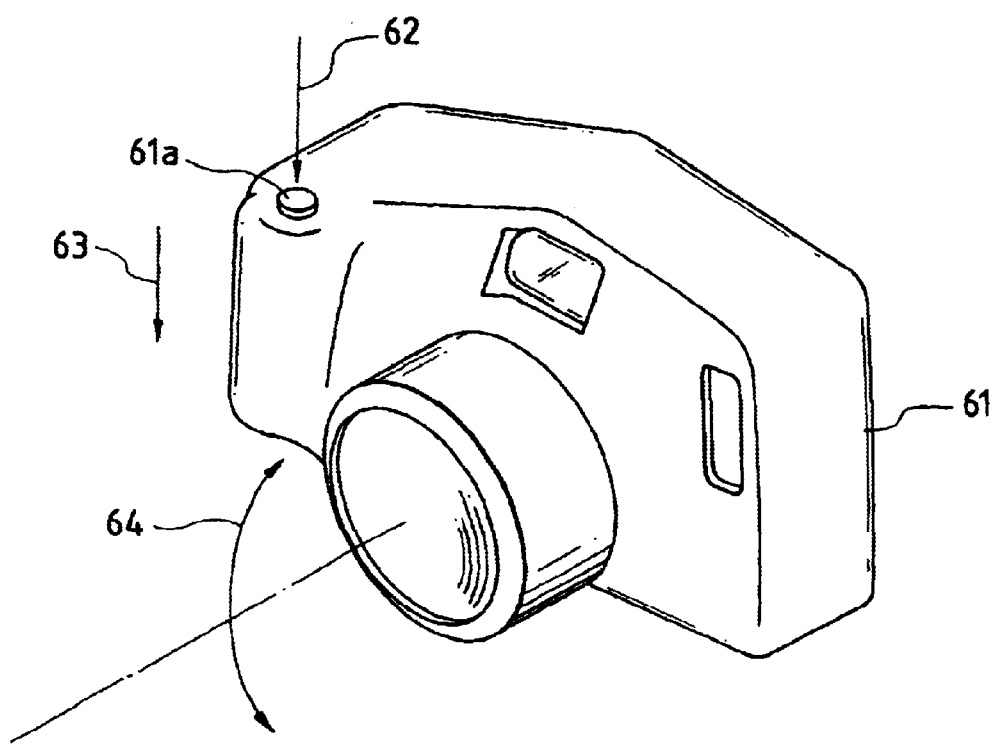
FIG. 53 is a perspective view for explaining a vibration caused by starting an exposure operation in the conventional camera.

FIG. 4 is a block diagram schematically showing a structure of a camera according to the second embodiment of the present invention. Portions common to those in FIG. 1 are given the same reference numerals and the description thereof is omitted. FIG. 4 differs from FIG. 1 in that the microcomputer 11 outputs a blur correction starting signal to the correction means 21 to control the timing of starting the blur correction by the correction means 21. The correction means 21 may have the same structure as that described with respect to FIG. 39 and the like.

Figure 5:
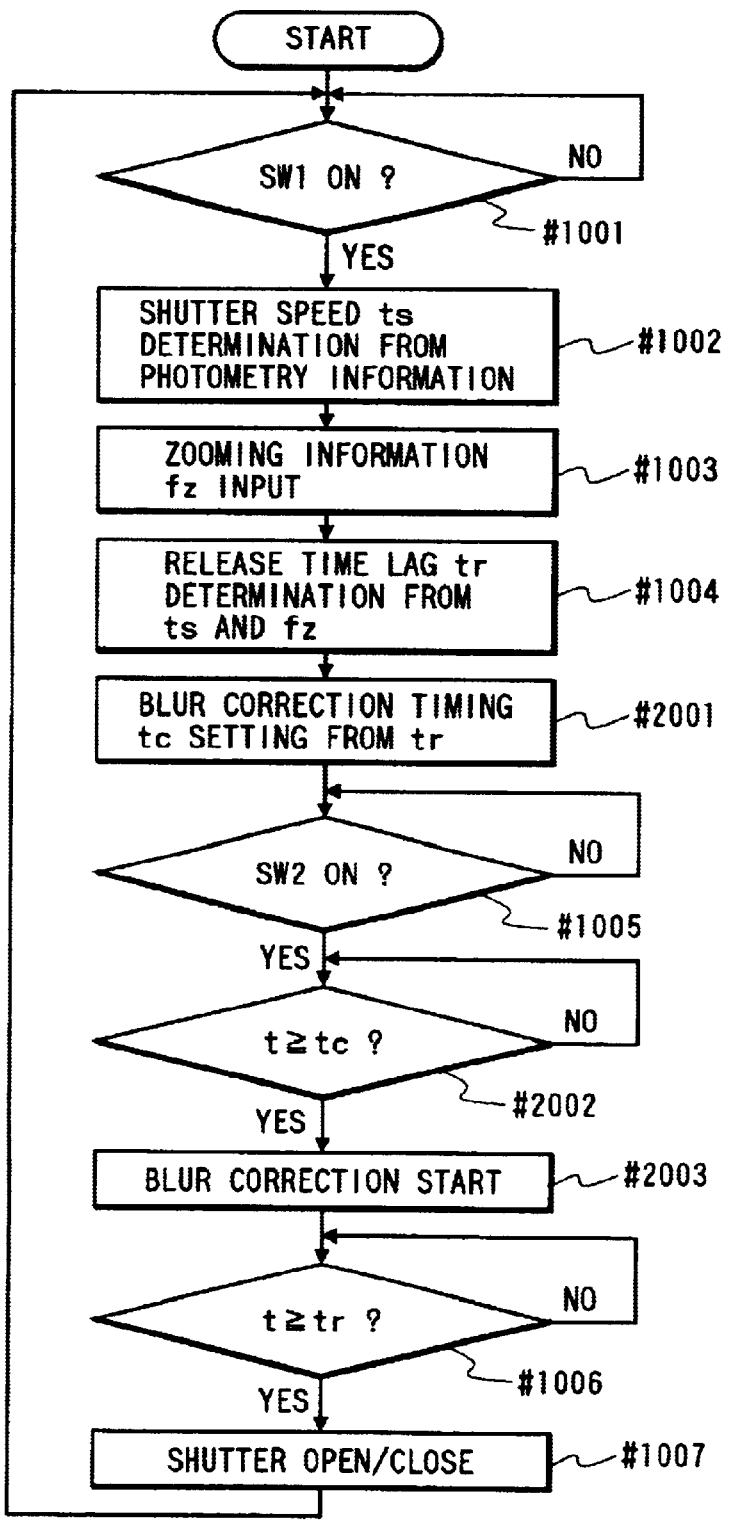
FIG. 5 is a flowchart showing an operation of the main part of the camera according to the second embodiment of the present invention.

FIG. 5 is a flowchart showing an outline of a camera operation, which has steps #2001, #2002 and #2003 in addition to those in FIG. 2. Since the other steps are the same as those in FIG. 2, the description is omitted.

In step #2001, a blur correction timing tc (delay time existing at the time the SW2 signal is generated and the time the blur correction is started, which is also referred to as "delay time of blur correction on") is set in accordance with the release time lag tr determined at step #1004. Since the blur correction is required to have already been started at the time of exposure, the blur correction timing tc is set smaller than the release time lag tr. A reason for this will be described later.

In step #2002, the microcomputer 11 waits for the blur correction timing after generating the SW2 signal (such a control operation is performed by a means corresponding to a blur correction starting means or blur correction start timing control means according to the present invention). In the subsequent step #2003, the blur correction is started.

Referring to FIGS. 6A and 6B, a blur correction waveform recorded at this time will be described.

A point in which FIG. 6A differs from FIG. 55A is that the blur correction is stopped (waveform 22) during a fixed time period (delay time of blur correction on) and restarted at a point indicated by the arrow 23.

The time during which the blur correction remains stopped substantially corresponds to the time a large vibration appears due to generation of the SW2 signal. It is therefore possible to keep the correction means driven during this time period so as to prevent the correction stroke from being exhausted. In this case, as shown in FIG. 6B, there is no blur correction residual amount in the exposure time t1 (i.e., the waveform 42c has no inclination during this time period), thus properly carrying out the blur correction.

In step #2001 of FIG. 5, the blur correction timing tc is determined by the release time lag tr, i.e., on the basis of the focal distance and the shutter speed. For example, if the focal distance is too short or the shutter speed is too fast, the blur correction timing to will be reduced. When the focal distance or the shutter speed is hardly affected by hand vibration of the photographer, the blur correction timing tc is set equal to 0.

FIGS. 7A and 7B show a blur correction waveform and its blur correction residual amount in such a state. In this case, since the exposure time t is short (the shutter speed is fast), the release time lag tr is made smaller than that shown in FIGS. 6A and 6B, as is similar to the first embodiment.

The delay time of blur correction on (blur correction timing to) is set to 0 as well, and the blur correction is started in synchronism with generation of the SW2 signal.

As discussed above, a shorter release time lag tr is easy to use for the photographer. For this reason, the release time lag tr is set small when the focal distance is small or the shutter speed is fast with less influence of hand vibration of the photographer (i.e., with less influence of a large vibration due to generation of the SW2 signal).

The blur correction timing to is set shorter than the release time lag tr because the correction means acts instably immediately after starting the blur correction and hence an additional time is needed for stabilization of the correction means (i.e., for stabilizing the action of the correction means until exposure).

For the above reason, the blur correction is started in synchronism with generation of the SW2 signal when the release time lag tr becomes shorter than a fixed time period.

As shown in FIG. 6A, if the correction means is kept stopped in a fixed position (in which the correction means is located when the SW2 signal is generated) during the time period existing between the time the SW2 signal is generated and the time indicated by the arrow 23, e.g., when the correction means was located in the neighborhood of the correction stroke end at the time of generation of the SW2 signal, the safety margin of the correction stroke is not made so great.

In such a case, as shown in FIGS. 8A and 8B, the correction means may be returned to the stroke center (initial position) 25 from the position existing at the time of generation of the SW2 signal so as to secure the stroke for the exposure operation (the waveform 24 corresponds to an excess response time for which the correction means is returned to the initial position).

Although in the embodiment a system starting blur prevention from the time the SW1 signal is generated is taken by way of example to describe the present invention, another system starting blur prevention from the time the SW2 signal is generated is also applicable. As shown in FIGS. 9A and 9B, the correction means may be kept in the initial position until the time indicated by the arrow 27 (after the SW1 signal has been generated or the SW2 signal has been generated) for starting the blur correction after that.

Further in the embodiment, the blur correction timing varies according to the focal distance or the shutter speed, but the release time lag tr may be set constant to a length such as one shown in FIG. 6A to keep the blur correction timing waiting until the large vibration is settled from the time the SW2 signal is generated, and then to start the blur correction (i.e., the blur correction timing is uniformly delayed irrespective of the focal distance and the shutter speed). Such a structure makes it possible to simplify the system and hence improve its reliability.

According to the second embodiment described above, there is provided a means which controls the blur correction starting timing for fixing the correction means or a means for starting blur correction (or means for keeping the correction means waiting at the stroke center). Thus the blur correction stroke has a margin at the time of exposure so that proper blur correction can be performed.

In the system starting the blur correction after the SW2 signal has been generated, there is provided a means for controlling the blur correction starting timing to start the blur correction with a fixed delay time after the SW2 signal has been generated (the correction means is kept waiting at the stroke center during this time) or a means for starting the blur correction, thereby preventing the correction means from exhausting the correction stroke before exposure (or during exposure) due to a large vibration caused by generating the SW2 signal.

Third Embodiment

Figure 10:
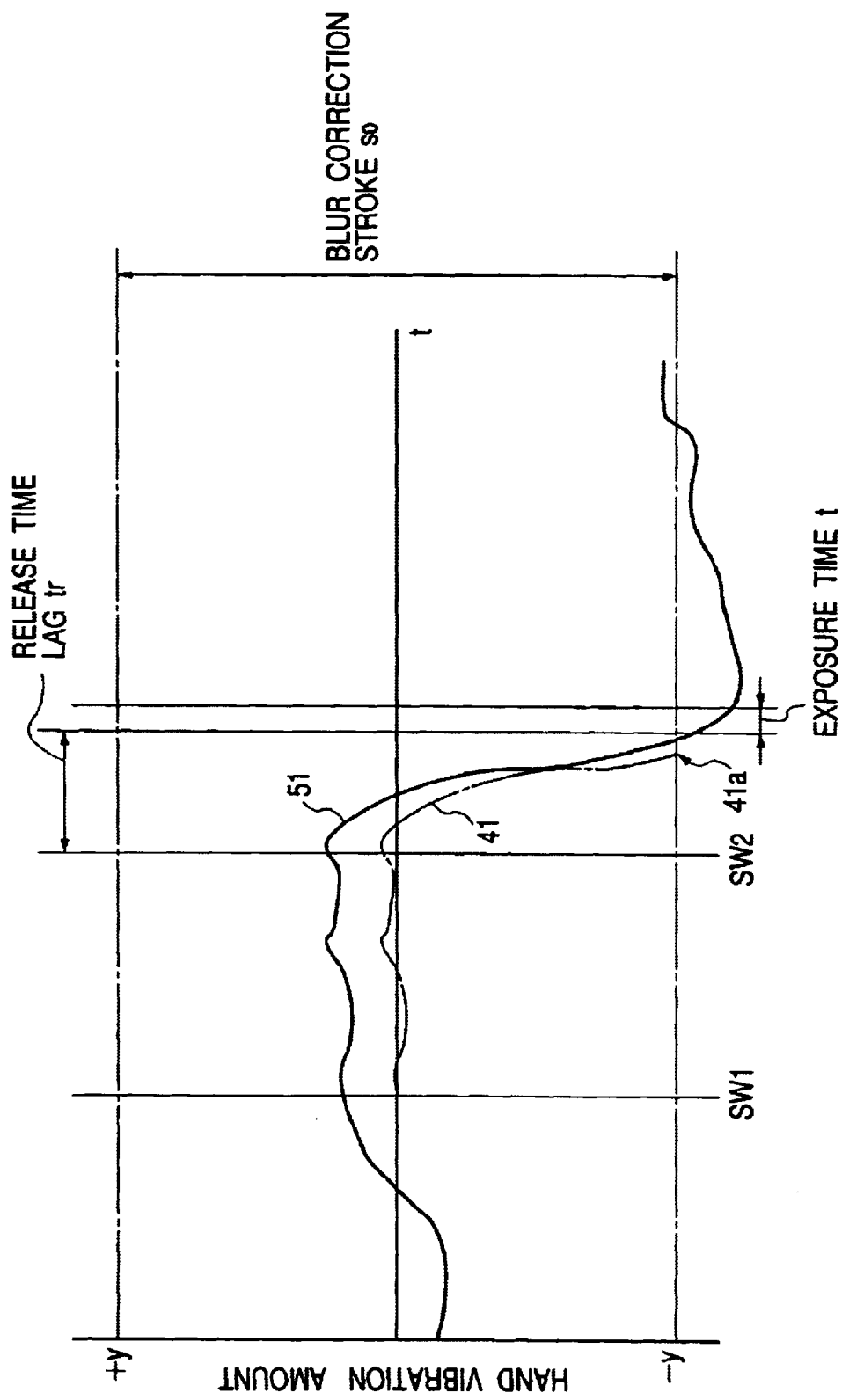
FIG. 10 is an enlarged graph showing the blur correction waveform of FIG. 55A, which shows a portion of the blur correction waveform recorded when the SW1 and SW2 signals are generated.

FIG. 10 shows waveforms of those in FIG. 55A, where portions observed at the time of generation of the SW1 and SW2 signals are enlarged (for the sake of easy description, the shapes of the waveforms are somewhat changed). In FIG. 10, the driving waveform 41 of the correction means is stopped though the hand vibration waveform 51 continues (as discussed above, this is caused by exhausting the correction stroke for correcting the large vibration due to generation of the SW2 signal).

In the above second embodiment, the correction means is stopped during a fixed time period from the time the SW2 signal is generated (to prevent the correction means from responding to the large vibration caused when the SW2 signal is generated).

In contrast, the third embodiment describes a case where the blur correction stroke is secured without stopping the blur correction.

Figure 11:
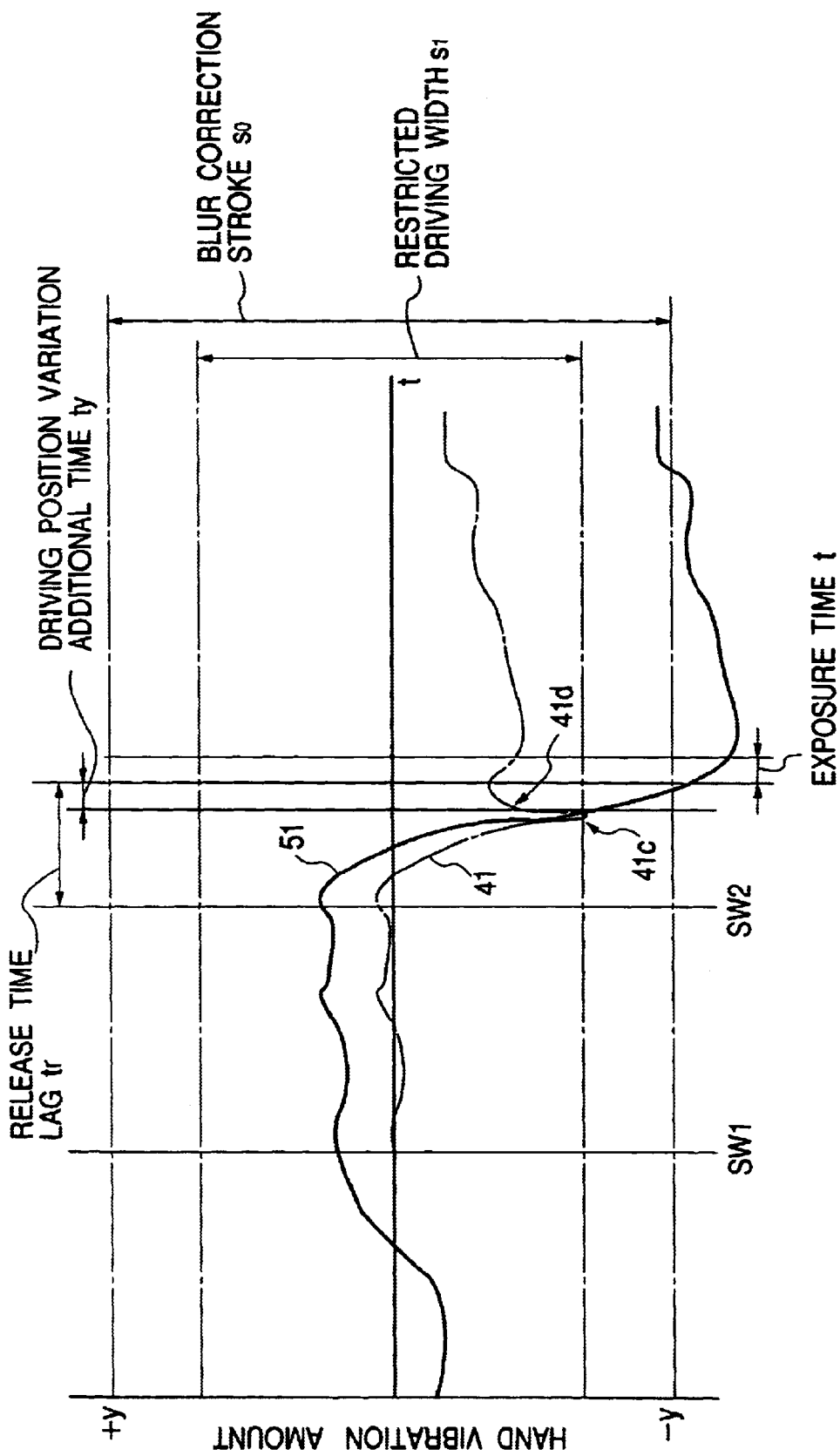
FIG. 11 is a graph showing a blur correction waveform recorded at the time of blur correction by a camera according to a third embodiment of the present invention.

FIG. 11 is a view according to the third embodiment of the present invention, in which a restricted driving width S1, which is narrower than a blur correction stroke S0 and varies according to the focal distance and the shutter speed (i.e., the restricted driving width S1 is made narrow when the focal distance is long or the shutter speed is slow), is provided.

When the driving position of the correction means exceeds the restricted driving width S1, the correction means is returned to the blur correction center (portion for performing this operation corresponds to a blur correction position changing means according to the present invention). It should be noted here that the correction means must be returned to the correction center in the above manner within a time period existing between the time the SW2 signal is generated and the time the release time lag tr is ended. More specifically, the time period during which the correction means is returned to the correction center is set shorter than the release time lag tr by a driving position variation additional time ty.

In FIG. 11, since the correction means exceeds the restricted driving width S1 at a point indicated by the arrow 41c, the operation for returning the correction means to the correction center (centering operation) is started (waveform 41d). When it enters the driving position variation additional time ty, the operation is stopped and the blur correction operation is restarted. As shown in FIG. 11, the correction means cannot be returned to the correction stroke center during this time in some cases.

However, such an operation makes an additional margin of the blur correction stroke for the exposure time, and this allows excellent blur correction during the exposure time.

The driving position variation additional time ty is provided such that the excess response of the operation for returning the correction means to the stroke center of the blur correction has been settled at the beginning of the exposure time. Further, the above operation (centering operation) is performed only after the SW2 signal has been generated. This is because in a TTL camera the photographer must become aware of the action of the correction means and feel uncomfortable.

Cameras other than of TTL type may allow the above operation to be started from the time the SW1 signal is generated (the time the blur correction is turned on).

When the focal distance is long or the shutter speed is slow, much of the blur correction amount needs to be secured. In this case, the restricted driving width s1 is made narrow so as to prevent the correction means from being driven greatly before exposure.

According to the third embodiment, there is provided a means for changing the blur correction position, which performs the centering operation when the correction means exceeds a predetermined stroke before exposure so as to secure a sufficient blur correction stroke for the exposure time. Further, the centering operation is permitted a fixed time (driving position variation additional time) before the exposure time so that the excess response of the correction means will not affect the exposure time.

Since the centering operation is also permitted after the SW2 signal has been generated, the centering operation never makes the photographer uncomfortable while he or she takes a posture with the camera aiming at a photographic object. The judgment position of the centering operation (restricted driving width) varies according to the camera conditions such as shutter speed or focal distance so that a sufficient blur correction stroke can be secured at all times during exposure time.

Fourth Embodiment

Figure 12:
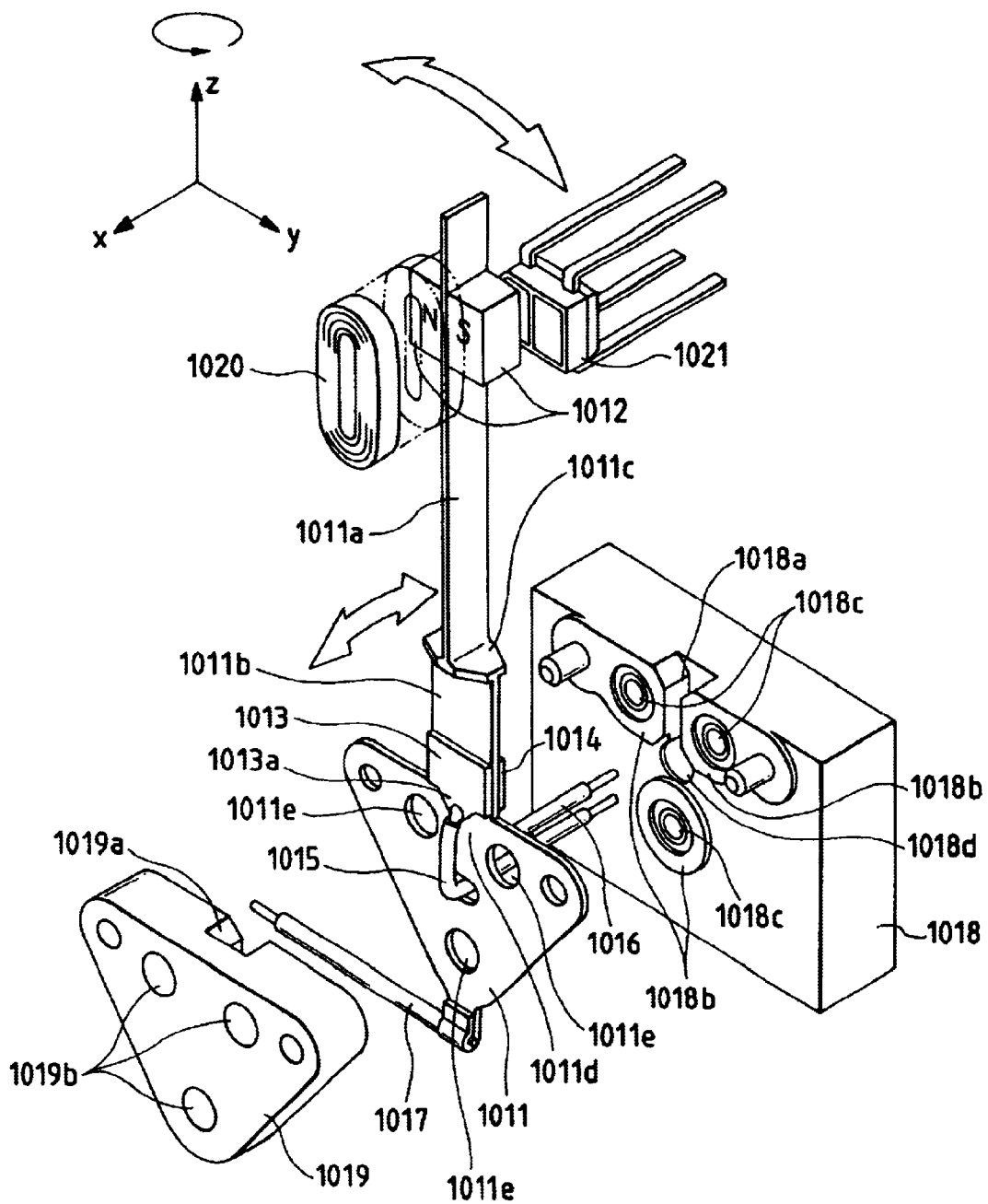
FIG. 12 is a perspective view showing an example of mechanical arrangement of a vibration gyro provided in the compact camera according to each embodiment of the present invention.

FIG. 12 is a view showing an arrangement of a vibration object in a vibration gyro as a vibration detecting sensor according to the embodiments of the present invention.

Referring to FIG. 12, there are shown a metal vibrator 1011, a permanent magnet 1012 provided close to the tip of the vibrator 1011, piezoelectric elements 1013 and 1014 provided close to a fixed end of the vibrator 1011, lead wires 1015 and 1016 for extracting charges from surface electrodes of the piezoelectric elements 1013 and 1014, a lead wire 1017 for connecting the vibrator 1011 to the ground, a seat 1018 provided on an unillustrated base plate to which the vibrator 1011 is fixed, a holding member 1019 for holding the vibrator 1011 between the holding member 1019 and the seat 1018, a coil 1020 for causing a driving force due to Lorentz's force exerted on the permanent magnet 1012 and a photo-reflector 1021 for optically detecting vibration displacement of the vibrator 1011 and the permanent magnet 1012 excited by the coil 1020. The normal position of the coil 1020 is shown by the double-dot-and-dash line in FIG. 12.

A driven piece 1011a and a detecting piece 1011b in the vibrator 1011 are coupled at right angles to each other through a flange 1011c and formed as one body. These pieces are preferably machined together by forging press, but metal injection or shaving may be used to machine them.

Next, the process of mounting the vibrator 1011 on the seat 1018 will be described.

The piezoelectric element 1013 has a mounting portion 1013a for mounting the lead wire 1015 thereon. The mounting portion 1013a extends on the side of a fixed portion 1011d of the vibrator 1011. Similarly, the piezoelectric element 1014 has a mounting portion 1014a, not shown, for mounting the lead wire 1016 thereon. The mounting portion 1014a extends on the side of the fixed portion 1011d of the vibrator 1011. To receive the mounting portions 1013a, 1014a and the lead wires 1015, 1016, a groove 1018a and a groove 1019a are formed on the seat 1018 and the holding member 1019 respectively.

Pressure surfaces 1018b are formed on both sides of the groove 1018a of the seat 1018 so as to contact the fixed portion 1011d of the vibrator 1011. Similarly, the holding member 1019 has pressure surfaces, not shown, with the same shape as those of the seat 1018, which are formed on the side opposite to the vibrator 1011.

In such a condition as shown in FIG. 12, three machine screws are tightened through holes 1019b and holes 1011e Into screw holes 1018c formed in the seat 1018. As a result, the fixed portion 1011d of the vibrator 1011 is held, and the lead wires 1015, 1016 are drawn out into the rear side of the seat 1018, thus integrating the vibration object.

As discussed above, the mounting portions 1013a, 1014a of the piezoelectric elements 1013, 1014, and the lead wires 1015, 1016 are passed through the inside of the fixed end so as to prevent tensile forces of the lead wires 1015, 1016 from adversely affecting the vibration of the vibrator 1011.

Next, description will be made of how the vibration detecting sensor works.

Figure 13:
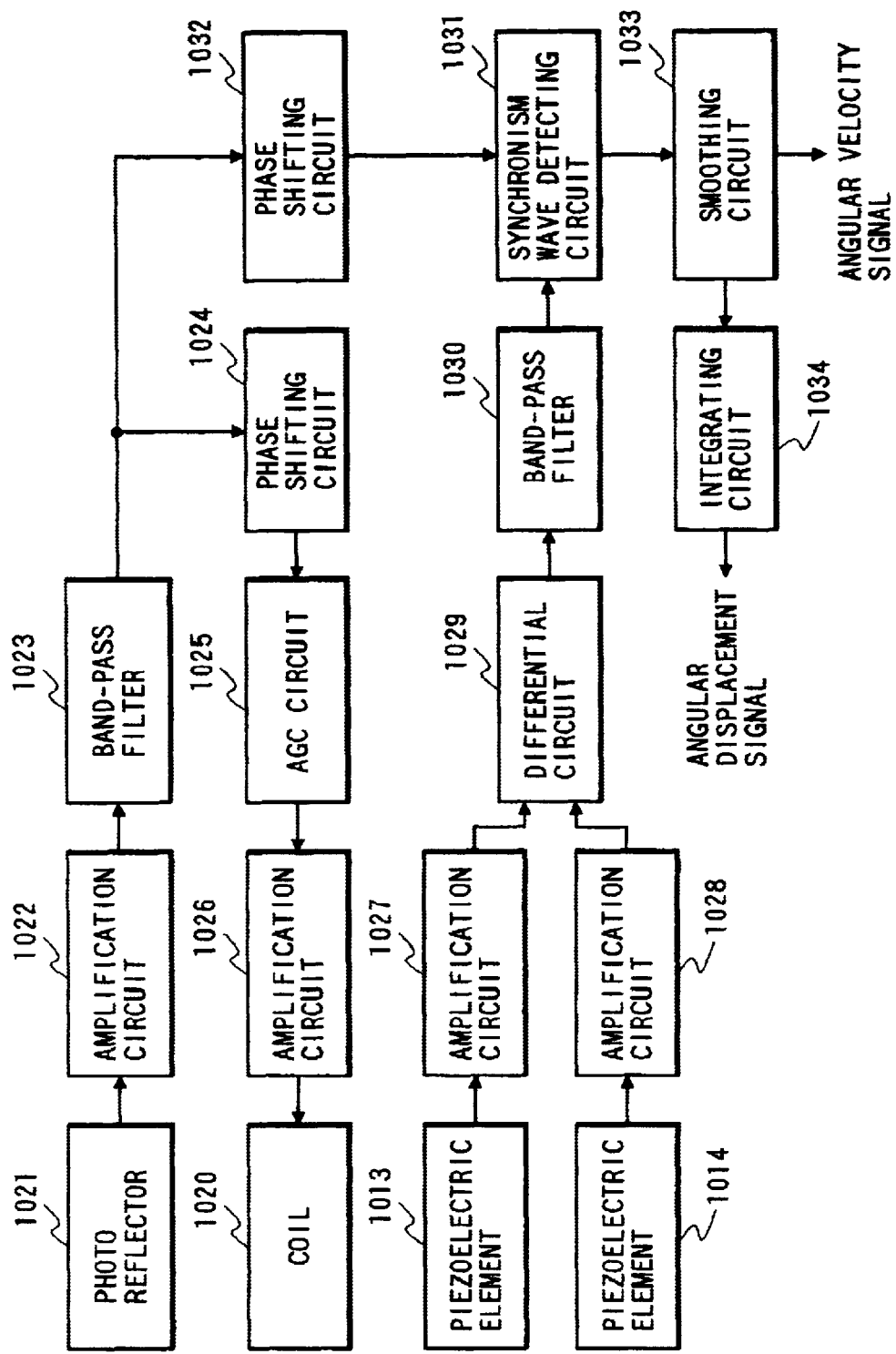
FIG. 13 is a block diagram showing a signal processing system in the vibration gyro of FIG. 12.

FIG. 13 is a block diagram showing an arrangement of circuits for excitation control of the vibrator and processing of detection signals, i.e., which shows a circuit structure of a vibration gyro. In FIG. 13, portions common to those in FIG. 12 are given the same reference numerals.

Referring to FIG. 13, a vibration displacement signal from the driven piece 1011a of the vibrator 1011, which represents vibration displacement in the y direction (exciting direction) in FIG. 12, is detected by the photo-reflector 1021, input to and amplified by an amplifier 1022, and passed through a band-pass filter 1023. By passing through the band-pass filter 1023, a signal generated at a frequency close to a resonance frequency of the driven piece 1011a is extracted and phase-regulated by a phase shifting circuit 1024 to be an input signal to the coil 1020. An output signal from the phase shifting circuit 1024 is amplitude-regulated by an AGC circuit 1025 so as to cause the input signal to generate a Lorentz's force for stable excitation with constant exciting amplitude. The input signal is supplied with auxiliary current at a driving circuit 1026 and input to the coil 1020. As seen from the front side of the x axis in FIG. 12, the right and left winding coils are excited such that current flows through the coils 1020 reversely in the z direction. For this reason, the right and left permanent magnets 1012 are magnetized in the reverse directions respectively with respect to the x axis, so that exciting forces due to the Lorentz's force are exerted on both permanent magnets 1012 in the same direction with respect to the y axis, thereby increasing the exciting amplitude.

Thus a positive feedback loop is formed and the driven piece 1011a is self-excited in the y direction with constant amplitude.

Assume that a vibration with an angular velocity Ω is applied to the vibrator 1011 around the z axis through the seat 1080 under this condition. In such a case, as shown in FIG. 12, a Coriolis force, proportional to the mass, the exciting speed and the angular velocity Ω, is caused on the driven piece 1011a and the specially loaded permanent magnet 1012 in the x direction (detecting direction), and transferred to the detecting piece 1011b through the flange 1011c to cause the detecting piece 1011b to be distorted in the x direction. Since the piezoelectric elements 1013 and 1014 are provided nearby the detecting piece 1011b, the load also distorts the piezoelectric elements 1013 and 1014 to cause charges on the surface electrodes in proportion to the distortion of the piezoelectric elements 1013 and 1014. The changes are extracted as signals and the angular velocity Ω applied around the z axis is obtained.

Next, the signal processing for obtaining the angular velocity Ω applied around the z axis from the charges (voltages) on the surface electrodes of the piezoelectric elements 1013 and 1014.

The distortion of the piezoelectric elements 1013 and 1014 is caused in opposite directions such that one is compressed and the other is stretched. Thus the voltages on the surface electrodes are of opposite phases to each other. As shown in FIG. 13, the voltages are respectively amplified by amplifiers 1027 and 1028, and a difference therebetween is determined by a differential circuit 1029, thereby doubling the output. The output signal is an AM wave generated at the exciting frequency and with the amplitude modulated by the Coriolis force (angular velocity). The output signal is passed through a band-pass filter 1030 so that all noise signal components over the band except those signals near the exciting frequency will be cut. Then the output signal is subjected to synchronous detection by a synchronism wave detecting circuit 1031 using a reference signal. The reference signal is created by a phase shifting circuit 1032 phase-regulating the output signal (excitation detection signal) from the photo-reflector 1021 through the amplifier 1022 and the band-pass filter 1023. The output signal from the synchronism wave detecting circuit 1031 is smoothed by a smoothing circuit 1033 and a modulated signal of angular velocity Ω applied around the z direction is obtained.

The phase shifting amount of the phase shifting circuit 1032 is regulated by means of a variable resistor or the like so as to perform the synchronous detection at a timing at which a null signal becomes the maximum or minimum through excitation caused by overlapping the output signal from the band-pass filter 1030. Since positive and negative areas of the null signal contained in a section of detected wave become equal to each other constantly, variations in amplitude of the null signal do not affect the output signal from the smoothing circuit 1033. Thus the stable angular velocity signal can be extracted with high accuracy. Further, the output signal from the smoothing circuit 1033 is integrated by an integrating circuit 1034 for obtaining the angular velocity signal (vibration (fluctuation) angle).

Figure 14:
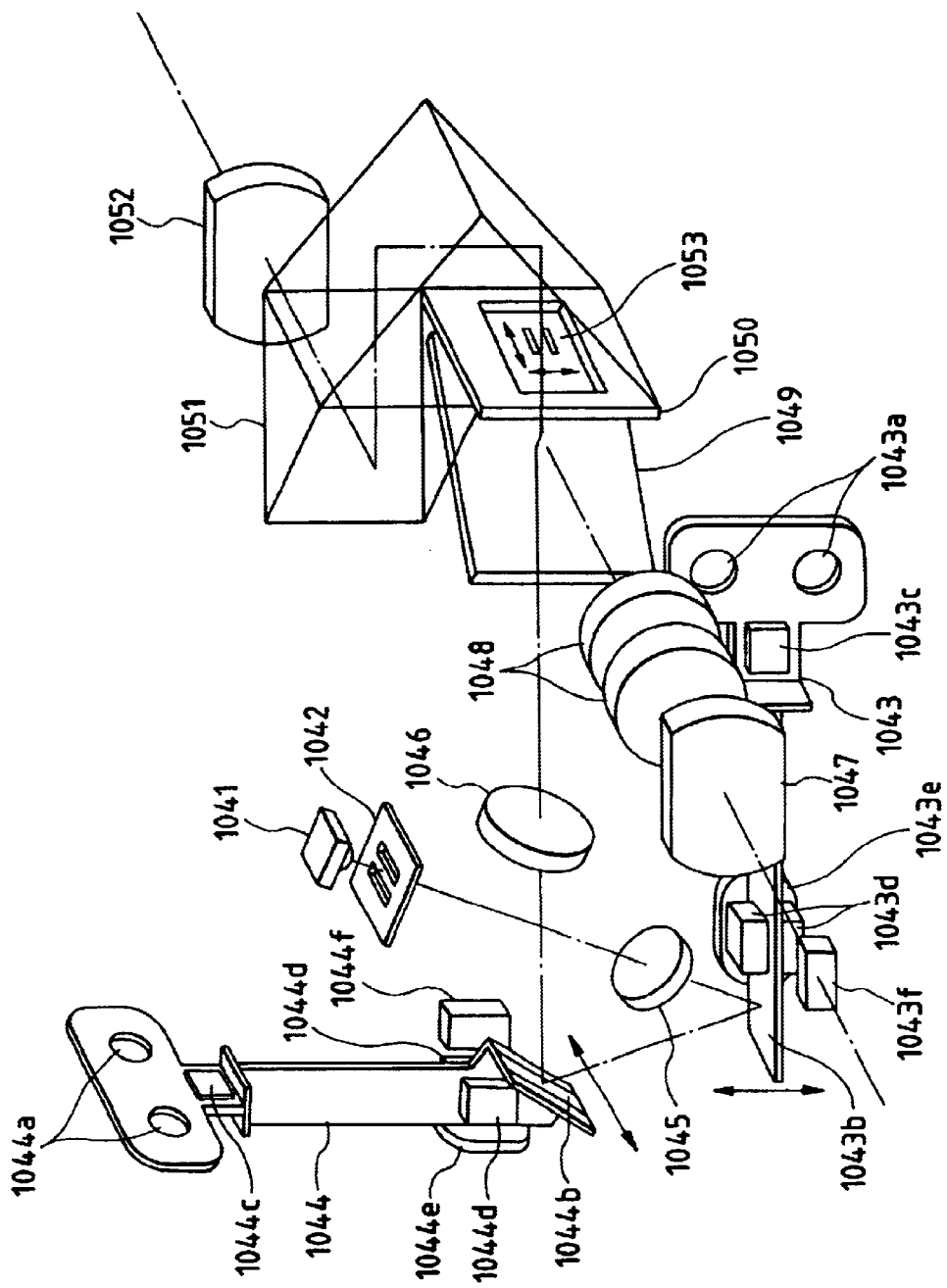
FIG. 14 is a perspective view showing an example of a finder display device in the compact camera according to each embodiment of the present invention.

FIG. 14 is a perspective view showing an arrangement of a finder display device in a camera according to the embodiment. The finder display device is provided with a vibration gyro, such as one shown in FIGS. 12 and 13, as part of a system for blur prevention display.

Referring to FIG. 14, there are shown a light source 1041 such as LED and a mask 1042 with two slender transmitting portion provided parallel to each other substantially at the center. A pitch vibration detecting sensor 1043 has an arrangement such as one shown in FIG. 12, and serves to detect a camera fluctuation in a pitch direction (i.e., in the vertical direction when the camera is set in the normal position). The pitch vibration detecting sensor 1043 is constituted of a fixing portions 1043a for fixing the sensor to an unillustrated base plate with screws or the like, a mirror-like reflection portion 1043b formed by polishing a top portion of the vibrator, a piezoelectric element 1043c applied at the root of the vibrator for detection a Coriolis force (the pitch vibration obtained here is used as one of control signals for blur correction by a correction optical apparatus to be described later), magnets 1043d applied on both sides of the vibrator, a coil 1043e fixed to the base plate, not shown, in the neighborhood of the magnets 1043d, and a position detecting sensor 1043f such as a photo-reflector for detecting a vibration position of the vibrator. In such a structure, a flow of predetermined current through the coil 1043e causes the vibrator with magnets 1043d applied thereon to vibrate at a predetermined frequency in the vertical direction of the camera. The mask 1042 is so arranged that the length-wise direction of the transmitting portions is perpendicular to the length-wise direction of the vibrator in the pitch vibration detecting sensor 1043.

A yaw vibration detecting sensor 1044 has an arrangement such as one shown in FIG. 12, and serves to detect a camera vibration (fluctuation) in a yaw direction (i.e., in the horizontal direction when the camera is set in the normal position). The yaw vibration detecting sensor 1044 is constituted of a fixing portions 1044a for fixing the sensor to an unillustrated base plate with screws or the like, a reflecting portion 1044b formed by bending up the top portion of the vibrator at a predetermined angle and polishing the middle of the bend portion linearly with a predetermined width with both ends of the bend portions shaded, a piezoelectric element 1044c applied at the root of the vibrator for detecting a Coriolos force (the yaw vibration obtained here is used as one of control signals for blur correction by a correction optical apparatus to be described later), magnets 1044d applied on both sides of the vibrator, a coil 1044e fixed to the base plate, not shown, in the neighborhood of the magnets 1044d, and a position detecting sensor 1044f such as a photo-reflector for detecting a vibration position of the vibrator. In such a structure, a flow of predetermined current through the coil 1044e causes the vibrator with the magnets 1043d applied thereon to vibrate at a predetermined frequency in the direction of the optical axis of the camera. The length direction of the reflecting portion 1044b and the length direction of the transmitting portions of the mask 1042 are arranged perpendicular to each other.

An imaging lens 1045 serves to form an image of light from the mask 1042 in the neighborhood of the reflecting portion 1044b of the yaw vibration detecting sensor 1044 through the reflecting portion 1043b of the pitch vibration detecting sensor 1043. An imaging lens 1046 serves to form an image of light, emitted from the light source and reflected by the reflecting portion 1044b, in the neighborhood of the image-forming surface of the finder. A real-image zooming finder system is constituted of an object lens 1047, variable-power lenses 1048, a half mirror 1049, a view frame 1050 located nearby the image-forming surface of the finder, a prism 1051 and an eyepiece lens 1052.

The light from the light source 1041 passes through the mask 1042 and an image of two slender parallel lines is produced. The image of light from the light source is passed through the imaging lens 1045, reflected by the reflecting portion 1043b of the pitch vibration detecting sensor 1043, and formed in the neighborhood of the reflecting portion 1044b of the yaw vibration detecting sensor 1044. Then the image of two slender parallel lines is reflected by the reflecting portion 1044b with a predetermined image length restricted by the polished width of the reflecting portion 1044b, passed through the image lens 1046 and the half mirror 1049 and formed in the neighborhood of the image-forming surface of the finder. Such an image is used as a blur prevention index 1053 to be described below.

The blur prevention index 1053 is overlapped by the half mirror 1049 on an image of a photographing object, and thus the photographer can observe it.

When the pitch vibration detecting sensor 1043 is excited, since the position and angle of the reflecting portion 1043b in the pitch direction vary, continuous flashing of the light source 1041 causes the light image (parallel line image) to vary its imaged positions on the reflecting portion 1044b and the finder image-forming surface, and hence the blur prevention index 1053 to shake in the pitch direction (vertical direction).

The surface of the bent portion on the reflecting portion 1044b is set at an angle such that the image of light from the light source is formed constantly in the neighborhood of the reflecting portion 1044b even when the pitch vibration detecting sensor 1043 is excited.

When the yaw vibration detecting sensor 1044 is excited, since the position of the reflecting portion 1044b in the yaw direction varies (the reflecting portion 1044b vibrates in the length-wise direction of the parallel line image), continuous flashing of the light source 1041 causes the light image (parallel line image) to vary its reflected range. In this case, the blur prevention index 1053 seems to shake in the yaw direction (lateral direction).

Figure 15:
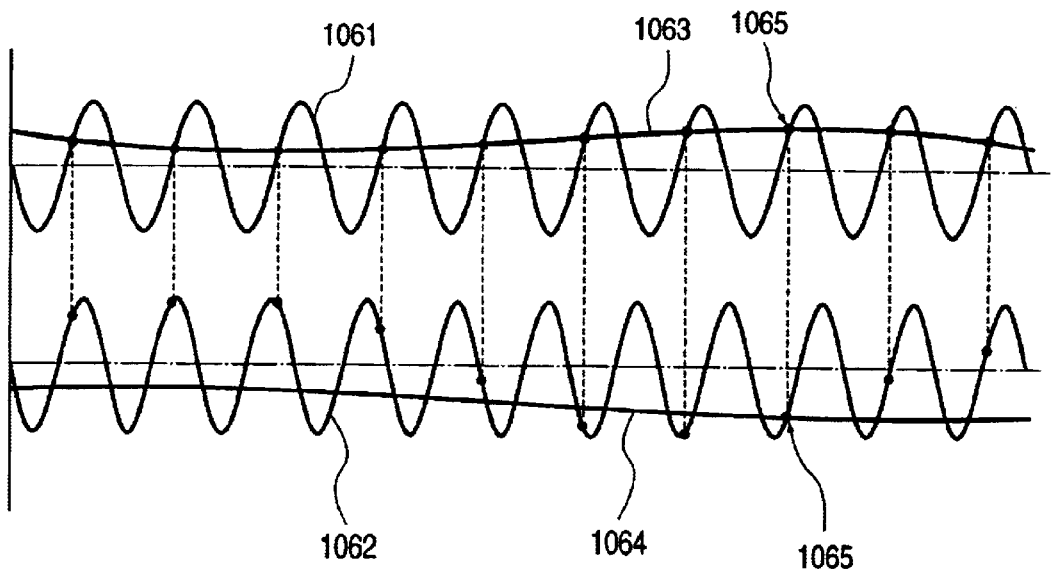
FIG. 15 is a diagram for explaining LED on timing for causing a blur prevention indication on the finder display device of FIG. 14.

FIG. 15 is a view for explaining flashing timing of the light source 1041 shown in FIG. 14.

Referring to FIG. 15, there are shown a pitch index position output 1061 determined by converting an output of the position detecting sensor 1043f for detecting the position of the vibrator in the pitch vibration detecting sensor 1043 into a pitch vibration angle on the basis of the relation of the blur prevention index 1053 to the display position, a yaw index position output 1062 determined by converting an output of the position detecting sensor 1044f for detecting the position of the vibrator in the yaw vibration detecting sensor 1044 into a yaw vibration angle on the basis of the relation of the blur prevention index 1053 to the display position, a pitch vibration angle output 1063 calculated from the output of the pitch vibration detecting sensor 1043, a yaw vibration angle output 1064 calculated from the output of the yaw vibration detecting sensor 1044, and an emission timing 1065 of the light source 1041.

FIG. 15 shows a case where the pitch vibration detecting sensor 1043 is excited at a frequency of 300 Hz and the yaw vibration detecting sensor 1044 is excited at a frequency of 330 Hz respectively for $1/30$ second. As shown in FIG. 15, the pitch index position output 1061 vibrates 10 times, while the yaw index position output 1062 vibrates 11 times.

When the pitch index position output 1061 tilts to positive (or negative, i.e., if the pitch index position output 1061 tilts positive and negative, the display position of the blur prevention index 1053 is deviated to cause an improper display blur because of a response delay of the emission timing of the light source 1041), the pitch index position output 1061 and the pitch vibration angle output 1063 intersect at ten points. When the light source 1041 is flashed at the intersecting points, i.e., at the instant the pitch index position output 1061 and the pitch vibration angle output 1063 intersect, the blur prevention index 1053 is displayed while shifting its position in accordance with the vibration only in the pitch direction (in the direction opposite to that of the vibration). However, the blur prevention index 1053 does not always indicate a true yaw vibration.

From this standpoint, the light source 1041 is flashed at emission timings at which the pitch index position output 1061 and the pitch vibration angle output 1063 intersect and the yaw index position output 1062 and the yaw vibration angle output 1064 are respectively within a predetermined value (the emission timings indicated by the arrows 1065), thereby displaying the blur prevention index 1053 while shifting its position in accordance with the vibration both in the pitch and yaw directions (in the directions opposite to those of the vibration).

Since frequencies of the pitch index position output 1061 and the yaw index position output 1062 deviate from each other at the rate of 10:11, the flashing timing appears at least once every 10 times of occurrence of the pitch vibration (once every 11 times of occurrence of the yaw vibration) (and hence the position of the blur prevention index 1053 corresponds to that of the vibration on the finder image plane (in the two-dimensional direction)). The light source 1041 is thus lighted once every $1/30$ second. Repetition of such a flashing operation makes the photographer feel the blur prevention index 1053 to be shifted continuously in correspondence to the vibration (in the directions opposite to those of the vibration) because of an afterimage effect (human eyes recognize light images flashing at intervals of $1/30$ second or more as a continuous light image because of afterimages).

Figure 16A:
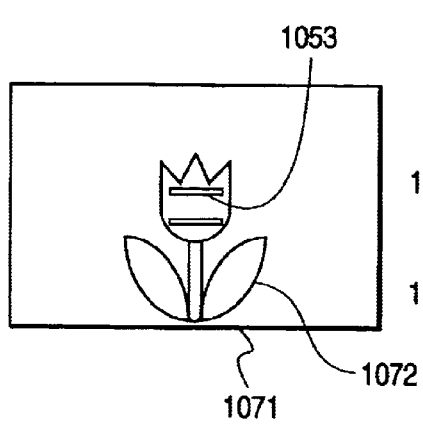
FIGS. 16A and 16B are diagrams showing an exemplary display on the finder display device of FIG. 14.
Figure 16B:
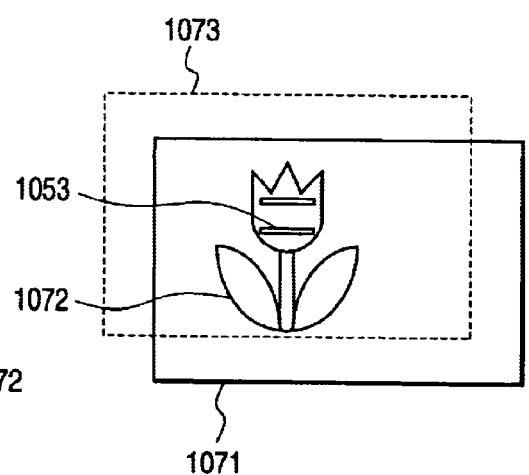

FIGS. 16A and 16B are illustrations of a finder view of a camera provided with the finder display device shown in FIG. 14. FIG. 16A shows an initial state when the blur prevention system is turned on, and FIG. 16B shows a state in which the camera it vibrated in the lower-right direction after the blur prevention system has been turned on, and the blur prevention index 1053 displayed is shifted in the direction opposite to that of the vibration (i.e., in the upper-left direction).

Referring to FIGS. 16A and 16B, there are shown a finder field 1071, a finder image 1072 of a photographic object and a finder field 1073 before the camera fluctuation.

The blur prevention index 1053 is initially displayed substantially at the center of the finder field 1071 as shown in FIG. 16A. Then, as shown in FIG. 16B, the camera is vibrated in the lower-right direction in FIG. 16B and the blur prevention index 1053 is shifted in the upper-left direction opposite to that of the vibration. In other words, the blur prevention index 1053 is displayed at a position corresponding to substantial center of the finder field 1073 before camera fluctuation, thus achieving a blur prevention effect.

As discussed above, the blur prevention index 1053 is displayed inside the finder field while continuously shifting its position so that blur correction can be performed. This enables the photographer to recognize the blur prevention effect intuitively. Further, since the vibration detecting sensors are used for actuators to be provided inside the finder for blur prevention display, a low-cost and compact finder display device with the blur prevention display function can be provided.

Figure 17:
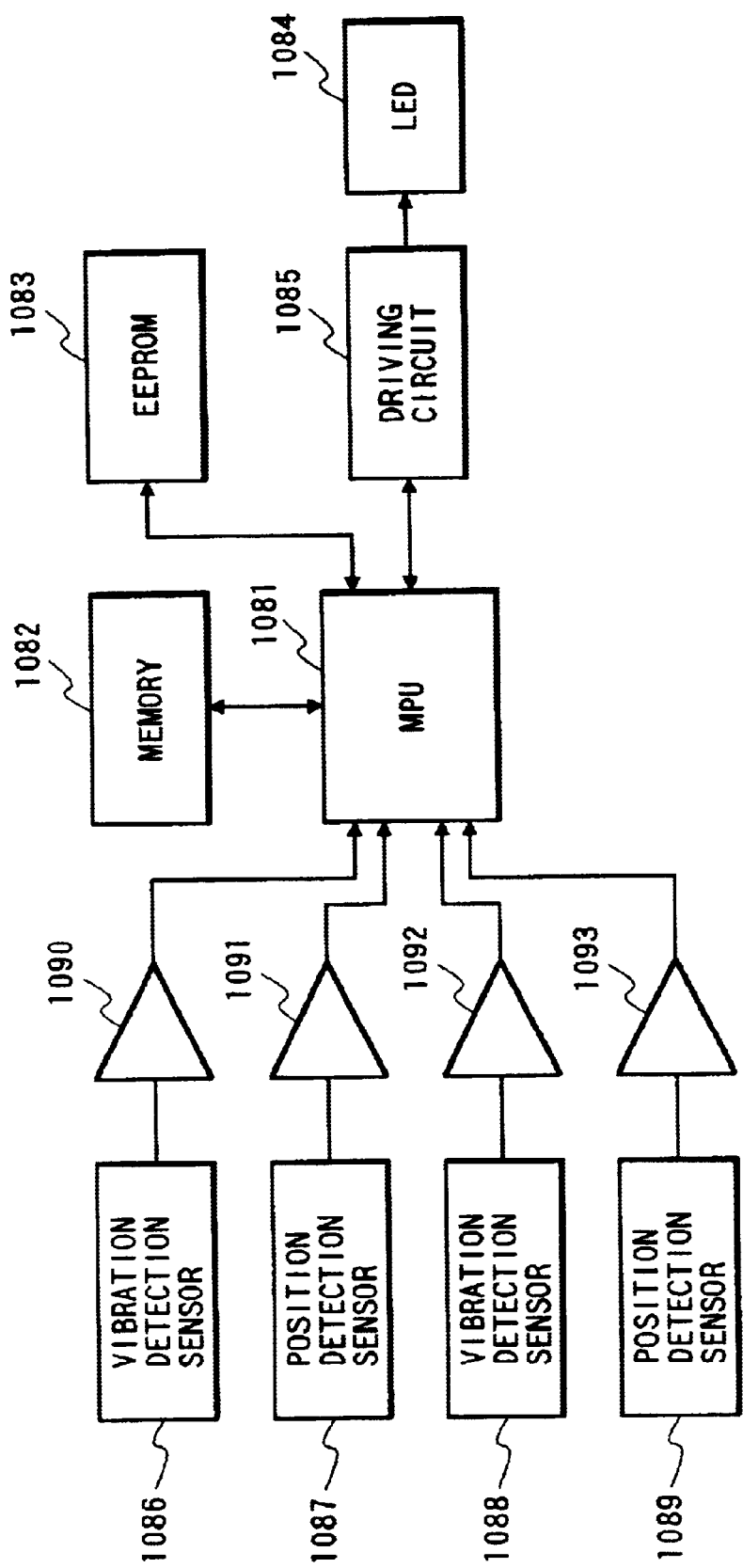
FIG. 17 is a block diagram showing a signal processing system in the finder display device having the blur prevention indicating function.

FIG. 17 is a block diagram showing a circuit structure of the finder display device of FIG. 14.

Referring to FIG. 17, there are shown an MPU (micro processing unit) 1081, a memory 1082, an EEPROM 1083, an LED 1084 for displaying the index on the finder (corresponding to the light source 1041 of FIG. 14), a driving circuit 1085 for driving the LED 1084, a vibration detecting sensor 1086 for detecting a vibration in the pitch direction (corresponding to the pitch vibration detecting sensor 1043 of FIG. 14), a position detecting sensor 1087 for detecting the position of the vibrator in the pitch vibration detecting sensor 1086. (corresponding to the position detecting sensor 1043f of FIG. 14), a vibration detecting sensor 1088 for detecting a vibration in the yaw direction (corresponding to the yaw vibration detecting sensor 1044 of FIG. 14), a position detecting sensor 1089 for detecting the position of the vibrator in the yaw vibration detecting sensor 1088 (corresponding to the position detecting sensor 1044f of FIG. 14), and amplification circuits 1090, 1091, 1092 and 1093.

In FIG. 17, the vibration detecting sensors 1086, 1088 and the vibration detecting sensors 1087, 1089 are connected to A/D conversion input terminals of the MPU 1081.

Figure 18:
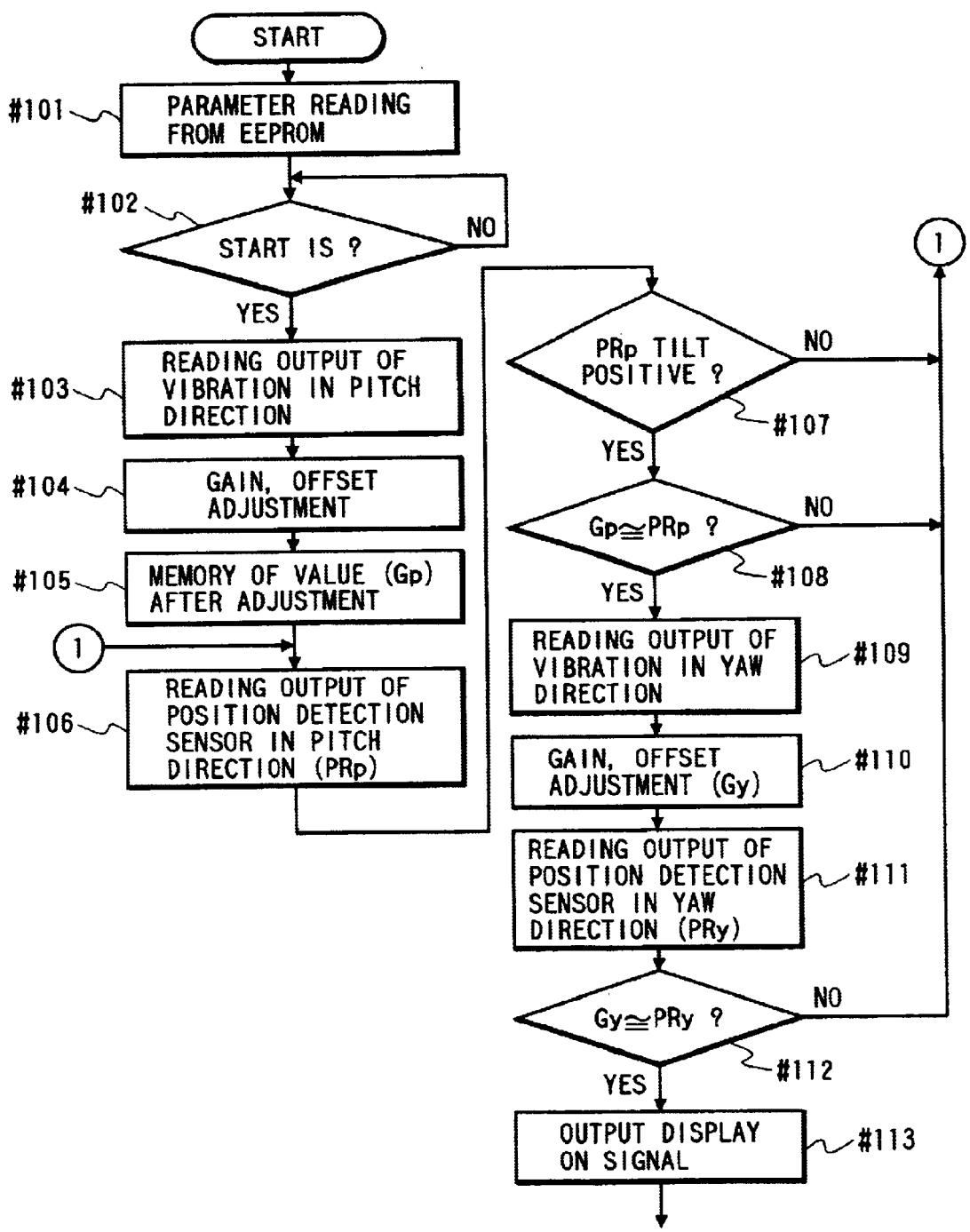
FIG. 18 is a flowchart showing an operation for performing the blur prevention indication using the signal processing system of FIG. 17.

Referring next to the flowchart of FIG. 18, description will be made of an operation sequence executed by the MPU 1081 for the photographer recognizing the blur prevention effect from the display on the finder.

When the main camera sequence is started, for example, by switching on the main switch of the camera, the MPU 1081 reads from the EEPROM 1083 parameters related to display of the blur prevention index 1053 on the finder during a sequence of initial operations, and stores the parameters into a predetermined address of the memory 1082 (step #101).

Then, if the IS (blur prevention) is started by half switching on the release operation element (i.e., if YES in step #102), the MPU 1081 initializes variables before the processing and reads from the A/D conversion input terminal an output of the vibration detecting sensor 1086 for detecting a vibration in the pitch direction (step #103).

After that, offset and gain adjustment are performed (step #104). The offset adjustment is performed such that offset deviations of the vibration detecting sensor 1086 and the position detecting sensor 1087 through the amplification circuits 1090 and 1091 are corrected when the vibration detecting sensor 1086 for detecting a vibration and the position detecting sensor 1087 for detecting the position of the vibrator in the vibration detecting sensor 1086 are not operating (i.e., when the vibrator in the vibration detecting sensor 1086 is turned off so that outputs of the vibration detecting sensor 1086 and the position detecting sensor 1087 become zero).

Since a comparison of the signals from the vibration detecting sensor 1086 and the position detecting sensor 1087 through the amplification circuits 1090 and 1091 give a gap between an actual blur prevention effect and the photographer's feeling even when the offset adjustment has been performed for the signals, the gain adjustment is performed for correcting the gap. More specifically, since an actual vibration amount on the finder is not equal to a current position of the vibrator in the vibration detecting sensor 1086 even when the signal from the vibration detecting sensor 1086 through the amplification circuit 1090 is equal to the signal from the position detecting sensor 1087 through the amplification circuit 1091, the output of the vibration detecting sensor 1086 is subjected to gain adjustment, the gain-adjusted output is converted into a vibration amount on the finder, and the blur prevention index is displayed at a position of the vibrator in the vibration detecting sensor 1086 in correspondence to the vibration amount.

In actual practice, the MPU 1081 executes the offset and gain adjustment using the following equation:

$$Gp = AMPp(Gp' - OFFSETp),$$

where $Gp$ represents an output of the vibration detecting sensor 1086 after adjustment, $Gp'$ represents an output of the vibration detecting sensor 1086 before adjustment, OFFSETp is a constant for offset adjustment and AMPp is a constant for gain adjustment. OFFSETp and AMPp are prestored in the EEPROM 1083. The value of OFFSETp is obtained as a difference between outputs of the vibration detecting sensor 1086 and the position detecting sensor 1087 when both are not operating, and stored in the EEPROM 1083. AMPp is a constant used for, converting the output of the vibration detecting sensor 1086 into a vibration amount on the finder so that the blur prevention index will be displayed at a position of the vibrator in the vibration detecting sensor 1086 in correspondence to the vibration amount. The value of AMPp is determined by experiment and stored in the EEPROM 1083.

If the Gp value is larger than the vibration amplitude of the vibrator in the vibration detecting sensor 1086, the Gp value is replaced by a value of either of both ends. Assuming that the position detecting sensor 1087 for detecting the position of the vibrator has an output range of between PRpmin and PRpmax, if less than PRpmin, the Gp value is determined as $Gp = PRpmin$.

If more than PRpmax, the Gp value is determined as $Gp = PRpmax$.

Such replacement is performed so as to display the blur prevention index 1053 inside the finder image plane securely because the blur prevention index 1053 is assumed to be displayed in the output relation shown in FIG. 15.

The output Gp of the vibration detecting sensor 1086 obtained after offset and gain adjustment is stored in the memory 1082 (step #105).

Next, an output PRp of the position detecting sensor 1087 for detecting the position of the vibrator in the pitch vibration detecting sensor 1086 is read from the A/D conversion input terminal (step #106). It is then checked whether or not the output signal from the position detecting sensor 1087 tilts positive (step #107). Such a check is made by comparing the currently read output value PRp with the previous output of the position detecting sensor 1087 stored in the memory 1082. If the value stored in the memory 1082 is an initialized value, it is determined that the output of the position detecting sensor 1087 does not tilt positive. If the output of the position detecting sensor 1087 does not tilt positive (if NO in step #107), the operation returns to step #106 in which the output of the position detecting sensor 1087 for detecting the position of the vibrator in the pitch vibration detecting sensor 1086 is read again from the A/D conversion input terminal, and the check is made again in step #107 as to whether or not the output of the position detecting sensor 1087 tilts positive. This processing step is repeated until the output of the position detecting sensor 1087 shows a positive tilt.

After that, when the output of the position detecting sensor 1087 shows a positive tilt (i.e., if YES in step #107), the output PRp of the position detecting sensor 1087 is compared with the output Gp of the vibration detecting sensor 1086 after offset and gain adjustment stored in the memory 1082 (step #108). As a result, if the difference is equal to or less than the parameter read from the EEPROM 1083 into the memory 1082 during the sequence of initial operations, both values are regarded as substantially equal to each other, i.e., the vibrator in the pitch vibration detecting sensor 1086 is regarded as being in a vibrating state capable of displaying the blur prevention index 1053 at a position at which the vibration in the pitch direction is being indicated inside the image plane (the output 1061 corresponding to each position indicated by the black dot 1063 in FIG. 15). Then the operation advances to step #109. On the other hand, if both values are not regarded as Lq substantially equal to each other (i.e., if NO in step #108), the operation returns to step #106 in which the output of the position detecting sensor 1087 for detecting the position of the vibrator in the pitch vibration detecting sensor 1086 is read again from the A/D conversion input terminal, and the processing step is repeated in the same manner as such above.

In the next step #109, the MPU 1081 reads from the A/D conversion input terminal an output of the vibration detecting sensor 1088 for detecting a vibration in the yaw direction. Then, offset and gain adjustment is performed (step #110) in the same manner as for the output of the vibration detecting sensor 1086 for detecting a vibration in the pitch direction. In actual practice, the MPU 1081 executes the offset and gain adjustment using the following equation:

$Gy=AMPy(Gy'-\text{OFFSET}y)$, where Gy represents an output of the vibration detecting sensor 1088 after adjustment, Gy' represents an output of the vibration detecting sensor 1088 before adjustment, OFFSETy is a constant for offset adjustment and AMPy is a constant for gain adjustment. OFFSETy and AMPy are prestored in the EEPROM 1083. The value of OFFSETp is obtained as a difference between outputs of the vibration detecting sensor 1088 and the position detecting sensor 1089 when both are not operating, and stored in the EEPROM 1083. AMPP is a constant used for converting the output of the vibration detecting sensor 1088 into a vibration amount on the finder so that the blur prevention index will be displayed at a position of the vibrator in the vibration detecting sensor 1088 in correspondence to the vibration amount. The value of AMPp is determined by experiment and stored in the EEPROM 1083.

If the Gy value is larger than the vibration amplitude of the vibrator in the vibration detecting sensor 1088, the Gp value is replaced by a value of either of both ends. Assuming that the position detecting'sensor 1089 for detecting the position of the vibrator has an output range of between PRymin and PRymax, if less than PRymin, the GP value is determined as Gy=PRymin.

If more than PRymax, the Gy value is determined as

Gy=PRymax.

The output Gy of the vibration detecting sensor 1088 obtained after offset and gain adjustment is stored in the memory 1082 (step #110).

Next, the MPU 1081 reads from the A/D conversion input terminal an output PRy of the position detecting sensor 1089 for detecting the position of the vibrator in the yaw vibration detecting sensor 1088 (step #111). Then, it compares the current output PRy of the position detecting sensor 1089 with the output Gy of the vibration detecting sensor 1088 after offset and gain adjustment stored in the memory 1082 (step #112). As a result of the comparison, if the difference is equal to or less than the parameter read from the EEPROM 1083 into the memory 1082 during the sequence of initial operations, both values are regarded as substantially equal to each other, i.e., the vibrator in the yaw vibration detecting sensor 1088 is regarded as being in a vibrating state capable of displaying the blur prevention index 1053 at a position at which the vibration in the yaw direction is being indicated inside the image plane. Then the operation advances to step #113 in which the blur prevention index 1053 is displayed. On the other hand, if both values are not regarded as substantially equal to each other, the operation returns to step #106 and starts from the processing step in which the output of the position detecting sensor 1087 for detecting the position of the vibrator in the pitch vibration detecting sensor 1086 is read again from the A/D conversion input terminal.

In step #113 for displaying the blur prevention index 1053, the MPU 1081 outputs a display on signal to the driving circuit 1085 (this timing corresponds to each emission timing indicated by the arrow 1065 in FIG. 15). While the display on signal is being output, the driving circuit 1085 keeps the LED 1084 on. Thus the blur prevention index 1053 is displayed as shown in FIGS. 16A and 16B as long as the LED 1084 is on-state.

As discussed above, the blur prevention index 1053 is displayed under the following conditions: Both outputs of the position detecting sensor 1087 for detecting the position of the vibrator in the pitch direction and the vibration detecting sensor 1086 for detecting the vibration are substantially equal to each other, the output signal from the position detecting sensor 1087 tilts positive (or negative), and both outputs of the position detecting sensor 1089 for detecting the position of the vibrator in the yaw direction and the vibration detecting sensor 1088 for detecting the vibration are substantially equal to each other. Since such an index displayed on the finder always follows the object to be observed through the finder, the blur prevention effect can be confirmed.

Figure 19:
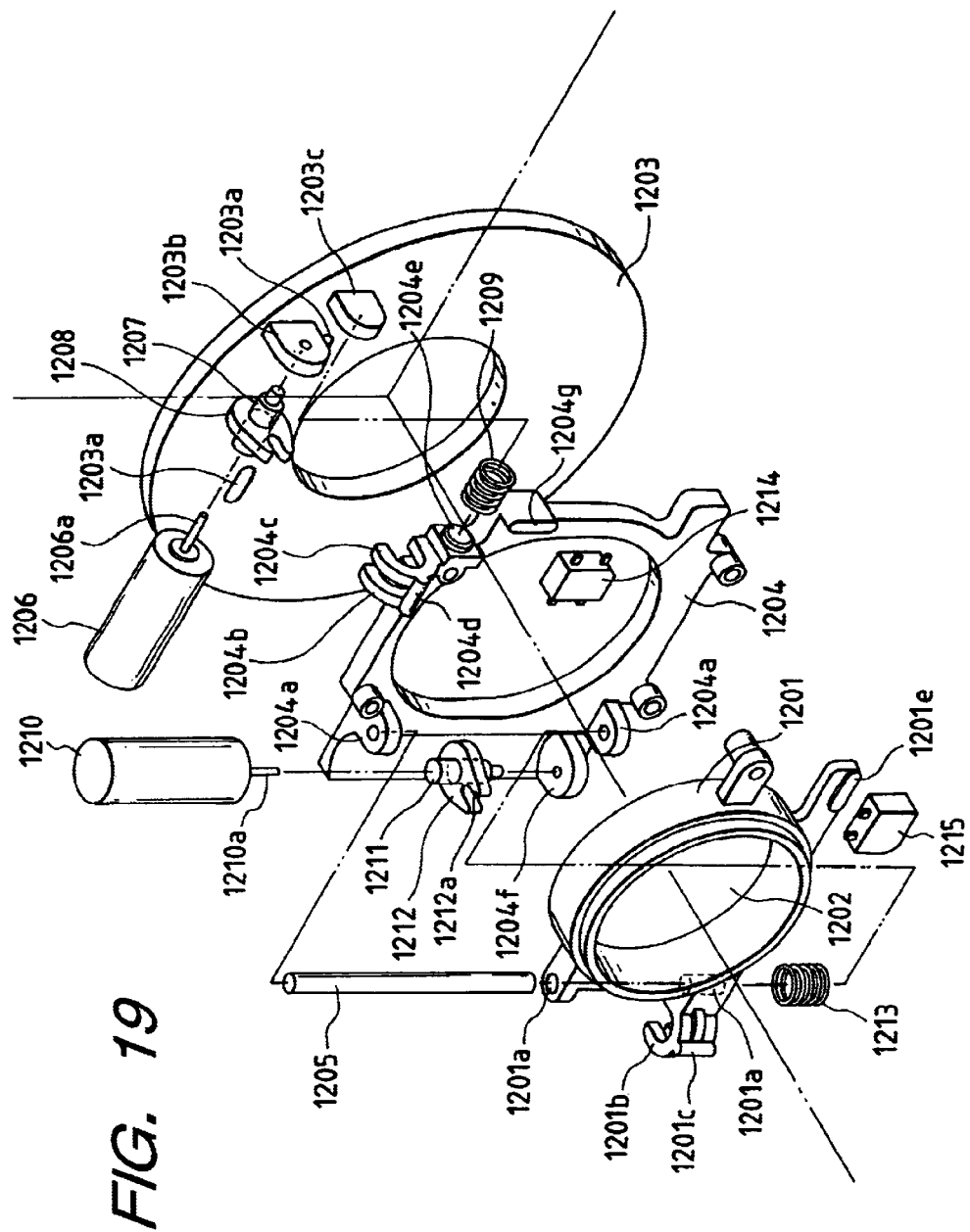
FIG. 19 is a perspective view showing an example of mechanical arrangement of a correction optical apparatus provided in the compact camera according to each embodiment of the present invention.
Figure 20A:
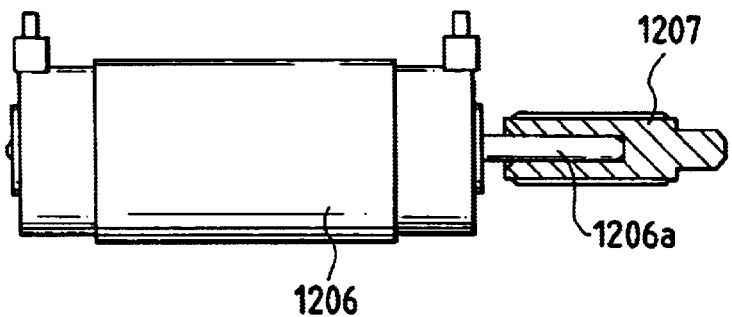
FIGS. 20A and 20B are enlarged side views showing details and a modification of a feed screw portion to be fixed to an output shaft of the motor shown in FIG. 19.
Figure 20B:
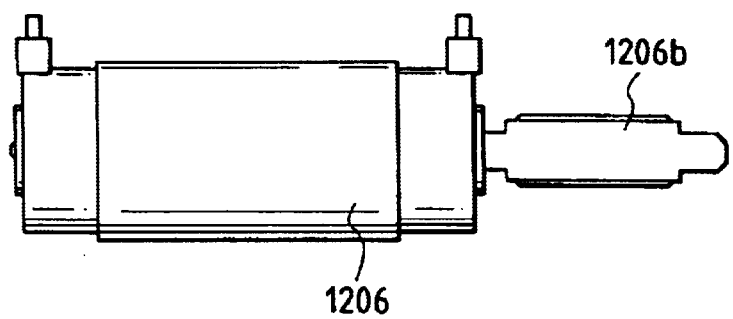
Figure 21:
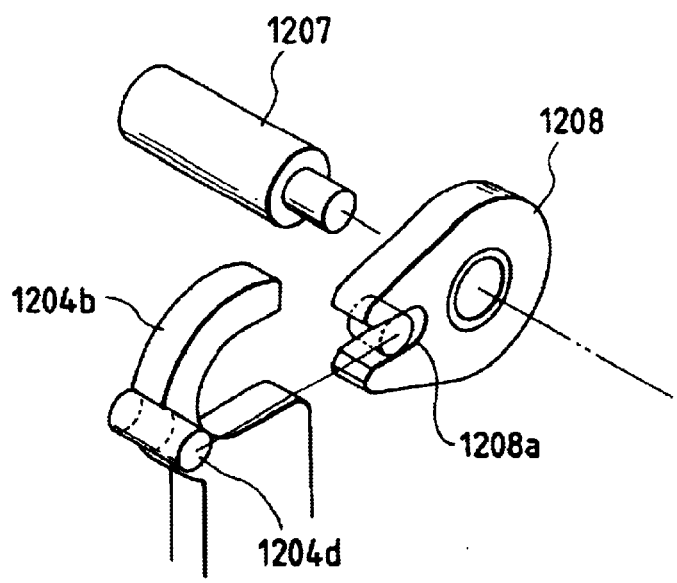
FIG. 21 is an enlarged perspective view showing a mechanism for moving a lens holder by means of the motor shown in FIG. 19.

FIGS. 19 to 21 are perspective views of a correction optical apparatus mounted in a camera according to the embodiment.

Referring to FIG. 19, a lens holder 1201 holds a correction lens 1202 at the center. The correction lens 1202 can be displaced within a plane intersecting at right angles to the optical axis so as to deflect an incident beam of light. Thus a camera vibration (fluctuation) can be corrected by detecting the camera vibration and displacing the correction lens so as to deflect the beam in a direction opposite to that of the camera vibration. A base plate 1203 is provided inside the lens barrel, which serves as a base for supporting a lens-shift mechanism. A yaw holder 1204 is provided with a projection, not shown, which is permitted to be displaced in the yaw direction alone by fitting the projection in an elongated hole 1203a of the base plate 1203.

A guide bar 1205 penetrates a guide hole 1201a formed in the lens holder 1201. Both ends of the guide bar 1205 are supported by bearings 1204a of the yaw holder 1204 such that the axis is made correspondent to the pitch direction. In such a structure, the lens holder 1201 can be displaced in the pitch direction alone on the yaw holder 1204, while the yaw holder 1204 can be displaced in the yaw direction alone with respect to the base plate 1203. Both displacements allow the correction lens 1202 to be displaced both in the pitch and yaw directions accordingly.

A yaw motor 1206 is a step motor with its rotating shaft 1206a arranged to extend perpendicularly to the optical axis. A feed screw 1207 with a male screw thread cut on the outer surface is fixed to the rotating shaft 1206a. FIG. 20A shows the fixed portion in details. As shown in FIG. 20A, the rotating shaft 1206a is inserted into the feed screw 1207 and fixed with adhesive. The rotating shaft may be subjected to screw cutting directly instead of the feed screw 1207 as shown (at a portion 1206b) in FIG. 20B.

A nut 1208 with a female screw thread cut on the inner surface is provided such that the feed screw 1207 is screwed therein. The nut 1208 has a U-type portion 1208a into which a vibration preventing member 1204d to be described later is inserted. The tip of the feed screw 1207 is fitted in a bearing portion 1203b of the base plate 1203. The yaw motor 1206 is so arranged that its axis extends in the yaw direction and fixed to the base plate 1203 with adhesive or the like. Nut receiving portions 1204b and 1204c are provided in the yaw holder 1204 for inserting the nut 1208 therebetween and a vibration preventing portion 1204d is provided for preventing the nut 1208 from rotating.

A relationship among the feed screw 1207, the nut 1208 and the yaw holder 1204 will be described with reference to FIGS. 19 to 21.

The nut 1208 is engaged with the feed screw 1207, while it is inserted between the nut receiving portions 1204b and 1204c of the yaw holder 1204. The vibration preventing portion 1204d is then inserted in the U-type portion 1208a to prevent the nut 1208 from rotating. When the yaw motor 1206 runs, the feed screw 1207 fixed to the motor shaft 1206a rotates. Although the rotation of the feed screw 1207 forces the nut 1208 to rotate, the nut 1208 does not rotate but moves in the axial direction of the screw by a screw pitch for each revolution of the yaw motor 1206 because the U-type portion 1208a of the nut 1208 is prevented from rotating by means of the vibration preventing portion 1204d.

When the nut 1208 moves in the axial direction of the screw, it strikes the yaw holder 1204 to move the yaw holder 1204 together. A yaw spring 1209 is arranged between a spring receiving portion 1204e of the yaw holder 1204 and a spring receiving portion 1203c of the base plate 1203, which serves to force the yaw holder 1204 in the yaw direction (to the left in FIG. 19). Since the yaw holder 1204 is forced to the left, the nut 1208 and the yaw holder 1204 are displaced together in the condition that the right face of the nut 1208 and the left face of the nut receiving portion 1204c of the yaw holder 1204 are kept in contact with each other constantly.

The respective threads of the feed screw 1207 and the nut 1208 are cut with fine pitches so as to inhibit the feed screw 1207 from rotating due to an axial force of the nut 1208 to the feed screw 1207. In other words, the nut 1208 moves due to revolution of the yaw motor 1206 and stops at the position when the yaw motor 1206 stops by stopping energizing of the motor 1206.

A pitch motor 1210 is a step motor with its rotating shaft 1210a arranged to extend perpendicularly to the optical axis. The pitch motor 1210 is fixed on the yaw holder 1204. As is similar to the yaw motor 1206, the feed screw 1211 with a male screw thread cut on the outer surface is fixed to the rotating shaft 1210a. The feed screw 1211 is screwed in a nut 1212 with the tip of the feed screw fitted in a bearing portion 1204f of the yaw holder 1204. The nut 1212 is inserted between a nut receiving portions 1201b and 1201c of the lens holder 1201. The nut 1212 has a U-type portion 1212a into which a vibration preventing member 1201d is inserted. Thus the nut 1212 is prevented from rotating by means of the vibration preventing member 1201d. The lens holder 1201 is forced on the yaw holder 1204 upwardly in FIG. 19 by means of a pitch spring 1213 arranged between the bearing portion 1204a of the yaw holder 1204 and the holder itself. As is similar to the case of the yaw direction, when the pitch motor 1210 runs, the feed screw 1211 fixed to the motor shaft rotates. However, since nut 1212 is prevented from rotating by means of the vibration preventing portion 1201d of the lens holder 1201, it moves in the axial direction by a screw pitch for each turn of the feed screw 1211 to move the lens holder 1201 while contacting the receiving portion 1201c of the lens holder 1201. Since the lens holder 1201 is forced upwardly by means of the pitch spring 1213, the nut 1212 and the lens holder 1201 are displaced together in the condition that the lower face of the nut 1212 and the upper face of the receiving portion 1201c of the lens holder 1201 are kept in contact with each other constantly.

In such a structure, the lens holder 1201 is displaced in the pitch direction on the yaw holder 1204 in accordance with the revolution of the pitch motor 1210.

The yaw spring 1209 and the pitch spring 1213 are so arranged as to push the vicinity of an axis as guide direction for displacement of the lens holder 1201. In other words, the pitch spring 1213 pushes the lens holder 1201 on the axis of the guide bar 1205, while the yaw spring 1209 pushes the vicinity of the elongated hole 1203a in the length-wise direction. Thus the lens holder 1201 is displaced smoothly while preventing the spring pressures from applying the moment of rotations to the lens holder 1201. Further, since the pitch spring 1213 is arranged such that the spring force and gravity is never exerted in one direction, the lens holder 1201 is forced in a direction opposite to gravity (the upward direction in FIG. 19).

A known photo-reflector is used here as a yaw displacement sensor 1214. A reflecting portion 1204g for the sensor is provided in the yaw holder 1204, which is painted white for increasing the reflectivity. The yaw displacement sensor 1214 is fixed to a cover, not shown. When the yaw holder 1204 is displaced in the yaw direction, the light amount of the photo-reflector to be reflected by the reflecting portion varies, thereby detecting the displacement of the yaw holder 1204. As is similar to the case of the yaw direction, a known photo-reflector is used as a pitch displacement sensor 1215, which is fixed to the cover. A reflecting portion 1201e is also provided in the lens holder 1201, which is painted white for increasing the reflectivity in the same manner as the reflecting portion 1204g.

When the lens holder 1201 is displaced in the pitch direction, the light amount of the photo-reflector to be reflected by the reflecting portion 1201e varies, thereby resulting in detection of the displacement of the lens holder 1201. The reflecting portion 1201e is formed long in parallel to the yaw direction. For this reason, the light amount of the photo-reflector to be reflected does not vary even when the lens holder 1201 is displaced in the yaw direction by the displacement of the yaw holder 1204. Thus the light amount varies according to the displacement in the pitch direction alone.

In such a structure, the displacement of the lens holder 1201 both in the pitch and yaw directions becomes detectable separately in the pitch direction and the yaw direction.

As discussed above, the pitch motor 1210 is fixed on the yaw holder 1204 to displace the lens holder 1201 (the correction lens 1202) in the pitch direction, while the yaw motor 1206 is fixed on the base plate 1203 to displace the correction lens 1202 in the yaw direction together with the yaw holder 1204 and the pitch motor 1210. Since the direction to displace the motor and correction lens 1202 is set to "yaw direction=horizontal direction", and the direction to displace only the correction lens 1202 is set to "pitch direction=vertical direction", only the correction lens 1202 is displaced in the vertical direction which gravity affects, thereby preventing a large load.

Further, when the correction lens 1202 is displaced as discussed above, since the correction lens 1202 and the pitch motor 1210 are driven together, the relative displacement therebetween is not caused. It is therefore possible to simplify the structure and smooth the movement compared with a structure in which the pitch motor 1210 is fixed on the base plate 1203. When the pitch motor 1210 is fixed on the base plate 1203, since the relative displacement is caused therebetween, a sliding member is required for sliding the lens holder. Such a sliding member causes friction between the sliding member and the lens holder when they are driven in the yaw direction, so that the driving load becomes large due to the frictional resistance and the structure is made complicated. Further, a response delay due to a backlash also causes a trouble. Such drawbacks can be solved with the above structure.

Furthermore, since the pitch motor 1210 and the yaw motor 1206 are arranged such that the rotating directions of the respective rotating shafts 1210a and 1206a, i.e., the light-wise direction of the respective motors, are made correspondent to the direction perpendicular to the optical axis, the structure of the correction optical apparatus can be made flat. For this reason, the correction optical apparatus is formed into a long shape in the optical direction, thereby reducing the apparatus size. When such a correction optical apparatus is incorporated in a camera, the motors can be arranged in a space provided around the lenses for letting shutter vanes escape and the like, thereby properly improving effective utilization of the space when the correction optical apparatus is incorporated in a camera.

Furthermore, since the moving direction of the correction lens 1202 (lens holder) agrees with that of the rotating shaft of each motor, when compared with a conventional correction optical apparatus for connecting power of a conventional motor to a cam so as to displace a correction lens, the correction lens 1202 can be displaced through the feed screw as shown in FIG. 19 by a screw pitch for each revolution of the motor (when using the cam, since full stroke of the correction lens must be accomplished within each revolution of the motor, the lens moving amount becomes large at each rotating angle of the motor to require a large force and the accuracy is reduced). It is therefore possible for the correction optical apparatus to give enough power without any reduction gears and perform control with high accuracy. Specifically, if one pitch of the screw is 0.2 mm, the motor makes a turn five times per 1 mm stroke.

Next, an operation of the above correction optical apparatus will be described in brief.

When power is connected to a camera, the yaw displacement sensor 1214 and the pitch displacement sensor 1215 detect the position of the lens holder 1201 from light amounts to be reflected by the reflecting portions 1204g of the yaw holder 1204 and 1201e of the lens holder 1210 so as to drive the yaw motor 1206 and the pitch motor 1210 to move the correction lens 1202 to a position at which the center of the correction lens 1202 corresponds to the center of the photographing optical system (optical axis). When stopping energizing of the motors, the correction lens 1202 is stopped and kept at the position. If there is no need to correct the camera vibration (fluctuation), the photographing operation is performed while maintaining the correction lens 1202 at the center position. If there is a need to correct the camera vibration (fluctuation) in the photographing operation, the yaw motor 1206 and the pitch motor 1210 are driven on the basis of signals from the vibration detecting sensors 1086 and 1088 shown in FIG. 14 to displace the yaw holder 1204 and the lens holder 1201 (correction lens 1202) in a direction in which the camera vibration (fluctuation) is offset.

Figure 22:
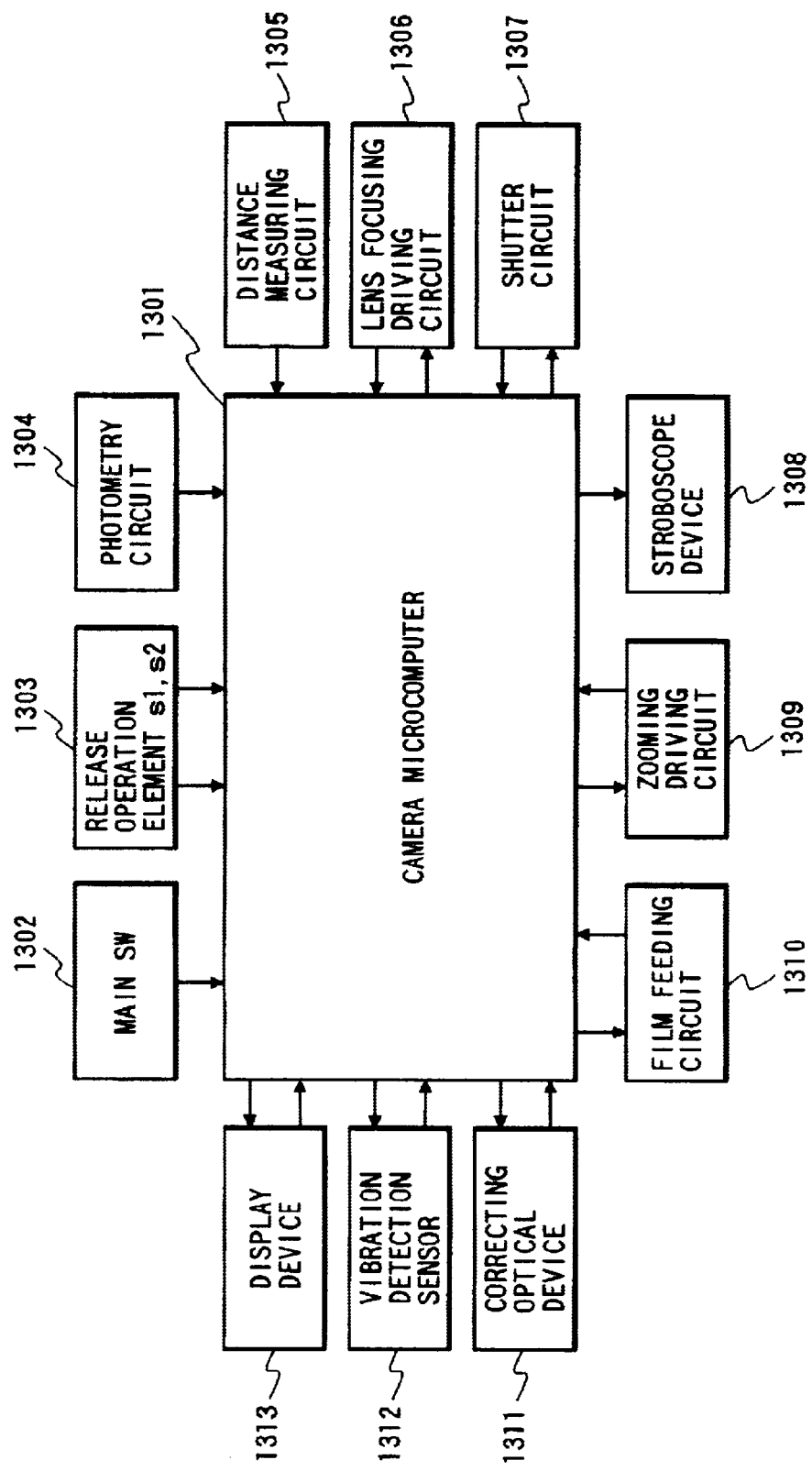
FIG. 22 is a block diagram showing a circuit structure of a compact camera according to a fourth embodiment of the present invention.

FIG. 22 is a block diagram showing an arrangement of a blur prevention system with the above correction apparatus, vibration detecting sensors, and the like. It also shows an electrical arrangement of a camera with a finder display device and the like. The camera is assumed here to be a compact camera capable of collapsing the taking lens in the body.

Referring to FIG. 22, there are shown a camera microcomputer 1301, a camera main switch 1302 and a release operation element 1303. The release operation element 1303 serves to cause an s1 signal for starting a photographing preparing operation, i.e., for starting photometry and distance measuring by half switching on the release operation element 1303, and an s2 signal for starting a photographing operation (exposure operation) by full switching on the release operation element 1303. The camera also includes a photometry circuit 1304 for calculating photometric information, a distance measuring circuit 1305 for calculating distance measuring information, a lens focusing driving circuit 1306 for focus control of the taking lens, a shutter circuit 1307 for opening and closing the shutter, a stroboscope device 1308, a zooming driving circuit 1309 for focal distance control of the taking lens, a film feeding circuit 1310 for rolling up or rewinding a film, a correction optical apparatus 1311 such as one shown in FIG. 19 and a vibration detecting sensor 1312 such as one shown in FIG. 14 also used for an actuator for blur prevention display. The vibration detecting sensor 1312 serves to detect a vibration used for blur prevention display and blur correction by the correction optical apparatus. A display device 1313 includes a means for performing blur prevention display (for displaying a blur prevention index) inside the finder shown in FIGS. 16A and 16B.

The camera microcomputer 1301 receives a signal from the main switch 1302, s1 and s2 signals from the release operation element 1303, photometric information from the photometry circuit 1304 and distance measuring information from the distance measuring circuit 1305, respectively. The camera microcomputer 1301 controls, on the basis of these signals, operations of the lens focusing driving circuit 1306, the shutter circuit 1307, the stroboscope device 1308, the zooming driving circuit 1309, the film feeding circuit 1310, the correction optical apparatus 1311, the vibration detecting sensor 1312 and the display device 1313.

The camera microcomputer 1301 also receives other necessary information from the above circuits and apparatus, respectively, e.g., position information of the taking lens and revolution information of the focusing lens driving motor from the lens focusing driving circuit 1306, shutter opening amount information from the shutter circuit 1307, taking-lens feeding amount information from the zooming driving circuit 1309, film feeding state information and feeding-motor loading information from the film feeding circuit 1310, correction-lens position (displacement) information from the correction optical apparatus 1311 and camera vibration (fluctuation) information from the vibration detecting sensor 1312.

The camera microcomputer 1301 also serves to make the display device 1313 indicate the status of the above plural circuits and the apparatus and the blur prevention state. Further, the camera microcomputer 1301 can turn on the stroboscope device 1308 for providing an additional light amount at the time of the photographing operation if required.

Figure 23:
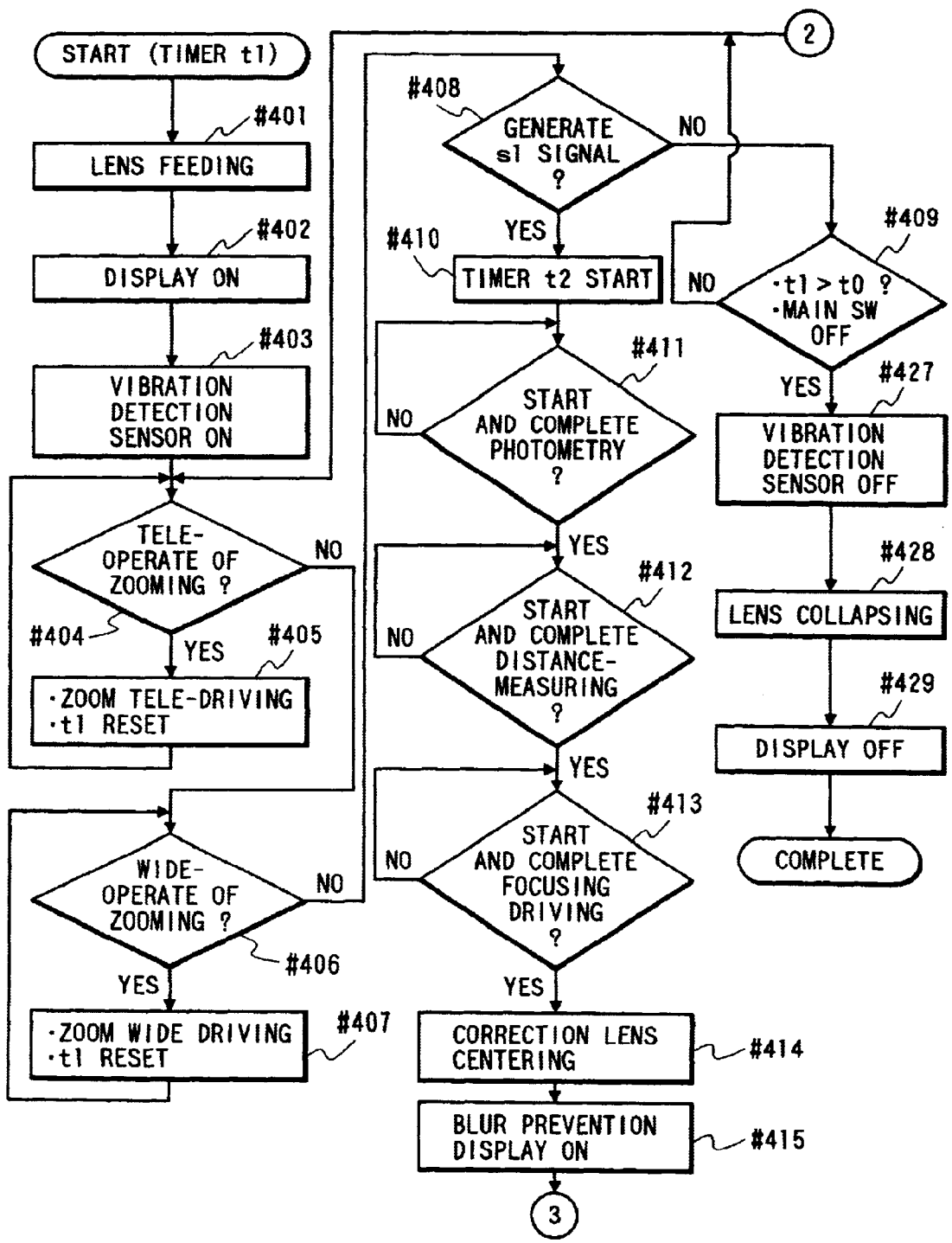
FIG. 23 is a flowchart showing a portion of a sequence of operations in the camera of FIG. 22.
Figure 24:
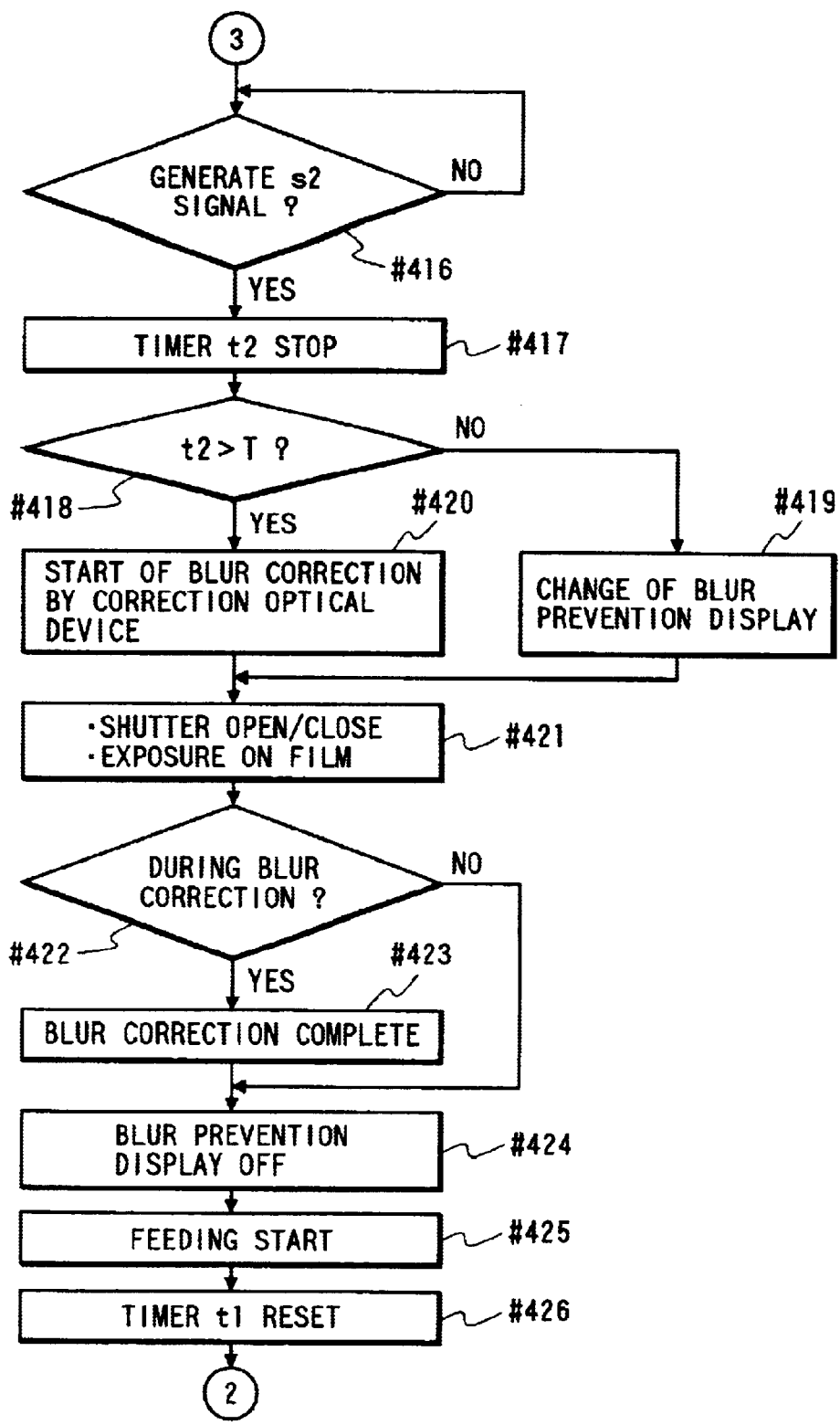
FIG. 24 is a flowchart showing remaining operations following FIG. 23.

FIGS. 23 and 24 are flowcharts for explaining camera sequences in the camera microcomputer 1301. This flow starts when the main switch 1302 is turned on, and at the same time, a timer provided in the camera microcomputer 1301 for counting up to time t1 is started (hereinbelow, the timer is described as timer t1 for convenience sake. Like description is given other timers). The timer t1 turns off the main switch 1302 automatically when the camera remains still with leaving the main switch 1302 on.

When the main switch 1302 is turned on, the camera microcomputer 1301 controls the zooming driving circuit 1309 in step #401 to feed the taking lens collapsed in the camera body. At this time, a lens barrier that has protected the taking lens is opened. In the next step #402, the camera microcomputer 1301 causes the display device 1313 to display the status of each camera function and photographing information (in general, such information is displayed on the surface of the camera body or inside the finder of the camera). In the subsequent step #403, power is supplied to the vibration detecting sensor 1312 provided in the camera for detecting hand vibration to start vibration detection.

Next, in step #404 it is determined whether or not a tele-operate zooming operation (for making the focal distance long) is performed (though not shown in FIG. 22, the status of the zooming switch for performing zooming operations is also input to the microcomputer 1301). If the tele-operate zooming is performed, the operation advances to step #405 in which the taking lens is driven in a tele-driving direction through the zooming driving circuit 1309. At this time, the timer t1 is also reset. The timer t1 is reset not only in each zooming operation but also by each switching action of other operation switches provided on the camera. The timer t1 for switching off the main switch 1302 is reset automatically in each operation. In other words, the main switch 1320 is not switched off as long as any operation continues to perform.

If the tele-operate zooming is not performed in step #404, the operation advances to step #406 in which determination is made as to whether or not a wide-operate zooming operation is performed. If the wide-operate zooming is performed, the operation advances to step #407 in which the taking lens is driven in a wide-driving direction through the zooming driving circuit 1309. The timer t1 is reset here as discussed above. When the taking lens has already been located at the wide end or telescope end, the taking lens is protected against a further driving force in either direction.

In the next step #408, it is determined whether or not the s1 signal is generated by half switching on the release operation element 1303. If not generated yet, the operation advances to step #409. In step #409, it is determined whether the value of the timer t1 is t0 or larger, or the main switch 1302 has been switched off. As a result, if no operation is performed in the camera, for example, for four minutes, in the condition that the main switch 1302 is off-state or the camera is at t0, it is determined that the camera is left unused. After such determination is made, the operation advances to step #427.

In step #427, power supply to the vibration detecting sensors 1312 is stopped. Then, in step #428, the taking lens is collapsed in the camera body and the lens barrier is closed in a manner reverse to that in step #401. In the next step #429, the display device 313 is turned off and the sequence of operations is ended.

If the timer t1 has not reached t0 yet in step #409, or when the main switch 1302 remains on, the operation returns to step #404, and the processing steps #405 to #409 are repeated.

Although the flowchart of FIG. 23 exhibits the status of zooming operation switches, not shown, the main switch 1302 and the release operation element 1303, the status of any other operation elements, such as the status of an operation switch for switching strobe modes and the indication thereof on the display device 1313, necessarily interrupt in an actual flow.

In step #408, if determined that the s1 signal has been generated by half switching on the release operation element 1303, the operation advances to step #410. In step #410, a timer t2 for counting up to time t2 (counting separately from the timer t1) is started. In the next step #411, photometry to a photographic object is performed by the photometry circuit 1304. After the photometry is completed, the operation advances to step #412 in which distance to the photographic object is measured (distance measuring) by the distance measuring circuit 1305. After the distance measuring is completed, the operation advances to step #413. In step #413, focusing driving of the taking lens is performed through the lens focusing driving circuit 1306. After the focusing driving is completed, the operation-advances to step #414.

In step #414, the correction lens in the correction optical apparatus 1311 is made correspondent to the optical axis of the taking lens. Although the optical axis of the correction lens generally corresponds to that of the taking lens, this step is provided to make these optical axes correspondent to each other so as to obtain a proper image when the optical axis of the correction lens is deviated from that of the taking lens. More specifically, the position of the correction lens is detected by the position detecting sensor, and when the position disagrees with a predetermined position (initial position), the correction lens is driven to the predetermined position. If the output of the position detecting sensor is a predetermined value, or has reached the predetermined value, the operation advances to step #415. In step #415, a blur prevention display on the display device 1313 is turned on, i.e., as shown in FIGS. 16A and 16B, a blur prevention index 1053 is displayed to give the photographer an indication of the state of blur prevention. Then, the operation advances to step #416 in FIG. 24.

In step #416 of FIG. 24, the camera microcomputer 1301 waits until the s2 signal is generated by full switching on the release operation element 1303. When the release operation element 1303 is full switched on and the s2 signal has been generated for performing an exposure operation, the operation advances to step #417 in which the timer t2 stops counting. In the next step #418, the count value of the time t2 is compared with a predetermined time T (e.g., 200 msec.). If t2>T, the operation advances to step #420. In step #420, blur correction by the correction optical system 1311 is started.

If determined that t2<T or t2=T in step #418 (i.e., when the release operation element 1303 is full switched on at a breath so that a time period existing between generation of the s1 signal and generation of the s2 signal becomes smaller than the time T), the operation advances to step #419. In step #419, the blur prevention display is changed such as to flashing the blur prevention index 1053 as shown in FIGS. 16A and 16B, and such a changed display is used as an indication of hand vibration warning to the photographer. In such a case, i.e., when t2<T or t2=T, the camera microcomputer 1301 inhibits blur correction by the correction optical apparatus 1311. The reason for inhibiting blur correction when the release operation element 1303 is full switched on at a breath will be described below.

When the release operation element 1303 has been full switched on at a breath, the pressing force causes the camera to vibrate (fluctuate) in the pressing direction. Such a vibration (fluctuation) has a frequency component lower than that of hand vibration (e.g., 500 mHz). For this reason, the vibration (fluctuation) may not be detected accurately by the vibration detecting sensor 1312.

When the vibration to be detected by the vibration detecting sensors 1312 is an angular velocity, outputs of the vibration detecting sensors 1312 are integrated, and an integrated output is used as a target value to drive the correction lens, or input angular velocities are mechanically integrated because of the mechanical nature of the correction lens to drive the correction lens at an angle of hand vibration. Since the blur prevention system designed to be offset by the camera vibration (fluctuation) has a limitation on integration performance, and ultra-low-frequency vibration (fluctuation) cannot be integrated precisely (because the vibration (fluctuation) is out of phase with an actual hand vibration; see Japanese Patent Laid-Open Application No. 63-2759 for further details). This is the reason the blur correction is inhibited when the release operation element 1303 is full switched on at a breath.

As discussed above, in the case the blur correction accuracy is low (when blur correction is performed on the basis of a vibration (fluctuation) that is out of phase with an actual hand vibration), the blur correction may cause image deterioration more than before the blur correction. For this reason, the blur correction operation is inhibited by determining that such vibrations different in characteristics from each other are caused by hard or quick operation of the release operation element 1303, on the basis of the interval between half switching on operation and full switching on operation of the release operation element 1303, i.e., on the basis of the time period existing between generation of the s1 signal and generation of the s2 signal.

After step #419 or #420, the operation advances to step #421 in which the camera microcomputer 1301 controls the shutter circuit 1307 to open and close the shutter, not shown, so that a film will be exposed. Although detailed description is omitted in the flow of FIG. 24, the film is exposed such that the shutter is closed after keeping the shutter open for a time period by an amount determined from photometry information from the photometry circuit 1304. While the film is being exposed, the blur correction is not stopped even if the blur prevention system (constituted of the correction optical apparatus 1311, the vibration detecting sensor 1312, and the like) is turned off (when the camera is provided with an operation element by which the photographer can turn off the blur prevention system). When the blur correction is stopped during exposure, the correction lens may cause image deterioration more than before stopping the blur correction. Thus the blur correction is not stopped during exposure so as not only to prevent such image deterioration but also to deal with error in blur prevention system off operation during exposure.

In the next step #422, it is determined whether or not the blur correction is being performed. If it is not performed, (when the operation comes to this step with omitting step #420), the operation directly advances to step #424. On the other hand, when the blur correction is being performed, the operation advances to step #423. In step #423, the blur correction by the correction optical apparatus 1311 is stopped and the correction lens is centered (in the same manner in step #414). Then, the operation advances to step #424.

In the next step #424, the blur prevention display on display device 1313 is turned off. The blur prevention display is performed by displaying a blur prevention index inside the finder in accordance with an actual vibration in the same manner discussed above. It is therefore possible for the photographer to confirm the blur prevention state through the finder. In the subsequent step #425, the photographed frame is rolled up through the film feeding circuit 1310 so that the next unused or non-photographed frame will come to the photographing position. Then, the operation advances to step #426 in which the timer t1 is reset, and returns to step #404 in FIG. 23. The timer t1 is reset in step #426 so as to prevent the main switch 1302 from being turned off automatically because of count-up of the timer t1.

Although the main switch 1302 is checked only at step #409 in FIG. 23, it is actually checked many times in the above flow. For example, the camera is designed to accept an off operation of the main switch 1302 when the exposure operation continues long for several seconds.

The blur prevention system takes some time (approximately one second), particularly from the time the vibration detecting sensor 1312 is started by a power on operation until the output is stabilized. During this time, when a photographing operation is performed, blur correction is not-properly performed and more image deterioration may be caused than before the blur correction (because of an error in the signal from the vibration detecting sensor 1312). To prevent such a situation, this camera sequence is set to prohibit the photographing operation until the vibration detecting sensor 1312 is stabilized.

Figure 25:
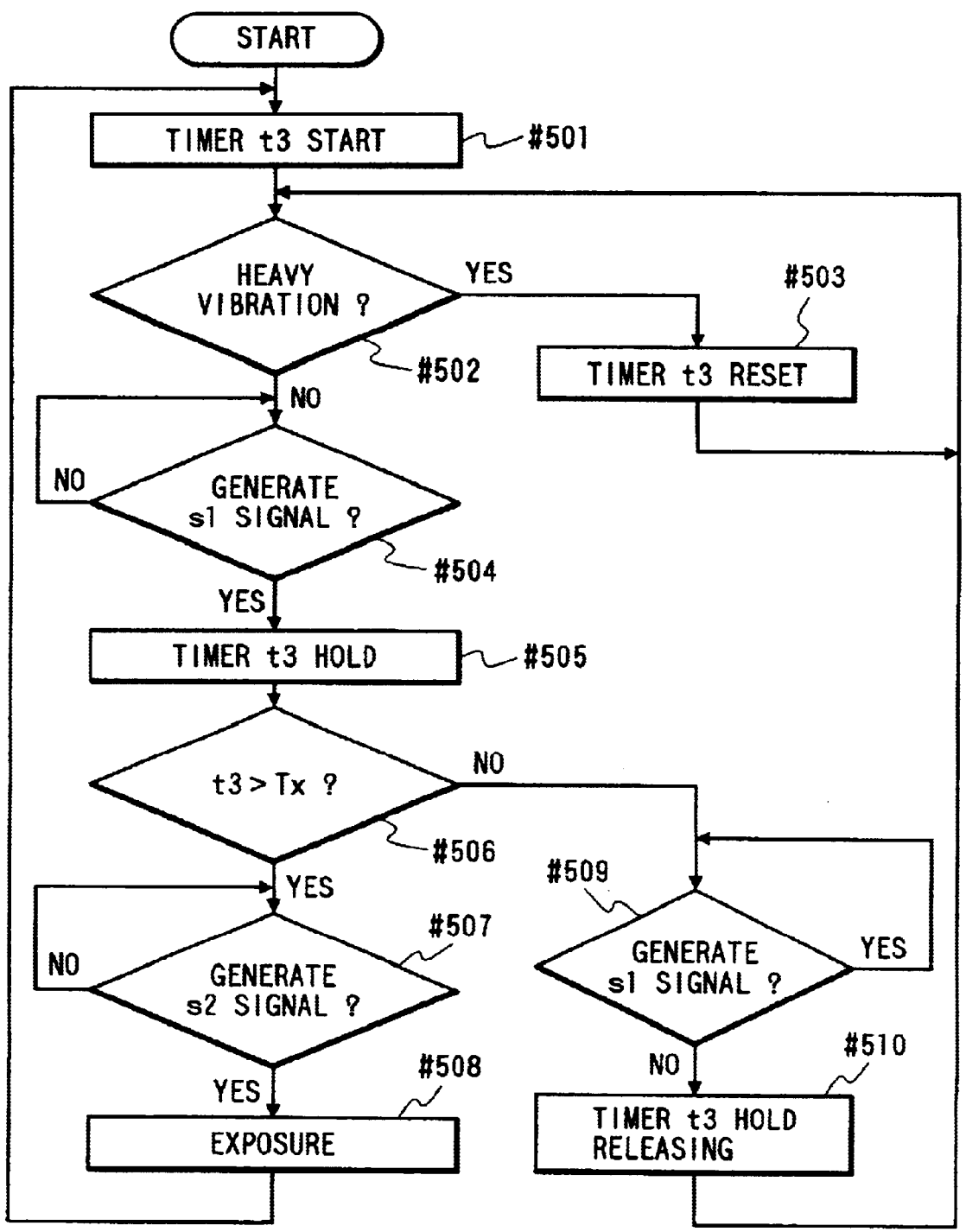
FIG. 25 is a flowchart for explaining a program portion in the camera of FIG. 22 in detail, where the release is kept locked until the output of the vibration detection sensor is stabilized.

FIG. 25 is a flowchart showing an operation of the portion related to the above solution in the camera microcomputer 1301. This flow starts after the main switch is turned on and the vibration detecting sensor 1312 starts operating. In other words, it starts after step #403 in FIG. 23.

In step #501, the camera microcomputer starts a timer t3 for counting up to time t3 at which the vibration detecting sensor 1312 will have been stabilized. In the next step #502, the output of the vibration detecting sensor 1312 is checked.

If the output is smaller than a predetermined value, the operation advances to step #504. If larger than the predetermined value, i.e., when the vibration becomes large, the operation goes to step #503 in which the timer t3 is reset. Then, it returns to step #502. This is because a large vibration causes the operation in the vibration detecting sensor 1312 to saturate. In such a case, it takes time to stabilize the vibration detecting sensor 1312 again.

In the next step #504, the camera microcomputer 1301 waits until the s1 signal is generated by half switching on the release operation element 1303. After the s1 signal has been generated, the operation advances to step #505. In this step #505, the camera microcomputer 1301 holds the timer t3 from count start until half switching on the release operation element 1303 (this hold time is also set to t3 for convenience sake). In the subsequent step #506, the time t3 is compared with a predetermined time Tx (the time Tx is variable according to the zooming or shutter speed because the blur prevention accuracy varies therewith. For example, the blur prevention accuracy needs to be increased when the camera is in a tele-zooming state with a slow shutter speed.). If t3>Tx, the operation advances to step #507 in which the camera microcomputer 1301 waits until the s2 signal is generated by full switching on the release operation element 1303. Then it goes to step #No. 508 after the s2 signal has been generated. In step #508 an exposure operation is performed. Since the vibration detecting sensor 1312 is stabilized sufficiently at this time (since t3>Tx), the correction optical apparatus 1311 is operating blur correction during this exposure time.

If not determined that t3>Tx in step #506, since the vibration detecting sensor 1312 has not been stabilized yet, then the operation goes to step #509 because the exposure operation cannot be performed. In step #509, it is determined again whether or not the s1 signal is being generated at the release operation element 1303. If generated, the camera microcomputer 1301 remains in this step because the photographing operation cannot be performed as long as the s1 signal is being generated at the release operation element 1303.

After that, if determined in step #509 that no s1 signal is being generated at the release operation element 1303 (i.e., when the photographer has released his finger from the release operation element 1303), the operation advances to step #510 in which the camera microcomputer 1301 releases the timer t3 from the holding. The timer t3 starts counting from the previous count. Then the operation returns to step #502. Such operation is done because the vibration detecting sensor 1312 has remained unstable. In such a situation, even if the release operation element 1303 is full switched on, the camera microcomputer 1301 cannot advance from step #506 to step #507 to enter the exposure operation because the release is kept locked. Since the photographing operation cannot be performed even after keeping the release operation element 1303 switched on, the photographer releases his finger from the release operation element 1303. After that, if the release operation element 1303 is half switched on again (generation of the s1 signal) and then full switched on (generation of the s2 signal), the photographing operation would be permitted.

Once release lock occurs, it cannot be released unless the release operation element 1303 is released from the half switching on operation.

In general, the release operation element 1303 is a known push-button type switch, which is designed to generate an s1 signal in response to one-step (half) pushing of the release operation element 1303 and an s2 signal in response to further (two-step) pushing. When the vibration detecting sensor 1312 remains unstable during the operation of the release operation element 1303 (i.e., when the vibration detecting element 1312 is returned to the unstable state immediately after the main switch 1301 is turned on, or in response to input of a large vibration), the release is kept locked until the vibration detecting element 1312 is stabilized. If the release lock is released in the condition that the release operation element 1303 is full switched on, the photographer must perform a photographing operation at unexpected timing in the same manner where the release time lag is extended, resulting in an undesirable picture. Further, the photographer may not be aware of such release lock, and is likely to further switch on the release operation element 1303. Such stronger pushing operation runs the danger of causing a vibration that is too large to suppress in the blur prevention system. Furthermore, the picture taken when the release lock is released at such timing involves very large image deterioration.

From the above standpoint, the release lock mechanism is set in the flow of FIG. 25 not to be released as long as the photographer releases his finger once from the release operation element 1303 for stabilization of the camera (vibration detecting sensor 1312).

Figure 26:
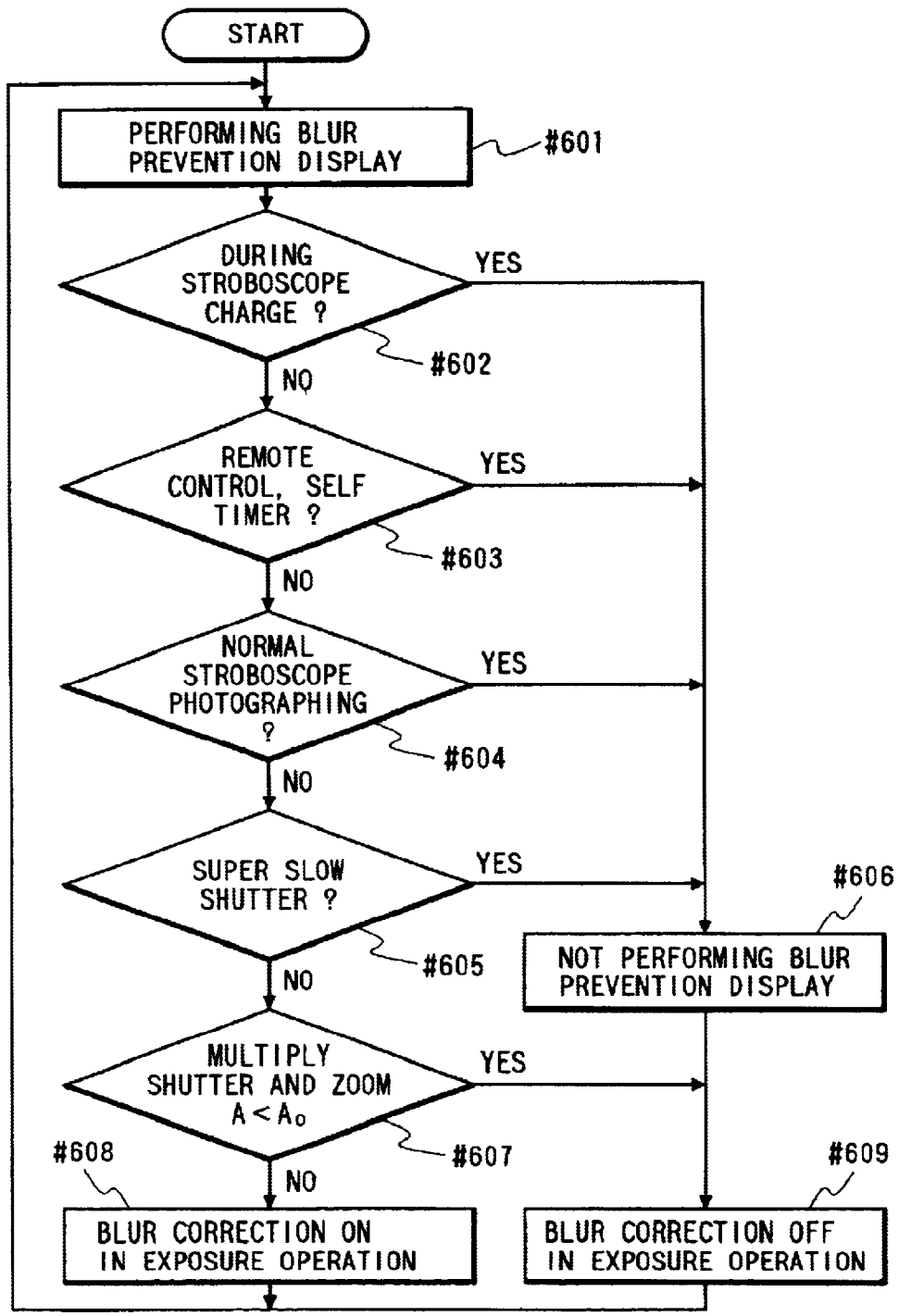
FIG. 26 is a flowchart for mainly explaining an operation by the camera of FIG. 22 when no blur prevention system is used in the camera.

Although the above description was made of the camera sequences under the conditions that the blur prevention system is used, the blur prevention system may not be used, depending on the status of the camera. FIG. 26 shows other camera sequences in such cases.

The flow of FIG. 26 starts when the main switch 1302 is turned on. At first, in step #601, the camera microcomputer 1301 sets the blur prevention display to be performed in the processing step #415 of FIG. 23 (though the blur prevention display is not performed in this step, it is presumptively determined here whether or not the blur prevention display is performed in step #415).

In the next step #602, it is determined whether or not stroboscope charge is being performed in the stroboscope device 1308 (hereinbelow, referred to as strobe charge). If strobe charge is being performed, the operation advances to step #606. If the strobe charge has been completed, the operation advances to step #603. In step #603, it is determined whether or not a remote control or self timer in the camera is in operation. If a remote control or self timer is in operation, the operation advances to step #606. If not, it advances to step #604.

In step #604, it is determined whether or not the camera is at a normal strobe photographing condition (except a case where the stroboscope device 1308 is used at a long shutter speed such as slow synchronized photographing). If at the normal strobe photographing, the operation advances to step #606. If not, it advances to step #605. In step #605, it is determined whether or not the camera is at a super-slow shutter condition (for example, two seconds). If at the super-slow shutter condition, the operation advances to step #606. If not, it advances to step #607.

In step #606, the camera microcomputer 1301 sets the blur prevention display not to be performed in step #415 of FIG. 23 (i.e., it cancels the setting at step #601).

In step #607, it is determined whether a value A of the product of shutter speed and zooming information is smaller than $A_0$ (e.g., "1") (e.g., the value A is "1.67" for a shutter speed of 1/60 and a zooming focusing distance of 100 mm). If $A<A_0$, e.g., if A is smaller than 1, the operation advances to step #609 in which it is set that the blur correction is not performed in step #420 of FIG. 24 by the correction optical apparatus 1311. If A is more than 1, the operation advances to step #608 in which it is set that the blur correction is performed in step #420 of FIG. 24 by the correction optical apparatus 1311. After that, both return to step #601.

Referring to the above flow, when the strobe charge is being performed with less power, the correction optical apparatus 1311 is not driven (in such a case, functions other than the blur prevention are also disabled).

The blur prevention is also disabled at the time of using the remote control and the self timer. One reason for this is that, because the remote control and the self timer are used under the condition of no hand vibration in which the camera is fixed to a tripod or the like, there is no need to perform blur correction. The other reason is that the vibration detecting sensor 1312 may malfunction due to shock or the like at the shutter driving in the camera strongly fixed to the tripod and reduce the blur correction accuracy. In this case, such blur correction may cause image deterioration more than before the blur correction.

The reason for inhibiting blur correction at the normal strobe photographing is that, because emission time of the strobe light to the photographic object is very short at the normal conditions, for example, 500 msec., hand vibration hardly affects the image in such a short time.

As an exception, the blur correction is performed at a slow synchronized photographing, one of strobe photographing operations, so as to prevent image deterioration due to hand vibration. (Since the shutter speed is determined on the basis of the photometry information on the photographic object, if the object is dark, the shutter speed becomes slow. In such a condition, when the photographer takes a picture with emitting of the strobe light, the strobe light permits the object to enter a proper exposed state and the slow shutter makes the background reflect finely on the film though there is less or no effect of the strobe light on the background. However, the camera operated at a slow shutter speed is generally affected by hand vibration if a tripod is not used.)

At a super-slow shutter speed, e.g., even at a long shutter speed such as more than one second for a focal distance of 150 mm or four seconds for a focal distance of 30 mm, the blur correction is not performed. One reason for this is that, because very low frequency components are contained at such a super-slow shutter speed, the blur correction cannot precisely be performed due to the limitation on integration performance of the vibration detecting sensor 1312. Another reason is that the output of the vibration detecting sensor 1312, also contains a very low frequency of fluctuation (drift) and such an output fluctuation causes image deterioration at the super-slow shutter speed.

As discussed above, the blur correction is not performed during strobe charge when using a remote control and a self timer, and in a normal strobe photographing, and when using a super-slow shutter (since the flow passes through step #609). Further, as described in step #606, it is set that the blur prevention display is not performed, as well. Such no blur prevention display is to give the photographer an indication that the blur correction is not performed so that the photographer will be urged to hold the camera stably.

The blur correction is not performed when the product of the shutter speed and zooming is smaller than the predetermined value because hand vibration hardly causes image deterioration in such a situation. However, the blur correction display is performed though the blur correction is not performed (since the flow does not pass through step #606). Such determination is made automatically at step #607. The blur correction is frequently turned on and off in accordance with changes in framing of the camera (the shutter speed varies according to changes in brightness of the object caused by changes in the framing). It is therefore undesirable to turn on and off the blur prevention display each time the blur correction is turned on and off. Further, it is not important to inform the photographer that the blur correction is not performed when compared with the above four conditions (image deterioration would not occur even if the photographer is not informed thereof). When the blur prevention display is turned off in such a situation, the photographer may not understand its meaning and feel uncertain. This is the reason that the blur prevention display is performed in such a situation even when the blur correction is not performed.

If determined in step #607 that there is no need to perform blur correction, the release lock as discussed in FIG. 25 is unconditionally inhibited to achieve quick response in the photographing operation. In other words, since the photographing operation is permitted immediately after the main switch 1302 is turned on even in a wide-operate zooming or at a fast shutter speed or when blur correction is needed under both conditions, the release lock is not needed even if a large vibration appears before the photographing operation.

As discussed above, it is set in step #609 that the blur correction is not performed. This means that the blur correction target value is not output to the correction optical apparatus 1311. The vibration detecting sensor 1312 remains operating and all the functions (but the display function) associated with blur prevention are kept in the operating state. This is important in this flow.

When the system status is frequently changed between the time the blur prevention system is needed and the time the blur prevention system is not needed such as the determination in step #607 (changes in shutter speed due to changes in framing, etc.), the on and off operations of the blur correction must be made correspondent thereto immediately thereafter. For this reason, all the functions but the display function continue to operate. Stated more specifically, those functions continue to operate because every on-and-off operation of all the elements in the blur prevention system require stand-by time before stabilization for each start-up operation, hence reducing their mobility. Since the correction optical apparatus 1311 as a small operate-time constant, it can be turned on immediately. For this reason, only the correction optical apparatus 1311 is left disabled (merely by inhibiting the blur correction target value from being output to the correction optical apparatus 1311) without the entire system turning off.

As described above, it is undesirable to turn off the entire blur prevention system (in particular, the vibration detecting sensor 1312) because it takes time to stabilize the blur prevention system again next time. Thus all the elements but the correction optical apparatus 1311 are kept operable as much as possible.

FIG. 27 shows the relationship between the above camera sequences and the blur prevention system.

Conventional systems do not take into account specific vibrations in operating the camera (e.g., release operation or zooming operation) other than hand vibration, while the camera according to the embodiment is designed to control operating state or non-operating state on the basis of a difference in operate time (value of the timer t2) between half switching on and full switching on of the release operation element 1303. Stated more specifically, when the difference in operate time is within a predetermined time, the blur correction is not performed or is interrupted (steps #418 to #419 in FIG. 24). It is therefore possible to prevent malfunction of the blur prevention system due to a large vibration at a low frequency transmitted by pushing down the release operation element 1303 at a breath, and hence to prevent image deterioration.

The display of the blur prevention system is also controlled on the basis of the difference in operate time, i.e., a hand vibration warning display is performed when the difference in operate time is within the predetermined time, so that the photographer can respond to the warning display to determine whether the photographing operation restarts or not, and so that the photographer hardly fails to catch a shutter chance without knowing a failure in the photographing operation.

Further, as shown in FIG. 25, the release lock is performed even when the release operation element 1303 is kept half switched on until the blur prevention system (vibration detecting sensor) operates properly. Such release lock continues to be performed until the release operation element 1303 is released from the half switching on state and operated again. It is therefore possible to prevent photographing operation from being performed at unexpected timing against the photographer's intention by inattentive release of the release lock, and prevent image deterioration due to a large vibration caused by the release lock (by performing strong pressing in the condition that the full switching on operation is not permitted).

Furthermore, as discussed with respect to FIG. 26, the correction optical apparatus 1311 is changed to the non-operating state when the shutter speed in photographing is fast, etc., but the vibration detecting sensor 1312 is kept operating. It is therefore possible to prevent time 1088 in starting up the blur prevention system and hence improve the mobility of the camera.

Since the blur prevention display is also performed even when the correction optical system is inhibited from operating because of fast shutter speed or the like, i.e., since the display device 1313 for blur prevention is not controlled when the blur correction is turned on and off automatically in accordance with the shutter speed (where the blur prevention display is performed without blur correction) (steps #607 to #609 in FIG. 26 (without passing through step #606)), the photographer is prevented from feeling uncertain.

The conventional correction optical apparatus having a large-scale structure is difficult to mount in a camera without increasing the camera size. However, such an increase in size and weight of the camera causes a serious problem in the compact camera. Further, the structure becomes complicated due to increased parts and assembly costs. Such a product is not suitable for consumer use. In contrast, the correction optical apparatus having a structure such as one shown in FIG. 19 can solve the above conventional drawbacks.

Conventional blur prevention systems to be mounted in a single lens reflex camera are a TTL type capable of catching a photographic object through the taking lens, so that the photographer can recognize an actual blur correction operation through the finder. In contrast, any one of conventional compact cameras is separately provided with lenses of the photographing system (for blur correction) and lenses of a finder system for the photographer checking the photographic object, so that the operation of the blur prevention system cannot be seen through the finder (although such a compact camera can mount a correction optical apparatus exclusively used in the finder system so as to let the photographer know the state of the blur correction, such an exclusive mechanism increases the camera size and the production cost). In such a conventional compact camera, the photographing operation is often performed without blur correction because the operating state of the blur prevention system cannot be checked through the finder. Further, although the compact camera has a new function called a blur prevention system, such a new function is not persuasive. In this regard, the finder optical device capable of performing blur prevention display, such as one shown in FIG. 14, can be mounted in the compact camera according to the embodiment, so that the camera can solve the above conventional problems with maintaining its compact structure.

Addition of the blur prevention system requires the user to learn operation of the system. Further, specific information on blur prevention state and the like is output from the blur prevention system to the user. Such complicated work may make the camera difficult to use. However, the camera according to the embodiment is designed to automatically determine whether to use the blur prevention system and indicate in which direction and how strong the camera vibration appears during blur correction so that the user can recognize them through the display. It is therefore possible for the camera according to the embodiment to solve this drawback as well.

Fifth Embodiment

Figure 28:
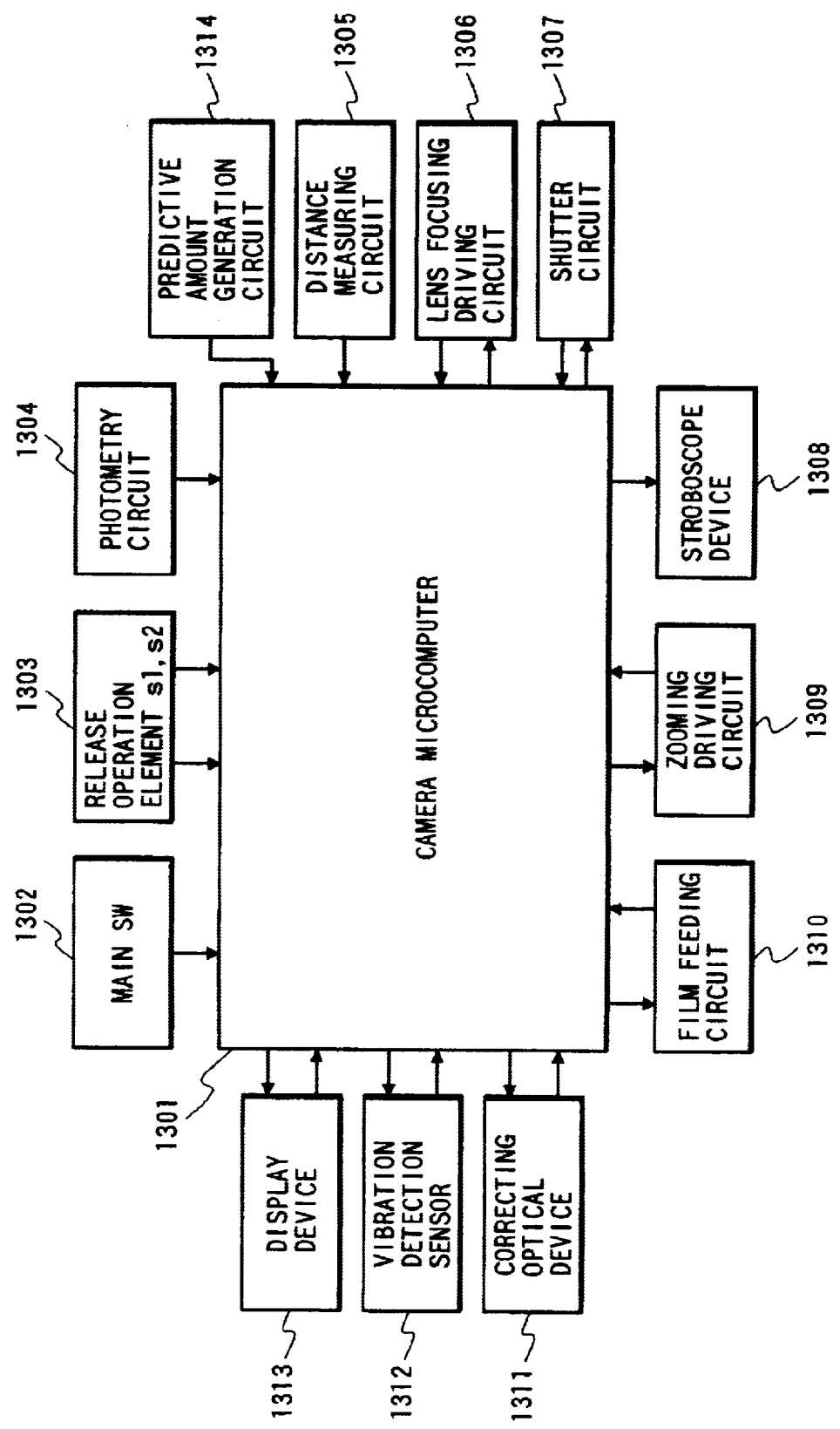
FIG. 28 is a block diagram showing a circuit structure of a camera according to a fifth embodiment of the present invention.

FIG. 28 is a block diagram showing a circuit structure of a camera according to the fifth embodiment of the present invention. In FIG. 28 differs from FIG. 22 only in that the output signal from a predictive amount generation circuit 1314 is input to the microcomputer 1301. Hereinbelow, description will be made of the predictive amount generation circuit 1314.

Figure 29:
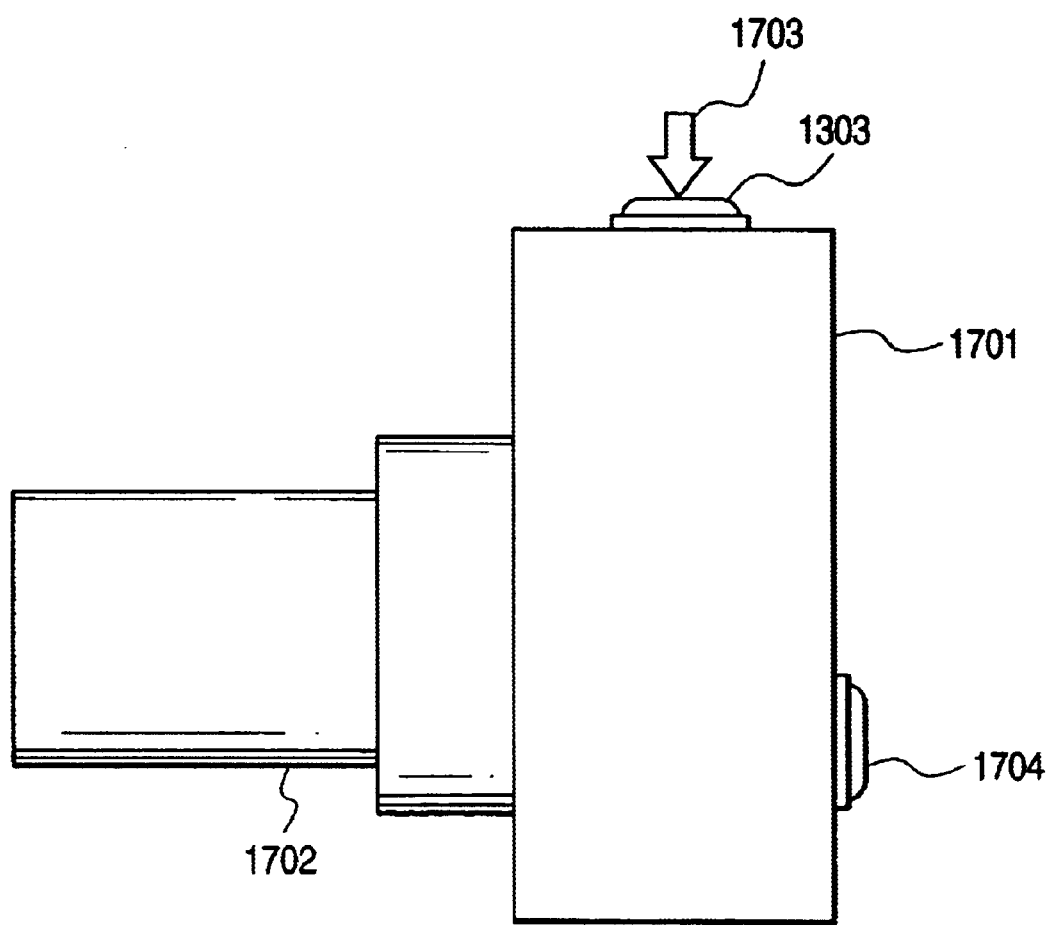
FIG. 29 is a side view of the camera of FIG. 28.

FIG. 29 is a side view of the camera according to the fifth embodiment of the present invention. The camera is constructed of a camera body 1702 and a lens barrel 1702 that is housed in the camera body 1702 in the non-operating condition. The release operation element 1303 is a two-step tact switch. The camera enters a photographing preparing state (photometry, distance measuring and lens focusing driving) in response to the half switching on operation of the release operation element 1303. Then the camera starts exposing a film in response to the full switching on operation of the release operation element 1303.

Although the force to push the release operation element 1303 (the force exerted in the direction of the arrow 1703) is generally slow and weak, a strong force may be applied in the direction of the arrow 1703 depending on the photographer using the camera or photographing conditions. In such a case, a large vibration occurs in the direction of the arrow 1703 as discussed above.

The fourth embodiment teaches that such occurrence of the large vibration can be predicted by observing the timing of the 91 signal generated by half switching on and the timing of the s2 signal generated by full switching on. It is thus determined from the prediction that the correction is not performed when the large vibration occurs.

However, since the waveform of the large vibration in the direction of the arrow 1703 is approximately determined from the generation timing of the s1 signal and the s2 signal (the speed of pushing (switching on) the release operation element 1303), such a large vibration can be corrected by predicting the occurrence of the vibration.

Figure 30:
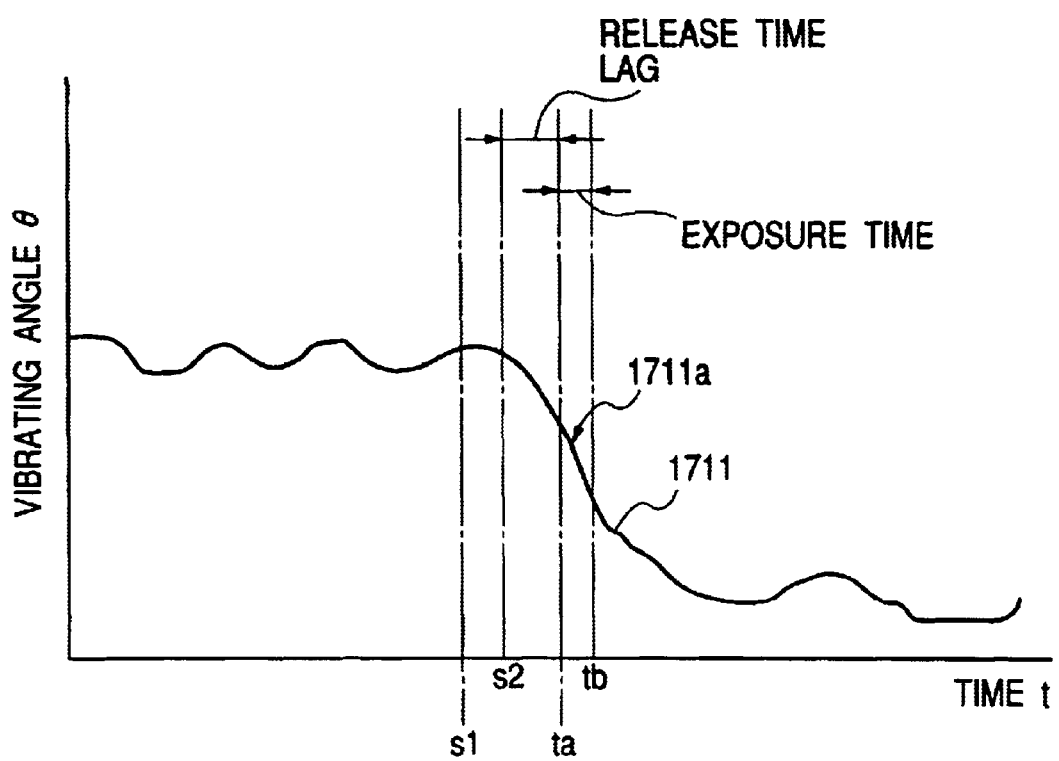
FIG. 30 is a graph showing a waveform of hand vibration applied to the camera of FIG. 28.

FIG. 30 shows a waveform 1711 indicative of hand vibration applied to the camera. When the time interval between generation of the s1 signal and generation of the s2 signal is narrow, a sharp change 1711a of hand vibration waveform appears. The waveform of this portion is determined from the pushing speed, the pushing force and the weight of the camera.

The hand vibration waveform is stored in the predictive amount generation circuit 1314 and used for driving the correction optical apparatus 1311 at the timing of pushing (switching on) the release operation element 1303, thus correcting such a vibration.

Figure 31:
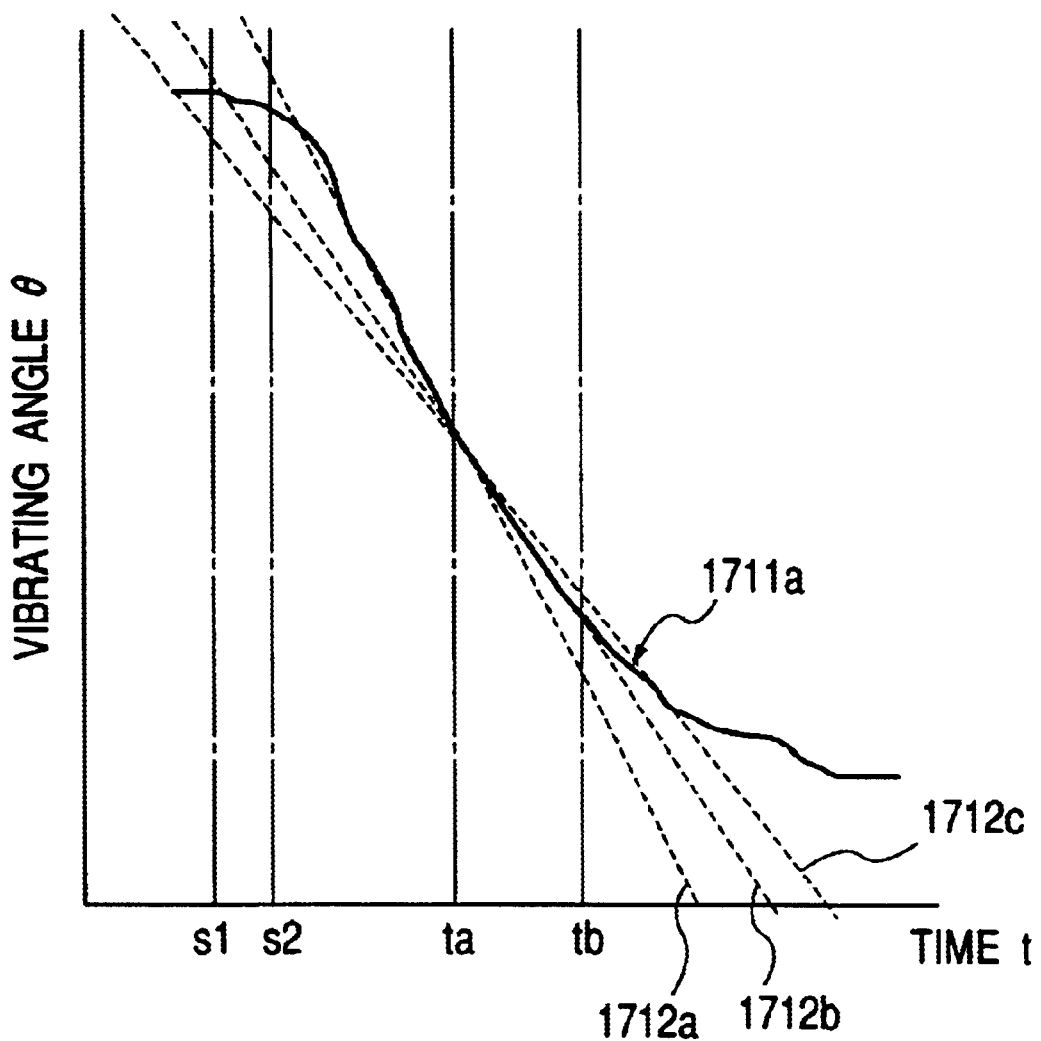
FIG. 31 is an enlarged graph showing a portion of hand vibration when the release operation element of the camera is pushed down (full switched on) at a breath.

FIG. 31 shows the portion 1711a of the vibration waveform 1711 that appears when the release operation element 1303 is full switched on at a breath. The waveform portion 1711a can approximate to some straight lines 1712a, 1712b and 1712c respectively shown by the dotted lines in FIG. 31.

From among the straight lines, an optimum one is selected on the basis of the shutter speed, the release time lag and the focal distance of the camera. For example, when the shutter speed is fast (when ta is fixed and tb is shifted to the left on the paper of FIG. 31), the waveform portion 1711a most approximates to the straight line 1712a. When the shutter speed is long, the straight line 1712c is selected. When the release time lag is long (when ta and tb are shifted to the right on the paper of FIG. 31), since the straight line 1712b rather than the straight line 1712a more approximates to the waveform portion 1711 of the vibration existing during exposure time (between ta and tb), the straight line 1712b is selected as the predictive amount.

Even when the hand vibration amount applied to the camera does not vary (e.g., an angle of 0.2 deg.), the image blur amount on the image surface of the film varies according to a change in focal distance of the lens (i.e., even in the same hand vibration amount, tele-zooming makes the image blur larger than wide-zooming does). For this reason, the inclinations of the straight lines in FIG. 31 also vary according to the focal distance of the lens (tele-zooming makes the straight lines sharp).

Thus the output of the predictive amount generation circuit 1314 of FIG. 28 is selected and changed in the camera microcomputer 1301 according to the camera conditions (focal distance, shutter speed and release time lag).

The correction optical apparatus 1311 can be driven even at exposure time in accordance with the above determined predictive amount in the photographing operation. It is therefore possible to correct the large vibration caused by pushing (switching on) the release operation element 1303. Herein below, description will be made to a photographing sequence in the camera using such a system with reference to the flowchart of FIG. 32.

Since a sequence of operations performed before the time the release operation element 1303 is full switched on (the s2 signal is generated) is the same as the sequence of the fourth embodiment shown in FIG. 23, the flow and the description are omitted. Even with operations after the release operation element 1303 has been full switched on, portions common to those of the fourth embodiment shown in FIG. 24 are given the same step numbers and the description is omitted.

Figure 32:
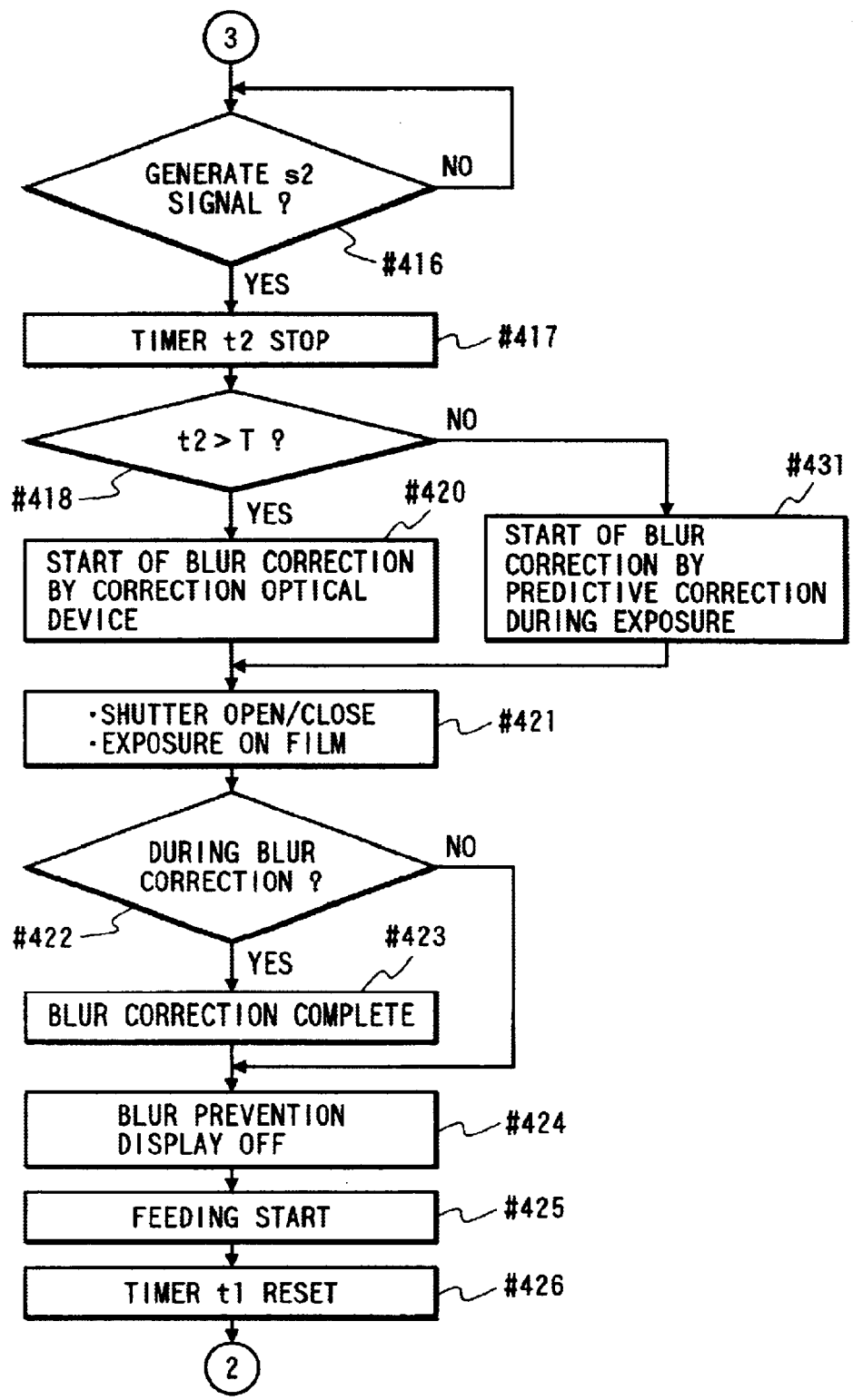
FIG. 32 is a flowchart showing an operation of the main part of the compact camera according to the fifth embodiment of the present invention.

The flowchart of FIG. 32 differs from that of FIG. 24 in that step #431 is used instead of step #419 in FIG. 24 for starting blur correction in accordance with predictive correction during exposure.

If determined in step #418 that t2>T, i.e., when a large vibration having a frequency component different from normal hand vibration is applied to the camera when the half switching on (generation of the s1 signal) and the full switching on (generation of the s2 signal) of the release operation element 1303 are performed at a breath, the operation advances to step #431 in which the correction optical apparatus 1311 is driven in accordance with the predictive waveform discussed above.

After that, in step #421, the shutter is opened and closed so that the film will be exposed. It should be noted that the predictive waveform is a straight line inclined at an angle such as one shown in FIG. 31 and correction of the large vibration takes a long time. For this reason, the driving stroke of the correction lens in the correction optical apparatus 1311 needs to be extended. When the interval between the time the predictive correction is started and the time the film is exposed is long, the correction lens runs the danger of exhausting its correction stroke before exposure to the film (or during exposure) and hence making the predictive correction disabled during exposure.

Therefore, the time required from step #431 to the shutter open/close operation in step #421 must be set as short as possible.

According to the flow, even the large vibration applied to the camera through the release operation can be predicted and corrected. When compared with the fourth embodiment in which blur correction is inhibited when such a large vibration is caused by the release operation, this embodiment makes it possible to improve the image accuracy. However, even such a structure of this embodiment cannot correct a normal vibration applied to the camera during exposure (the normal vibration is hand vibration constantly applied to the camera, and not the large vibration applied to the camera by pushing (full switching on) the release operation element 1303 at a breath).

As discussed above, the blur prevention system is controlled by the difference in operate time between the half switching on and the full switching on of the release operation element 1303. In particular, when the difference in operate time is within a predetermined range, the operating mode of the blur correction in the blur prevention system is changed. In other words, when the difference in operate time between the half switching on and the full switching on of the release operation element 1303 is within the predetermined range, the blur correction is performed with the predictive target value. The predictive target value varies according to the camera conditions such as the focal distance of the camera, the shutter speed of the camera and the release time lag of the camera (the release time lag corresponds to delay time from film exposure operation until an actual exposure is started).

It is therefore possible to correct a large vibration caused by disorderly release operation and hence improve the image accuracy.

Sixth Embodiment

As discussed in the fourth embodiment, since the vibration detecting sensor 1312 cannot accurately detect a large vibration caused by the release operation, blur correction causes image deterioration more than before the blur correction. However, such an error output of the vibration detecting sensor 1312 is predictable as the vibration waveform at this time is predictable in the fifth embodiment.

By predicting the error output and offsetting it with the error in the vibration detecting sensor 1312, a normal vibration overlapped with the large vibration caused by pushing the release operation element 1303 at a breath can also be detected. In other words, the error output of the vibration detecting sensor 1312 is predictively offset simultaneously with prediction of the large vibration caused by pushing the release operation element 1303 at a breath. Then only the component of the normal hand vibration is extracted from the output of the vibration detecting sensor 1312, and combined with the above predictive waveform so as to drive the correction optical apparatus to perform blur correction, thus improving the image accuracy.

Figure 33:
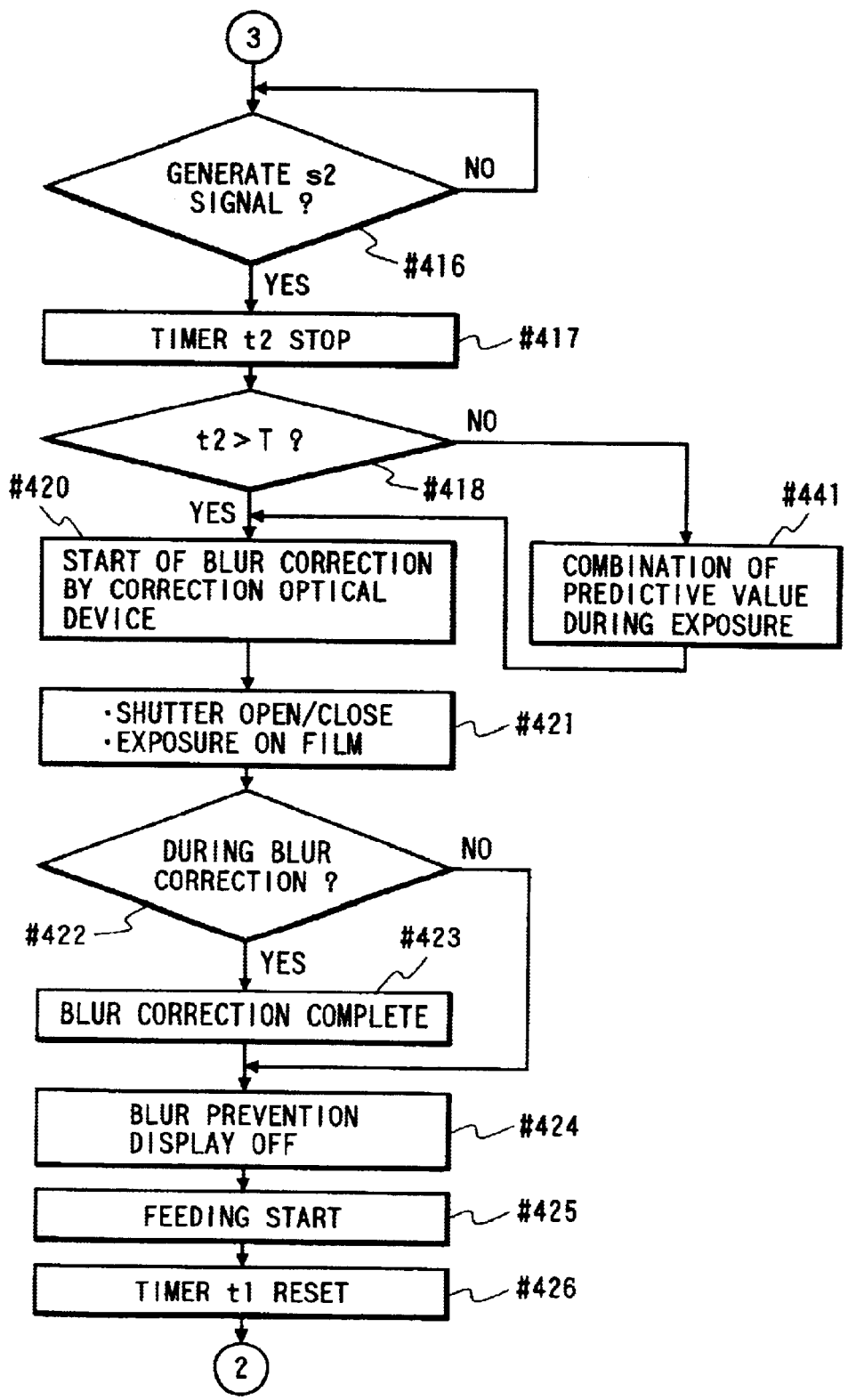
FIG. 33 is a flowchart showing an operation of the main part of a compact camera according to a sixth embodiment of the present invention.

FIG. 33 is a flowchart showing an operation following the above concept according to the sixth embodiment of the present invention. The flowchart of FIG. 33 differs from that of FIG. 32 in that step #441 is used instead of step #431 in FIG. 32 for performing combination of a predictive value during exposure. After step #441, blur correction is started at #420. The camera used here has the same structure as the one shown in FIGS. 28 and 29.

In step #441, the output of the vibration detecting sensor 1312 is combined with a waveform for offsetting the predictive waveform of FIG. 31 and a predictive error output. In the next step #420, the correction optical apparatus 1311 is driven to perform blur correction in accordance with the combined signal, so that the large vibration caused by pushing the release operation element 1303 at a breath can be corrected simultaneously with the correction of the normal vibration overlapped with the large vibration.

As discussed above, since the blur correction is performed by adding a predictive target value to the target value from the vibration detecting sensor (the mode of the blur correction is changed), a large vibration caused by disorderly release operation is also corrected, thereby improving the image accuracy more than the fifth embodiment.

Seventh Embodiment

In the fourth embodiment, the blur prevention system always remains on during photographing operation. In contrast, in a camera according to the seventh embodiment, which follows a sequence of operations in FIGS. 34 and 35, the photographer is able to inhibit blur correction in the photographing operation as preferred. This enables the photographer to take a picture with intentional hand vibration (drift photographing or the like). This camera also has the same structure such as one shown in FIGS. 28 and 29.

In FIG. 29, there is shown a blur prevention inhibiting switch 1704 for inhibiting blur correction. When the photographer takes a picture while pushing (switching on) the blur prevention inhibiting switch 1704 or after pushing the blur prevention inhibiting switch 1704, the blur correction is inhibited during the photographing operation.

Figure 34:
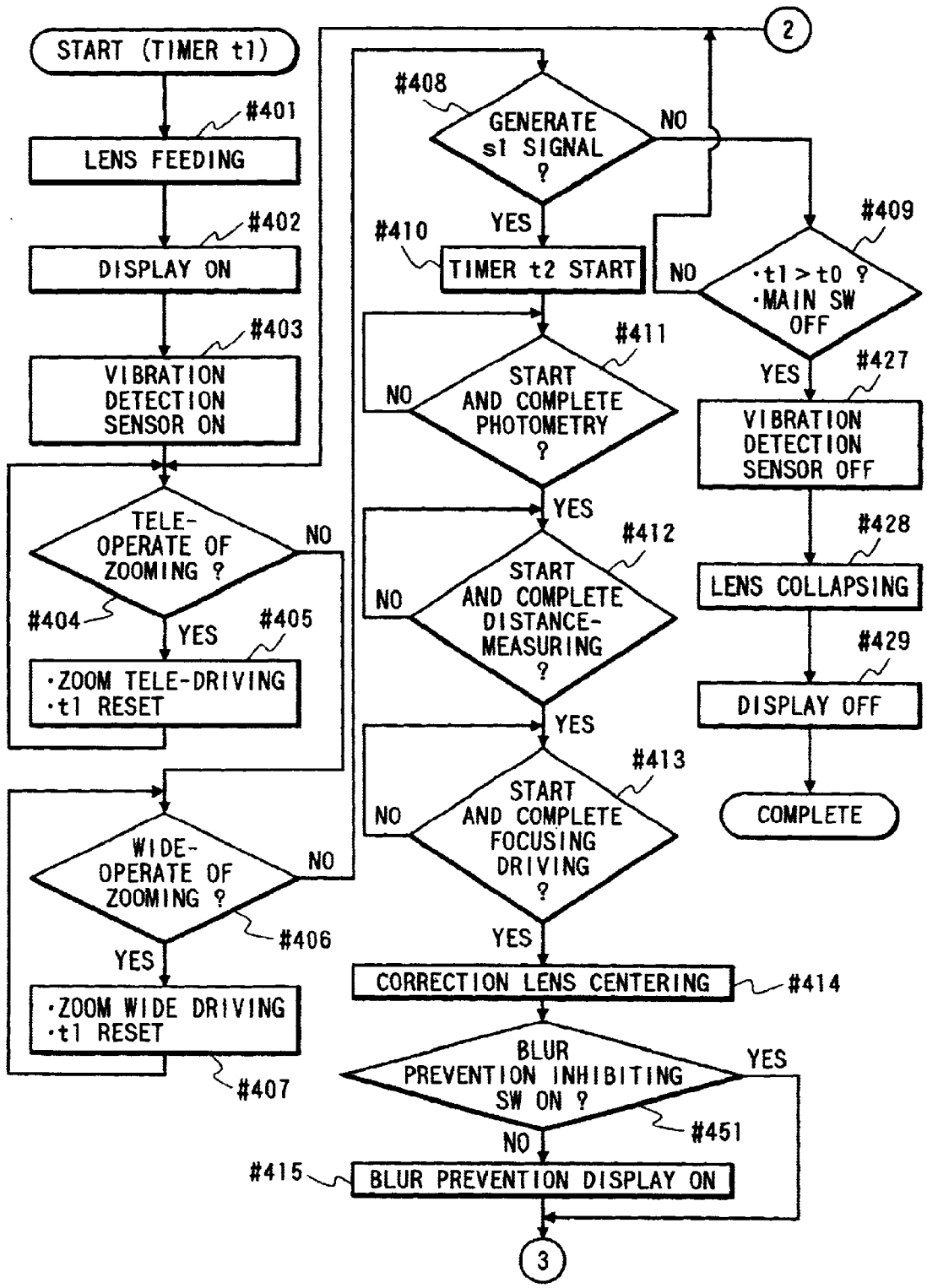
FIG. 34 is a flowchart showing a portion of a sequence of operations in a camera according to a seventh embodiment of the present invention.
Figure 35:
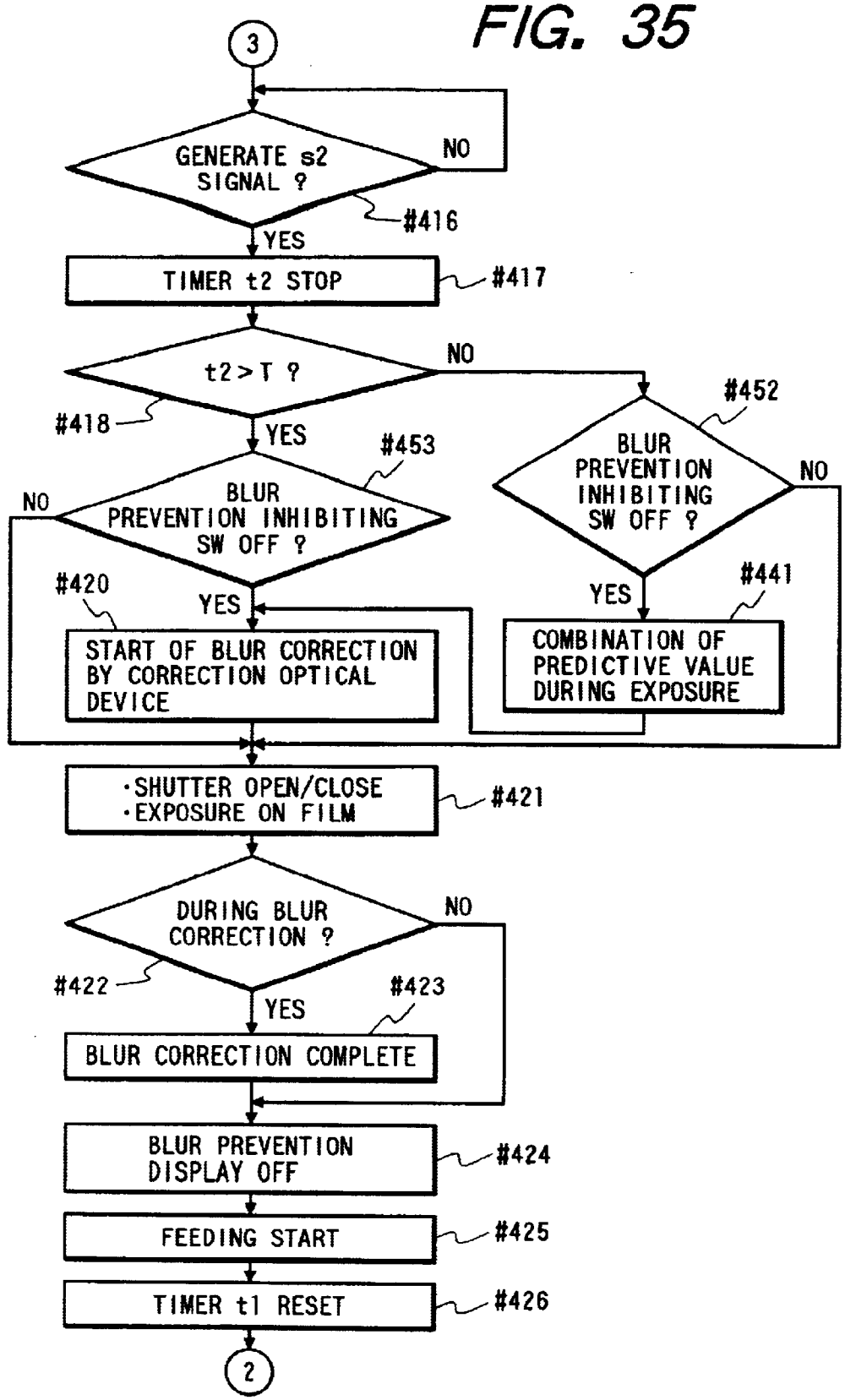
FIG. 35 is a flowchart showing remaining operations following FIG. 34.

FIGS. 34 and 35 are flowcharts showing a sequence of operations that follows the above concept. These flowcharts differ from those of FIGS. 23 and 24 in that step #451 is added to FIG. 34 corresponding to FIG. 23 and step #452 is added to FIG. 35 corresponding to FIG. 24. Further, step #441 of FIG. 35 is a portion for performing the same processing as step #441 described in the sixth embodiment of FIG. 33, and therefore the description is omitted.

In step #451 of FIG. 34, the state of the blur prevention inhibiting switch 1704 is checked. If the blur prevention inhibiting switch 1704 is being pushed (on-state), the operation goes to step #416 of FIG. 35 with skipping step #415, i.e., the blur prevention display is not performed. Then, in step #418, if not determined that t2>T (when the release operation element 1303 is full switched on at a breath), the operation advances to step #452 in which the state of the blur prevention inhibiting switch 1704 is rechecked. If the blur prevention inhibiting switch 1704 is on-state, i.e., when the blur correction is inhibited, the operation advances to step #421 in which an exposure operation is performed.

On the other hand, if determined in step #452 that the blur prevention inhibiting switch 1704 is off-state, the operation advances to step #441. In step #441, the predictive value is combined in the same manner as in FIG. 33, it advances to step #420 to perform the blur correction.

If determined in step #418 that t2>T, the operation advances to step #420. In step #420, although the correction optical apparatus 1311 is driven, it is set that the blur correction is not performed when the blur prevention inhibiting switch 1704 is on-state in step #451. In other words, only the blur correction is inhibited in the blur prevention off state, and the main blur prevention sequences in the blur prevention system such as the vibration detecting sensor 1312 and the like are kept operating. Since the photographer often switches on and off the blur prevention system, if the entire blur prevention system is turned off, it would take time to restart the blur prevention system. Thus only the blur correction is inhibited to prevent the camera from reducing its mobility.

Even in such a camera structure in which the photographer can freely turn on and off the blur prevention system, its mobility is maintained.

As discussed above, the blur prevention inhibiting switch (or blur prevention switching switch) is provided for selecting the usable or unusable state of the blur prevention system. When the unusable state is selected for the blur prevention system, the blur correction is inhibited at least during film exposure, but the vibration detecting sensor is driven to operate. When the usable state is selected for the blur prevention system, the blur prevention display is inhibited, but the vibration detecting is driven to operate.

It is therefore possible to improve the mobility even in such a camera structure in which the photographer can select blur prevention on or off.

Eighth Embodiment

In the above fifth to seventh embodiments, the correction optical apparatus is driven to perform predictive correction for the large vibration caused by full switching on the release operation element at a breath. Such a vibration can be processed not only in the blur prevention system but also on the camera sequences.

The most easy way to prevent a failed picture due to an image blur to accompany the large vibration caused by full switching on the release operation element at a breath is to inhibit the photographing operation with the release lock as in the fourth embodiment. However, such a large vibration caused by full switching on the release operation element is settled with time. For this reason, such image deterioration can also be prevented by shifting the release timing (extending the release time lag) until the large vibration is settled.

Figure 36:
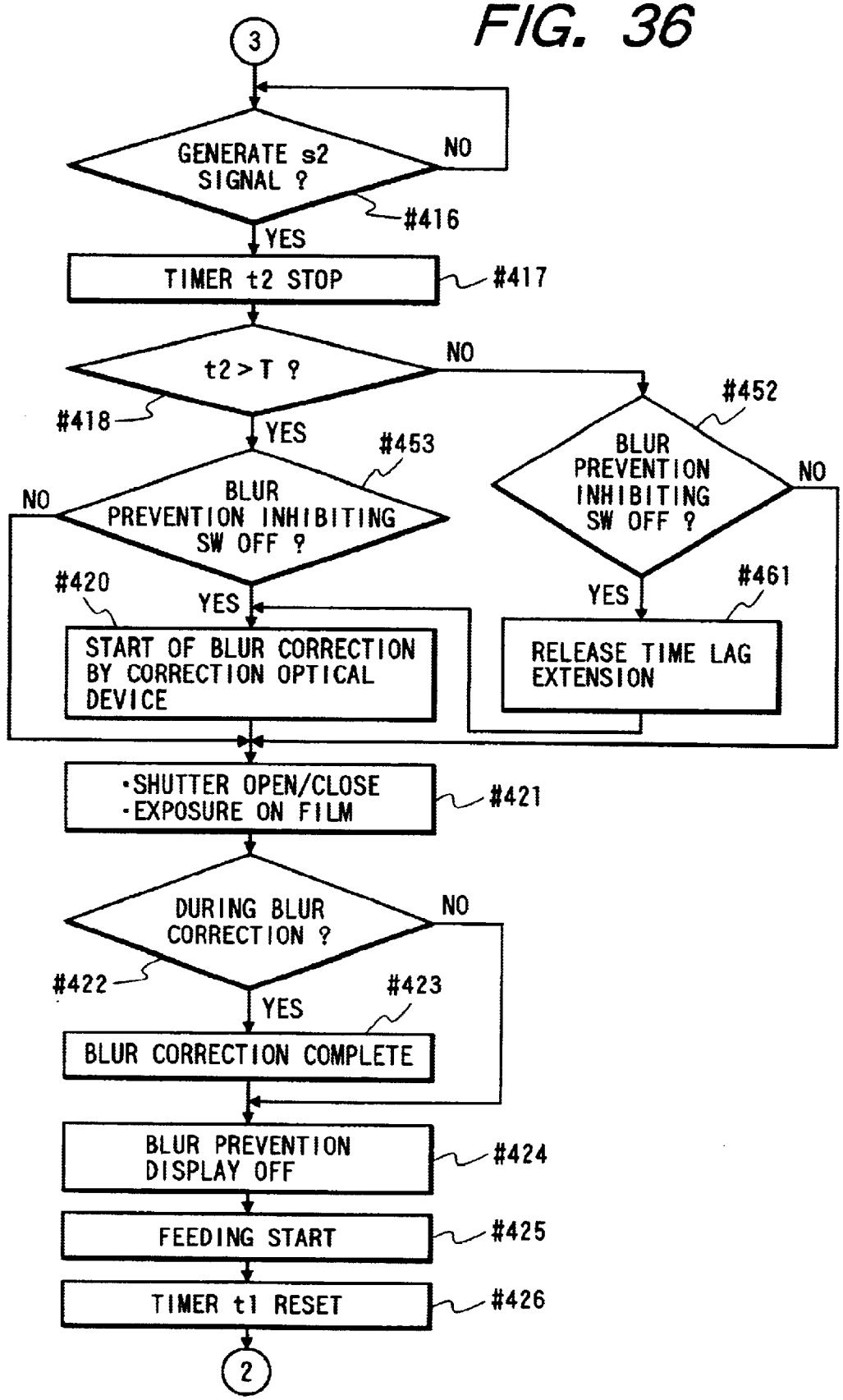
FIG. 36 is a flowchart showing an operation of the main part of a compact camera according to an eighth embodiment of the present invention.

FIG. 36 is a flowchart showing the main portion of camera sequences following the above concept. Hereinbelow, description will be made to the flowchart according to the eighth embodiment.

The flowchart of FIG. 36 differs from that of FIG. 35 according to the seventh embodiment in that step #461 is used instead of step #441 of FIG. 35 for extending the release time lag to keep the operation waiting for a predetermined time period. After waiting for the predetermined time period, the operation advances to #420 to start blur correction if the blur prevention is on. Then, the exposure operation is performed (#421).

When the release operation element is full switched on at a breath and the blur prevention inhibiting switch is on-state, the release time lag is not extended. The photographer who selects the blur prevention off state may often request quick response. In such cases, it is desirable not to extend the release time lag.

Thus the image deterioration can be prevented in the above simple structure in which the state of the vibration is determined and the release time lag in the camera is changed according to the state.

Ninth Embodiment

The above fourth through eighth embodiments taught respective structures for inhibiting the blur correction from being performed when it is determined that the blur prevention is unnecessary (in fifth through seventh embodiments, the blur correction is automatically turned off according to the shutter speed and the like, and in the seventh embodiment, the photographer's intention is added). In these embodiments, such a blur prevention system as it performs blur correction only in the exposure operation was described. However, there is another type of camera capable of performing blur correction before exposure (such as a TTL type camera capable of performing distance measuring and photometry in the optical system). In such a camera, it is desirable to perform the blur correction before photographing operation (during distance measuring and photometry) (even if the photographer switches off the blur prevention).

Figure 37:
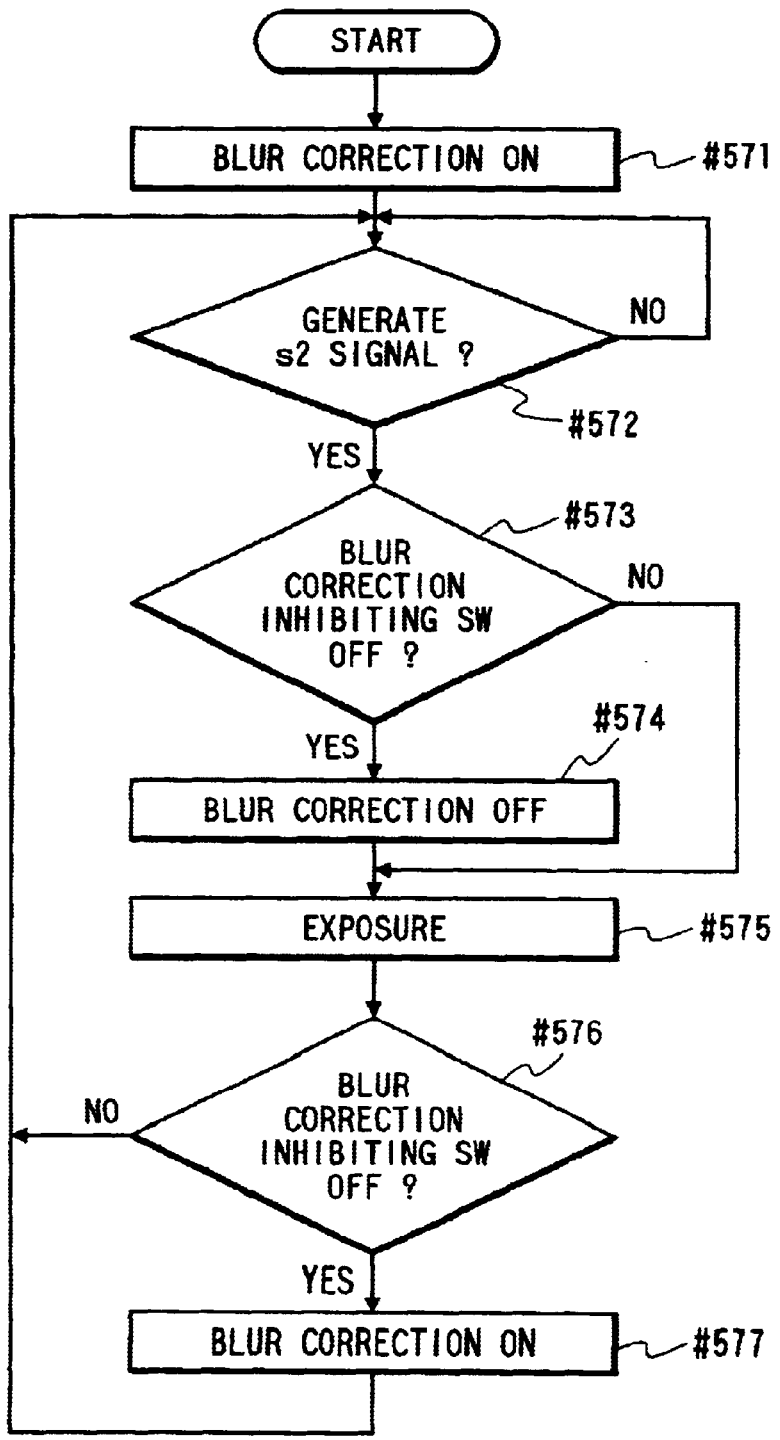
FIG. 37 is a flowchart showing an operation of the main part of a compact camera according to a ninth embodiment of the present invention.
Figure 38:
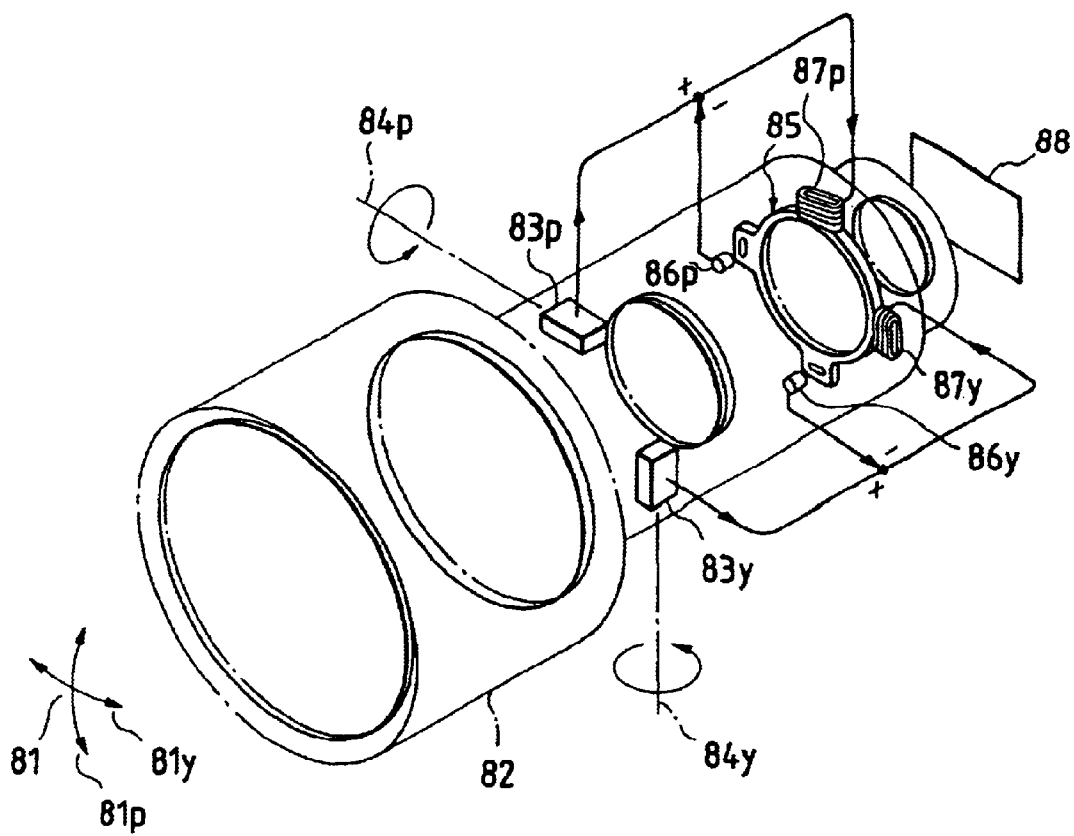
FIG. 38 is a schematic perspective view showing an arrangement of a conventional blur prevention system.

FIG. 37 is a flowchart showing an operation of the main blur prevention part of such a camera. The flow starts at the time the release operation element of the camera is half switched on (generation of the s1 signal). The camera used here has the same circuit structure as that shown in FIG. 22, including a blur prevention inhibiting switch 1704 such as one shown in FIG. 29.

In step #571, the blur correction is started, and as is not shown in this flow, photometry, distance measuring, lens focusing driving and the like are performed. Even if the blur prevention off action has been taken through the blur prevention inhibiting switch 1704, the blur correction remains performed, thereby increasing the accuracy of photometry and distance measuring.

In step #572, the operation waits until the release operation element 1303 is full switched on. When full switched on, the operation advances to step #573 in which the state of the blur prevention inhibiting switch 1704 is determined. If the blur prevention inhibiting switch 1704 is off (i.e., if YES in step #573), the operation advances to step #574. If the blur prevention inhibiting switch 1704 is on (i.e., if NO in step #573), the operation goes to step #575.

In step #574, the blur correction is stopped. Since the photographer has intention to switch off the blur prevention, the blur correction is stopped after the release operation element 1303 has been full switched on (for starting the photographing operation). In the next step #575, the film is exposed. In the subsequent step #576, the state of the blur prevention inhibiting switch 1704 is determined again. If the blur prevention inhibiting switch 1704 is on, the operation returns to step #572. If the blur prevention inhibiting switch 1704 is off, the operation advances to step #577 to restart the blur correction (since the operation advances to step #577 when the blur prevention inhibiting switch 1704 is off in step #576, the blur correction is stopped then). After that, the operation returns to step #572.

As discussed above, the blur correction continues to be performed until the photographing operation is started even when the blur prevention off action has been taken, so that the accuracy of photometry and distance measuring can be improved. Further, since only the blur correction is stopped when the blur prevention off action has been taken (while operating other portions such as the vibration detecting sensor), the blur correction can be restarted immediately.

The present invention may be embodied in any one of the above embodiments or in a proper combination of these techniques.

Although the present invention is suitably applied to a camera such as a single lens reflex camera or a video camera, it is not limited thereto and can be applied to other optical equipment capable of displaying an effective function when such a blur prevention system is provided therein. Even when the present invention is applied to a camera provided with an image pickup device such as CCD instead of the correction lens in each embodiment, the blur correction is possible as well.

Further, the present invention assumed that the correction optical apparatus was incorporated into an interchangeable lens, but it may also be an accessory to be incorporated into an adapter between the camera and the lens such as an extender, or to be incorporated into a conversion lens mounted in front of the interchangeable lens, or it may be applied even when the camera is not of an interchangeable lens type.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the sprit and scope of the appended claims. The scope of the following claims is to be accorded the broadest interpretation so as to encompass all such modifications and equivalent structures and functions.

What is claimed is:

1. An apparatus for an image blur correction device applied to a camera with an operation unit that performs performing a first action for starting a photographing preparation operation and a second action for starting a photographing operation, comprising:

determination means for determining a difference in time between the first action and the second action; and control means for carrying out, in accordance with the difference in time determined by said determination means, (1) a determination of whether or not said image blur correction device should be operated, (2) a determination of whether or not to cause the image blur correction device to perform the image blur correction operation in a first manner or a second manner different from the first manner, (3) control of predetermined indications related to the image blur or (4) varying a time from the second action to a start of actual exposure.

2. An apparatus according to claim 1, wherein said control means includes means for putting said image blur correction device in a non-operating state in accordance with a determination of said determination means that the difference in time is within a predetermined time.

3. An apparatus according to claim 1, wherein said control means includes means for changing, in accordance with a determination of said determination means that the difference in time is within a predetermined time, an operation state of said image blur correction device, from a state in which an image blur correction operation is being performed to a non-operating state.

4. An apparatus according to claim 1, wherein said control means includes means for operating, in accordance with a determination of said determination means that the difference in time is within a predetermined time, said image blur correction device in a first manner, in which said image blur correction device operates in response to a memory signal previously stored, or in accordance with a determination of said determination means that the difference in time is more than the predetermined time, said image blur correction device in a second manner, in which said image blur correction device operates without using the memory signal.

5. An apparatus according to claim 4, wherein said image blur correction device performs the image blur correction operation in accordance with an output of a vibration detecting device that detects a vibrating state of said apparatus, and said control means includes means for operation, in accordance with a determination of said determination means that the difference in time is within a predetermined time, said image blur correction device in the first manner, in which said image blur correction device operates in response to the prestored memory signal and the output of said vibration detecting means, or in accordance with a determination of said determination means that the difference in time is more than the predetermined time, said image blur correction device in the second manner, in which said image blur correction device operates in response to only the output of said vibration detecting means without using the memory signal.

6. An apparatus for an image blur correction device applied to a camera, comprising:

operation means for starting an image blur correction operation of the image blur correction device in response to a predetermined action to start a photographing operation of the camera; and a variable circuit for delaying a timing at which the image blur correction device starts the image blur correction operation in response to the predetermined action when the focal distance to be used in the photographing operation is set long.

7. An apparatus for an image blur correction device applied to a camera, comprising:

operation means for starting an image blur correction operation of the image blur correction device in response to a predetermined action to start a photographing operation of the camera; and a variable circuit for causing said operation means to change, in accordance with both the exposure time to be used in the photographing operation of the camera and the focal distance to be used in the photographing operation of the camera, a timing at which the image blur correction device starts the image blur correction operation.

8. An apparatus for an image blur correction device applied to a camera, comprising:

operation means for starting an image blur correction operation of the image blur correction device in response to a predetermined action to start a photographing operation of the camera;

a variable circuit for causing said operation means to change, in accordance with at least one of the exposure time to be used in the photographing operation of the camera and the focal distance to be used in the photographing operation of the camera, a timing of the image blur correction operation such that the image blur correction operation is started before starting the photographing operation, and release time lag variation means for varying, in accordance with at least one of the exposure time to be used in the photographing operation of the camera and the focal distance to be used in the photographing operation of the camera, a release time lag corresponding to a time interval between the time the predetermined action to start the photographing operation are taken and the time an actual photographing operation is started, wherein said variable circuit includes means for changing, in synchronism with the variation of the release time lag, the timing of the image blur correction operation, such that the image blur correction operation is started before starting the photographing operation.

9. An apparatus for an image blur correction device applied to a camera, comprising:

operation means for starting an image blur correction operation of the image blur correction device in response to a predetermined action to start a photographing operation of the camera, said operation means including clock means and means for controlling the timing at which the image blur correction device starts the image blur correction operation in accordance with the time of said clock means; and variable means for causing said operation means to change, in accordance with at least one of the exposure time to be used in the photographing operation of the camera and the focal distance to be used in the photographing operation of the camera, a timing at which the image blur correction device starts the image blur correction operation in response to the predetermined action to start the photographing operation.

10. An apparatus for an image blur correction device applied to a camera, comprising:

operation means for starting an image blur correction operation of the image blur correction device in response to a predetermined action to start a photographing operation of the camera, said operation means including means for temporally stopping the image blur correction operation when the predetermined action is taken under a condition that said image blur correction device is performing the image blur correction operation, and for restarting the image blur correction operation thereafter, a variable circuit for causing said operation means to change, in accordance with at least one of the exposure time to be used in the photographing operation of the camera and the focal distance to be used in the photographing operation of the camera, a timing at which the image blur correction device starts the image blur correction operation in response to the predetermined action to start the photographing operation, said variable circuit comprising means for changing a timing at which said image blur correction device restarts the image blur correction operation.

11. An apparatus for an image blur correction device applied to a camera, comprising:

operation means for starting an image blur correction operation of the image blur correction device in response to a predetermined action to start a photographing operation of the camera; and variable means for switching controls of said operation means between a first operation starting control, in which the image blur correction operation is started at a first timing in response to the predetermined action to start the photographing operation, and a second operation starting control, in which the image blur correction operation is started at a second timing different from the first timing, said variable means including means for determining, in accordance with the exposure time to be used in the photographing operation of the camera, whether said operation means is operable in the first operation starting control or the second operation starting control, wherein said variable means sets the timing at which the image blur correction operation is started such that the image blur correction operation is started before starting an actual exposure operation regardless of whether the image blur correction operation is operable in the first operation starting control or the second operation starting control.

12. An apparatus according to claim 11, wherein said variable means includes means for causing said operation means to start the image blur correction operation after a first time has elapsed since the predetermined action was taken under the first operation starting control or after a second time, longer than the first time, has elapsed since the predetermined action was taken under the second operation starting control, and means for designating the first operation starting control, when the exposure time is shorter than a predetermined time, or the second operation starting control, when the exposure time is longer than the predetermined time.

13. An apparatus for an image blur correction device applied to a camera, comprising:

operation means for starting an image blur correction operation of the image blur correction device in response to a predetermined action to start a photographing operation of the camera; and variable means for switching controls of said operation means between a first operation starting control, in which the image blur correction operation is started at a first timing in response to the predetermined action to start the photographing operation, and a second operation starting control, in which the image blur correction operation is started at a second timing different from the first timing, said variable means including means for causing said operation means to determine, in accordance with the focal distance to be used in the photographing operation of the camera, whether said operation means is operable in the first operation starting control or the second operation starting control, wherein said variable means sets the timing at which the image blur correction operation is started such that the image blur correction operation is started before starting an actual exposure operation regardless of whether the image blur correction operation is operable in the first operation starting control or the second operation starting control.

14. An apparatus according to claim 13, wherein said variable means includes means for causing said operation means to start the image blur correction operation after a first time has elapsed since the predetermined action was taken under the first operation starting control or after a second time, longer than the first time, has elapsed since the predetermined action was taken under the second operation starting control, and means for causing said operation means to operate in the first operation starting control when the focal distance is shorter than a predetermined time, or to operate in the second operation starting control when the focal distance is longer than the predetermined time.

15. An apparatus for an image blur correction device applied to a camera, comprising:

operation means for starting an image blur correction operation of the image blur correction device in response to a predetermined action to start a photographing operation of the camera; and variable means for switching controls of said operation means between a first operation starting control, in which the image blur correction operation is started at a first timing in response to the predetermined action to start the photographing operation, and a second operation starting control, in which the image blur correction operation is started at a second timing different from the first timing, release time lag variation means for varying a release time lag corresponding to a time interval between the time the predetermined action to start the photographing operation was taken and the time an actual photographing operation is started, wherein said variable means sets the timing at which the image blur correction operation is started such that the image blur correction operation is started before starting an actual exposure operation regardless of whether the image blur correction operation is operable in the first operation starting control or the second operation starting control, and wherein said variable means includes means for selecting, in synchronism with the variation of the release time lag, one of the first operation starting control and the second operation starting control, such that the image blur correction operation is started before starting the photographing operation.

16. An apparatus according to claim 15, wherein said release time lag variation means includes means for varying the release time lag in accordance with at least one of the exposure time to be used in the photographing operation of the camera or the focal distance to be used in the photographing operation of the camera.

17. An apparatus for an image blur correction device applied to a camera, comprising:

operation means for starting an image blur correction operation of the image blur correction device in response to a predetermined action to start a photographing operation of the camera; and variable means for switching controls of said operation means between a first operation starting control, in which the image blur correction operation is started at a first timing in response to the predetermined action to start the photographing operation, and a second operation starting control, in which the image blur correction operation is started at a second timing different from the first timing, said variable means including clock means and means for causing said operation means to control the timing of the image blur correction device so as to start the image blur correction operation in accordance with the time of said clock means, wherein said variable means sets the timing at which the image blur correction operation is started such that the image blur correction operation is started before starting an actual exposure operation regardless of whether the image blur correction operation is operable in the first operation starting control or the second operation starting control.

18. A camera comprising:

a release operation unit;

operation means for starting an exposure operation in accordance with a predetermined action of said release operation unit and starting actual exposure after a release time lag has elapsed since the predetermined action was taken; and a variable circuit for extending the release time lag when the focal distance to be used in the photographing operation of the camera is set long.

19. A camera comprising:

a release operation unit;

operation means for starting an exposure operation in accordance with a predetermined action of said release operation unit and starting actual exposure after a release time lag has elapsed since the predetermined action was taken; and a variable circuit for varying the release time lag in accordance with both the exposure time to be used in the photographing operation of the camera and the focal distance to be used in the photographing operation of the camera.

* * * * *

UNITED STATES PATENT AND TRADEMARK OFFICE
CERTIFICATE OF CORRECTION

PATENT NO. : 6,704,501 B1
DATED : March 9, 2004
INVENTOR(S) : Koichi Washisu

It is certified that error appears in the above-identified patent and that said Letters Patent is hereby corrected as shown below:

Column 8,
Line 5, "to" should be deleted.

Column 12,
Line 17, "situation;" should read -- situation. --.

Column 14,
Line 23, "operate" should read -- operating --.
Line 36, "operate" should read -- operating --.
Line 50, "first," should read -- first --.

Column 15,
Line 3, "distance, that" should read -- distance that --.

Column 18,
Line 53, "full" should read -- fully --.

Column 19,
Line 45, "to" should read -- tc --.
Line 55, "to)" should read -- tc) --.
Line 64, "to" should read -- tc --.

Column 22,
Line 61, "Into" should read -- into --.

Column 24,
Line 45, "detection" should read -- detection of --.

Column 29,
Line 43, "Lq" should be deleted.

Column 35,
Line 53, "#404" should read -- #404, --.

Column 37,
Line 17, "full" should read -- fully --.
Line 22, "flashing" should read -- flash --.
Line 28, "full" should read -- fully --.

UNITED STATES PATENT AND TRADEMARK OFFICE
CERTIFICATE OF CORRECTION

PATENT NO. : 6,704,501 B1
DATED : March 9, 2004
INVENTOR(S) : Koichi Washisu

It is certified that error appears in the above-identified patent and that said Letters Patent is hereby corrected as shown below:

Column 38,
Line 53, "not-properly" should read -- not properly --.

Column 43,
Line 18, "from, the" should read -- from the --.

Column 46,
Line 32, "operate" should read -- operating --.
Line 35, "operate" should read -- operating --.
Line 37, "operate" should read -- operating --.

Column 50,
Line 26, "well-known" should read -- well known --.
Line 42, "performing" should be deleted.

Signed and Sealed this

Ninth Day of November, 2004

JON W. DUDAS
*Director of the United States Patent and Trademark Office*